US012189321B2

(12) United States Patent
Ikegami et al.

(10) Patent No.: US 12,189,321 B2
(45) Date of Patent: Jan. 7, 2025

(54) IMAGE FORMING APPARATUS AND SHEET CONVEYANCE DEVICE

(71) Applicant: BROTHER KOGYO KABUSHIKI KAISHA, Nagoya (JP)

(72) Inventors: Yusuke Ikegami, Nagoya (JP); Sota Yanagihara, Nagoya (JP); Hiroshi Nakano, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/473,451

(22) Filed: Sep. 25, 2023

(65) Prior Publication Data

US 2024/0111238 A1 Apr. 4, 2024

(30) Foreign Application Priority Data

Sep. 30, 2022 (JP) ................................ 2022-158850
Sep. 30, 2022 (JP) ................................ 2022-158851
Sep. 30, 2022 (JP) ................................ 2022-158852

(51) Int. Cl.
*G03G 15/00* (2006.01)
*B65H 1/14* (2006.01)
*B65H 3/06* (2006.01)

(52) U.S. Cl.
CPC ........... *G03G 15/6552* (2013.01); *B65H 1/14* (2013.01); *G03G 15/6529* (2013.01); *B65H 2403/40* (2013.01); *B65H 2403/514* (2013.01); *B65H 2403/724* (2013.01); *B65H 2403/732* (2013.01)

(58) Field of Classification Search
None
See application file for complete search history.

(56) References Cited

U.S. PATENT DOCUMENTS 6,305,683 B1 * 10/2001 Kim .......................... B65H 3/06 271/22
2008/0226358 A1 * 9/2008 Hanashima ........ G03G 15/6514 399/392
2016/0282778 A1 * 9/2016 Suzuki ................... G03G 15/65
2019/0337742 A1 * 11/2019 Uehara .................... B65H 1/12

FOREIGN PATENT DOCUMENTS

JP 11-189344 A 7/1999
JP 2007-230768 A 9/2007
JP 2008-222380 A 9/2008
JP 2018-90357 A 6/2018
JP 2019-64775 A 4/2019
JP 2020-104973 A 7/2020

* cited by examiner

*Primary Examiner* — Leslie J Evanisko
(74) *Attorney, Agent, or Firm* — Merchant & Gould P.C.

(57) ABSTRACT

A manual feed tray is located at a side surface of a main housing. A supply roller conveys a sheet on the manual feed tray toward a print engine. A pressure plate is movable between a contact position at which the sheet on the manual feed tray contacts the supply roller and a separated position at which the sheet on the manual feed tray is separated from the supply roller. A push-up cam pushes up the pressure plate from the separated position to the contact position. The push-up cam includes a contact portion configured to contact the pressure plate. A controller is configured to: when performing printing on a plurality of sheets, after moving the pressure plate from the separated position to the contact position, convey the plurality of sheets by intermittently driving the supply roller while maintaining the pressure plate at the contact position.

20 Claims, 33 Drawing Sheets

IMAGE FORMING APPARATUS AND SHEET CONVEYANCE DEVICE

REFERENCE TO RELATED APPLICATIONS

This application claims priority from Japanese Patent Application Nos. 2022-158850, 2022-158851, and 2022-158852 all of which were filed on Sep. 30, 2022. The entire content of each of the priority applications is incorporated herein by reference.

BACKGROUND ART

An image forming apparatus and a sheet conveyance device having a pressure plate for moving a sheet set on a tray up and down are known.

DESCRIPTION

A sheet conveyance device includes a pickup roller for conveying a sheet on a manual feed tray, a pressure plate for pressing the sheet on the manual feed tray against or separating from the pickup roller, and a push-up member for moving the pressure plate up and down.

In this technique, each time one sheet is conveyed, an operation of the push-up member pushing up the pressure plate and a rotating operation of the pickup roller for conveying one sheet are performed in an interlocking manner.

However, in the above-mentioned technology, when printing a plurality of sheets, the pressure plate moves up and down each time a sheet is conveyed, so there is a problem that the up-down movement of the pressure plate frequently causes noise.

In view of the foregoing, an example of an object of this disclosure is to suppress generation of noise due to movement of a pressure plate when printing a plurality of sheets.

According to one aspect, this specification discloses an image forming apparatus. The image forming apparatus includes a main housing, a print engine, a manual feed tray, a supply roller, a pressure plate, a push-up cam, and a controller. The print engine is accommodated in the main housing and configured to form an image on a sheet. The manual feed tray is located at a side surface of the main housing. The supply roller is configured to convey a sheet on the manual feed tray toward the print engine. The pressure plate is movable between a contact position at which the sheet on the manual feed tray contacts the supply roller and a separated position at which the sheet on the manual feed tray is separated from the supply roller. The push-up cam is configured to push up the pressure plate from the separated position to the contact position. The push-up cam includes a contact portion configured to contact the pressure plate. The controller is configured to: when performing printing on a plurality of sheets, after moving the pressure plate from the separated position to the contact position, convey the plurality of sheets by intermittently driving the supply roller while maintaining the pressure plate at the contact position. Because the supply roller is intermittently driven while maintaining the pressure plate at the contact position when printing a plurality of sheets, generation of noise due to movement of the pressure plate is suppressed.

According to another aspect, this specification also discloses a sheet conveyance device. The sheet conveyance device includes a tray, a supply roller, a pressure plate, a motor, a transmission switching gear train, a pressure plate operating mechanism, and a sector lever. The supply roller is configured to convey a sheet set on the tray. The pressure plate is movable between a contact position at which the sheet on the tray contacts the supply roller and a separated position at which the sheet on the tray is separated from the supply roller. The transmission switching gear train includes a solenoid actuator. The transmission switching gear train is switchable between a transmission state in which drive force of the motor is transmitted to the supply roller and a non-transmission state in which drive force of the motor is not transmitted to the supply roller. The pressure plate operating mechanism is switchable between an operating state in which the pressure plate is operated by using drive force of the motor and a non-operating state in which the pressure plate is not operated by cutting off drive force of the motor. The pressure plate operating mechanism includes an input gear, a sector gear, and a spring. Drive force is input the input gear. The sector gear has an outer circumferential surface on which a tooth portion and a toothless portion are arranged, the tooth portion being engageable with the input gear, the toothless portion being not engageable with the input gear. The spring is configured to urge the sector gear in a rotation direction of the sector gear. The sector lever is configured to switch a state of the pressure plate operating mechanism. The sector lever is rotatable between: a rotation restricting position at which the sector lever engages with a part of the sector gear to stop rotation of the sector gear due to urging force of the spring; and a rotation allowing position at which the sector lever separates from the part of the sector gear to allow rotation of the sector gear due to urging force of the spring. In response to switching, by the sector lever, a state of the pressure plate operating mechanism from the non-operating state to the operating state, the pressure plate moves from the separated position to the contact position. In response to switching the state of the pressure plate operating mechanism from the operating state to the non-operating state, the pressure plate is maintained at the contact position. The transmission switching gear train is alternately switchable between the transmission state and the non-transmission state in a state where the pressure plate is maintained at the contact position. Thus, generation of noise due to movement of the pressure plate is suppressed when printing a plurality of sheets.

According to still another aspect, this specification also discloses a sheet conveyance device. The sheet conveyance device includes a tray, a supply roller, a pressure plate, a motor, a transmission switching gear train, a pressure plate operating gear train, and a solenoid actuator. The supply roller is configured to convey a sheet set on the tray. The pressure plate is movable between a contact position at which the sheet on the tray contacts the supply roller and a separated position at which the sheet on the tray is separated from the supply roller. The transmission switching gear train is switchable between a transmission state in which drive force of the motor is transmitted to the supply roller and a non-transmission state in which drive force of the motor is not transmitted to the supply roller. The pressure plate operating gear train is switchable between an operating state in which the pressure plate is operated by using drive force of the motor and a non-operating state in which the pressure plate is not operated by cutting off drive force of the motor. The solenoid actuator is configured to switch a state of the pressure plate operating gear train and a state of the transmission switching gear train. In a case where an actuation time of the solenoid actuator is a first time, the state of the pressure plate operating gear train is switched to the operating state to move the pressure plate, and the state of the transmission switching gear train is switched to the transmission state or the non-transmission state. In a case where the actuation time of the solenoid actuator is a second time shorter than the first time, the state of the pressure plate operating gear train is not switched to the operating state to maintain a position of the pressure plate, and the state of the transmission switching gear train is switched to the transmission state or the non-transmission state. Thus, by switching the actuation time of the solenoid actuator, a plurality of sheets are printed in a state where the pressure plate is maintained at the contact position, thereby suppressing generation of noise due to movement of the pressure plate.

FIRST EMBODIMENT

Next, a first embodiment of the present disclosure will be described in detail with reference to the drawings as appropriate.

Figure 1:
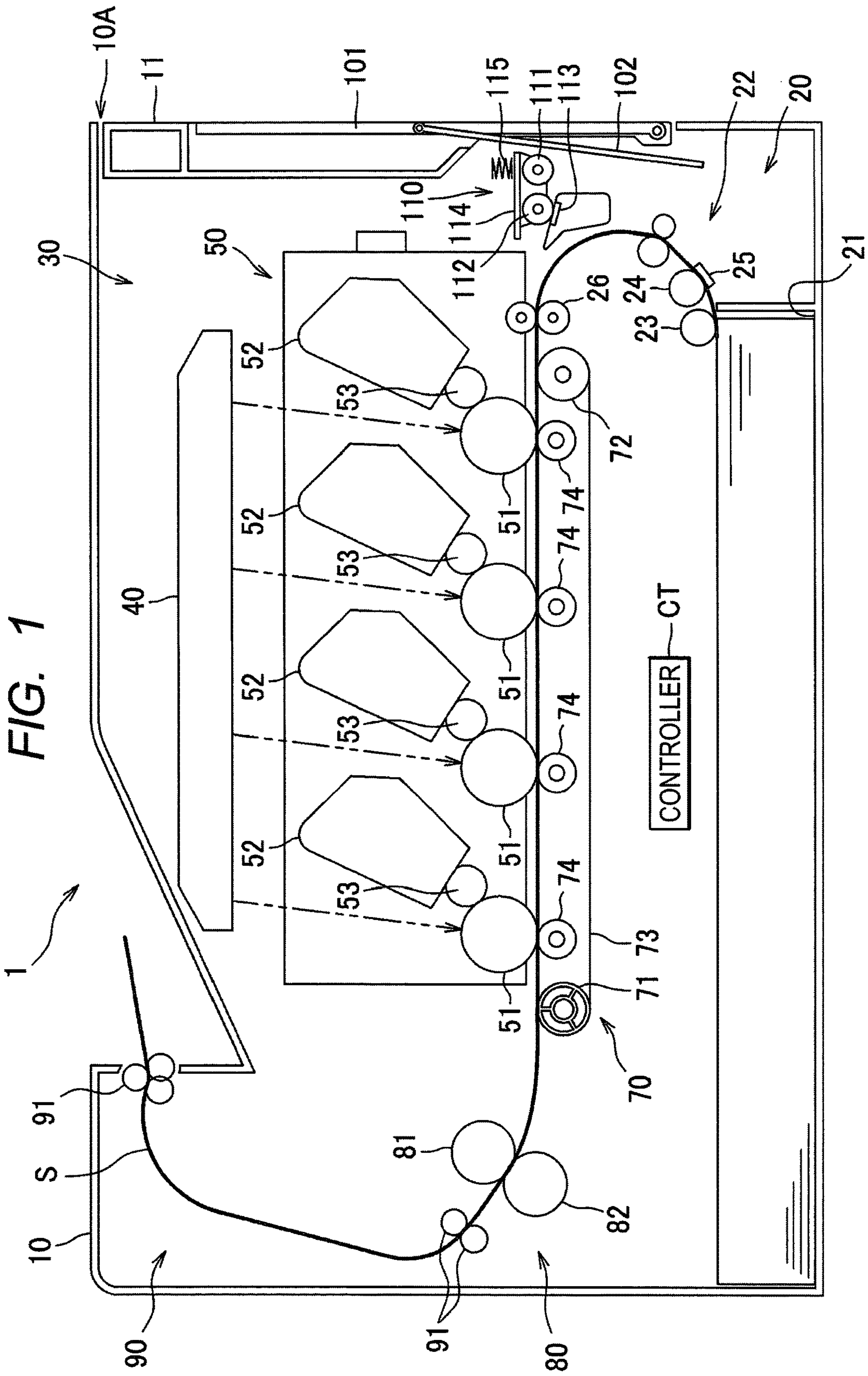
FIG. 1 is a diagram showing an image forming apparatus.

As shown in FIG. 1, an image forming apparatus 1 is a color printer. The image forming apparatus 1 includes a main housing 10, a cover 11, a supply section 20, an image forming section 30, and a discharge section 90.

The main housing 10 has an opening 10A. The cover 11 opens and closes the opening 10A.

The supply section 20 is located at a lower portion inside the main housing 10. The supply section 20 includes a sheet tray 21 that stores sheets S, and a first supply mechanism 22 that supplies the sheets S from the sheet tray 21 to the image forming section 30. The sheet tray 21 is configured to be detachable by pulling the same out from the main housing 10. The first supply mechanism 22 includes a first pickup roller 23, a first separation roller 24, a first separation pad 25, and a registration roller 26. The sheet S is a medium on which the image forming apparatus 1 forms an image, and includes plain paper, envelopes, postcards, thin paper, thick paper, glossy paper, resin sheets, stickers, and so on.

In the supply section 20, after the sheets S in the sheet tray 21 are sent out by the first pickup roller 23, the sheets S are separated one sheet at a time between the first separation roller 24 and the first separation pad 25. After that, the leading edge position of the sheet S is regulated by the registration roller 26 in a state where its rotation is stopped, and then the registration roller 26 is rotated to supply the sheet S to the image forming section 30.

The image forming section 30 has a function of forming an image on the sheet S. The image forming section 30 includes a scanner unit 40, a drawer 50, a transfer unit 70, and a fixing unit 80.

The scanner unit 40 is provided in an upper portion of the main housing 10, and includes a laser emitting section, a polygon mirror, a lens, a reflecting mirror, and so on, which are not shown. The scanner unit 40 exposes the surface of each photosensitive drum 51 of the drawer 50 with a laser beam.

Figure 2:
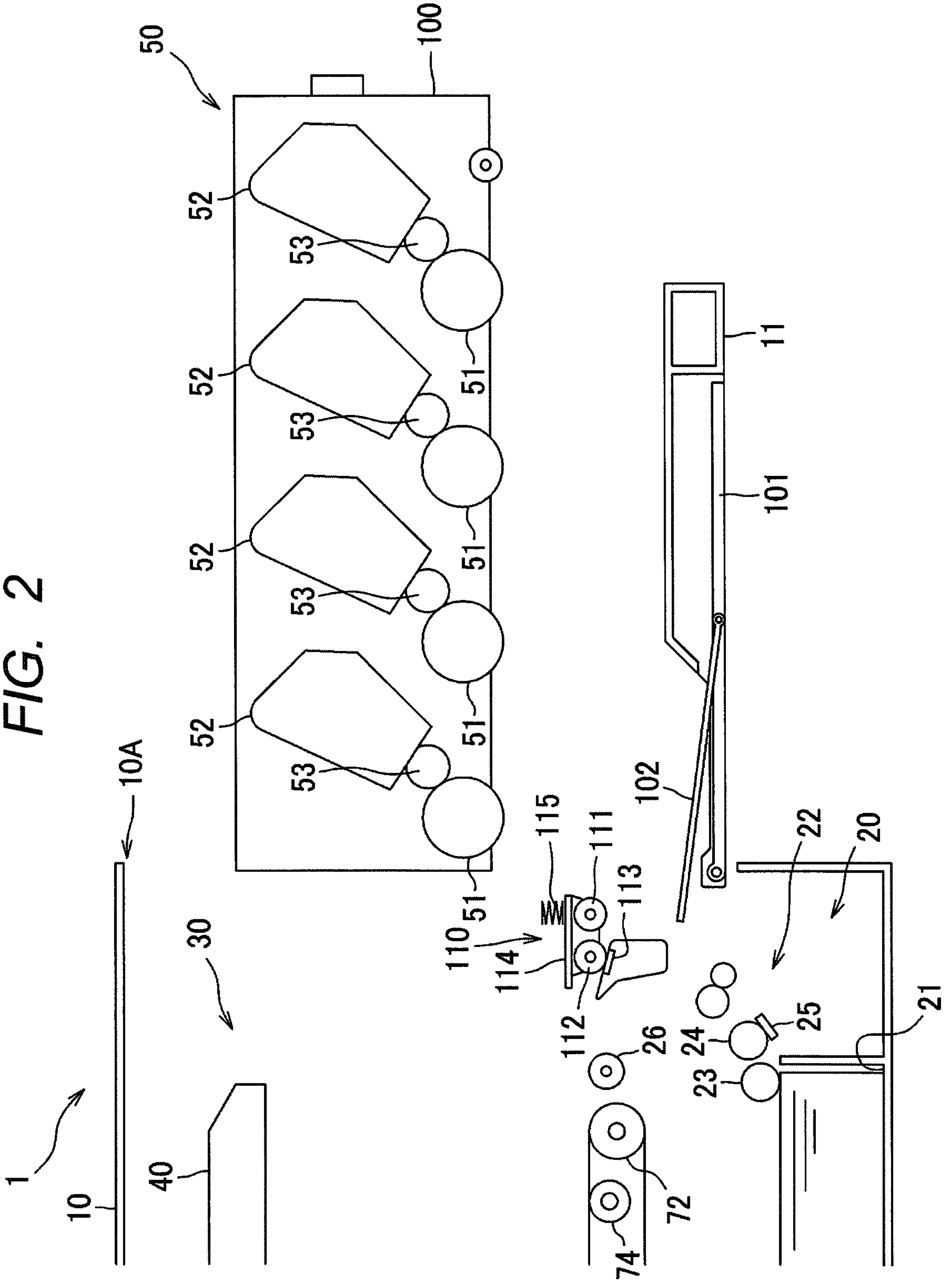
FIG. 2 is a diagram showing the image forming apparatus in a state where a cover is open.

The drawer 50 is movable between an accommodated position shown in FIG. 1 and a pulled-out position shown in FIG. 2 through the opening 10A. The drawer 50 includes four photosensitive drums 51 and four development cartridges 52.

Each photosensitive drum 51 is attached to the drawer 50. Although not shown, in addition to the photosensitive drums 51, chargers and so on are attached to the drawer 50.

Each development cartridge 52 is attachable to and detachable from the drawer 50. The development cartridge 52 includes a development roller 53 that supplies toner to the photosensitive drum 51. The development cartridge 52 contains toner therein.

The transfer unit 70 is located between the supply section 20 and the drawer 50. The transfer unit 70 includes a drive roller 71, a follow roller 72, a conveyance belt 73, and transfer rollers 74.

The drive roller 71 and the follow roller 72 are rollers for rotating the conveyance belt 73. The conveyance belt 73 has an outer surface in contact with the photosensitive drum 51. Four transfer rollers 74 are arranged inside the conveyance belt 73 to sandwich the conveyance belt 73 between the transfer rollers 74 and the photosensitive drums 51.

The fixing unit 80 includes a heat roller 81 and a pressure roller 82. The pressure roller 82 sandwiches the sheet S with the heat roller 81.

In the image forming section 30, first, the surface of the photosensitive drum 51 is uniformly charged by the charger and then exposed by the scanner unit 40. Thereby, an electrostatic latent image is formed on the photosensitive drum 51. After that, the development roller 53 supplies toner to the electrostatic latent image on the photosensitive drum 51. Thereby, a toner image is formed on the photosensitive drum 51.

Next, the sheet S supplied onto the conveyance belt 73 passes between the photosensitive drum 51 and the transfer roller 74, thereby the toner image on the photosensitive drum 51 is transferred onto the sheet S. Then, the sheet S passes between the heat roller 81 and the pressure roller 82, thereby the toner image is thermally fixed on the sheet S.

The discharge section 90 discharges the sheet S on which an image is formed. The discharge section 90 includes a plurality of conveyance rollers 91 that convey the sheet S. The sheet S on which the toner image is thermally fixed is conveyed by the conveyance rollers 91 and discharged to the outside of the main housing 10.

Figure 4A:
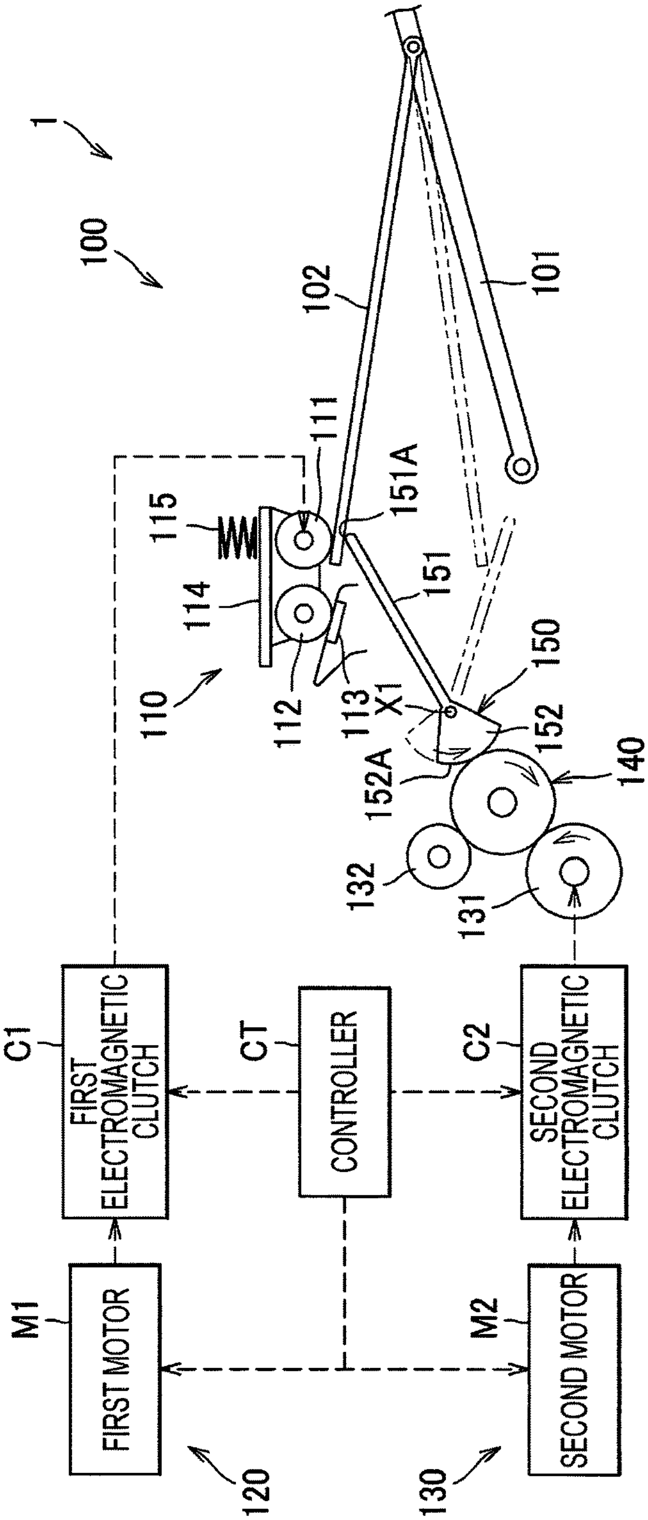
FIG. 4A is a diagram showing a sheet conveyance device.

As shown in FIG. 4A, the image forming apparatus 1 further includes a sheet conveyance device 100 and a controller CT. The sheet conveyance device 100 includes a manual feed tray 101, a pressure plate 102, a second supply mechanism 110, a roller drive mechanism 120, and a pressure plate drive mechanism 130.

Figure 3:
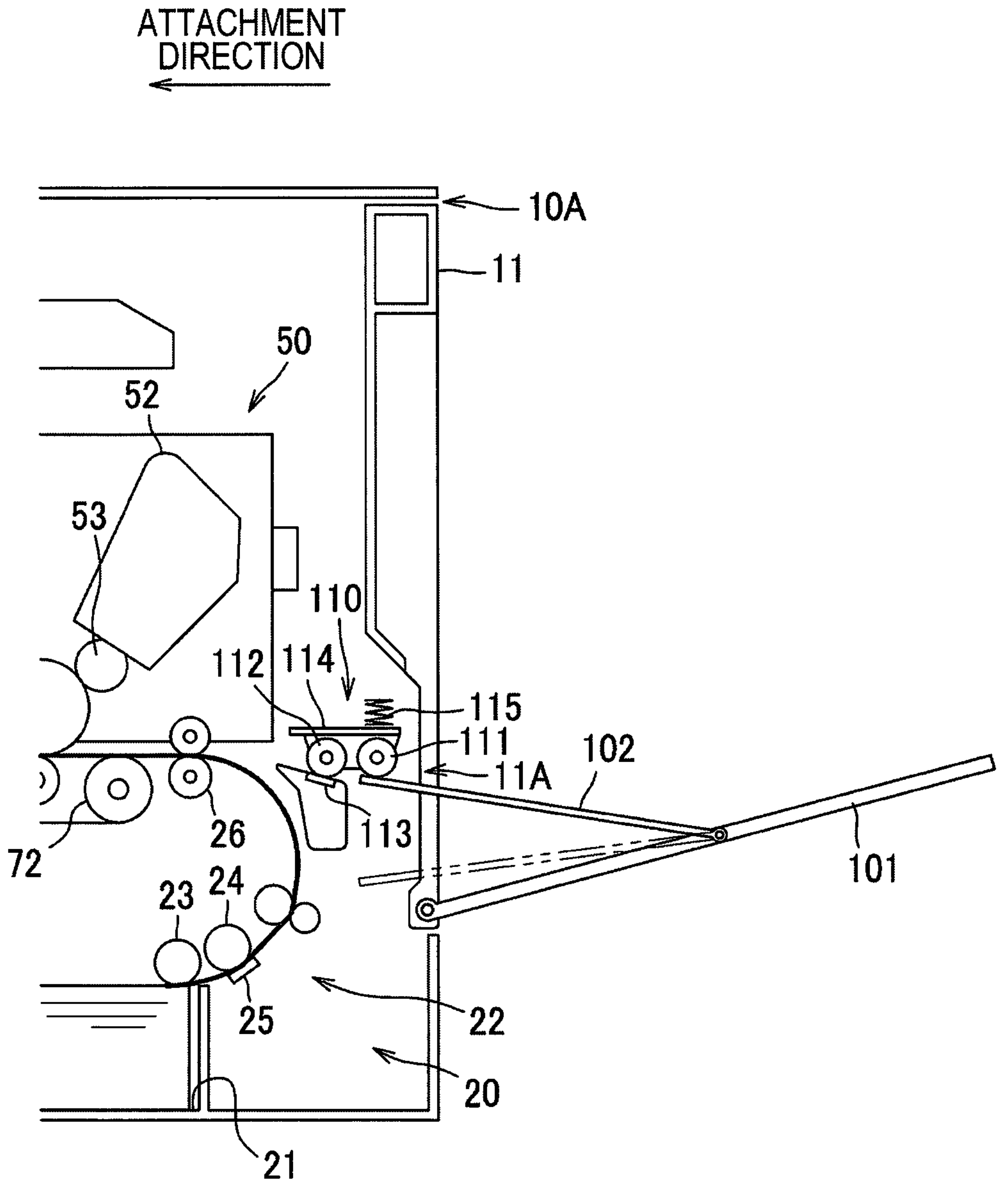
FIG. 3 is a diagram showing the image forming apparatus in a state where a manual feed tray is open.

As shown in FIG. 3, the manual feed tray 101 is a tray on which sheets S are set. The manual feed tray 101 is located on a side surface of the main housing 10. The manual feed tray 101 is rotatably attached to the cover 11. The manual feed tray 101 is rotatable between a closed position shown in FIG. 1 and an open position shown in FIG. 3.

As shown in FIG. 3, the cover 11 has an opening 11A through which the sheet S passes. The manual feed tray 101 closes the opening 11A when located at the closed position. The manual feed tray 101 opens the opening 11A when located at the open position.

The pressure plate 102 is movable between a contact position indicated by a solid line in FIG. 3 and a separated position indicated by a two-dot chain line. Specifically, the pressure plate 102 is rotatable with respect to the manual feed tray 101, and is rotatable between the contact position and the separated position. Here, the contact position changes depending on the number of sheets S on the pressure plate 102.

When the pressure plate 102 is located at the contact position, the pressure plate 102 causes the sheet S on the manual feed tray 101 to contact a second pickup roller 111 described later. When the pressure plate 102 is located at the separated position, the pressure plate 102 causes the sheet S on the manual feed tray 101 to separate from the second pickup roller 111.

The second supply mechanism 110 includes the second pickup roller 111 as an example of a supply roller, a second separation roller 112, a second separation pad 113, a holder 114, and a spring 115.

The second pickup roller 111 is a roller for conveying the sheet S on the manual feed tray 101. The second pickup roller 111 is located below the opening 10A of the main housing 10.

The second separation roller 112 and the second separation pad 113 have the function of separating the sheets S sent from the second pickup roller 111 one sheet at a time. The second separation roller 112 conveys the sheet S toward the registration roller 26.

The second pickup roller 111 and the second separation roller 112 are rotatably attached to the holder 114. The holder 114 is rotatably attached to the main housing 10. The holder 114 rotates (pivots) about the rotation axis of the second separation roller 112, for example.

The spring 115 is located between the main housing 10 and the holder 114. The spring 115 urges the second pickup roller 111 toward the pressure plate 102.

As shown in FIG. 4A, the roller drive mechanism 120 is a mechanism for driving the second pickup roller 111. The roller drive mechanism 120 includes a first motor M1 and a first electromagnetic clutch C1.

The first electromagnetic clutch C1 is an electromagnetic clutch that allows or cuts off transmission of drive force from the first motor M1 to the second pickup roller 111. The first motor M1 and the first electromagnetic clutch C1 are connected directly or indirectly via a particular number of gears.

The second pickup roller 111 has a gear (not shown) at its axial end. The gear at the end of the second pickup roller 111 and the first electromagnetic clutch C1 are connected directly or indirectly via a particular number of gears. Here, the axial direction is the same direction as the width direction of the sheet S.

The second separation roller 112 has a gear (not shown) at its axial end. The gear at the end of the second separation roller 112 and the gear at the end of the second pickup roller 111 are connected via a particular number of gears.

The pressure plate drive mechanism 130 is a mechanism for driving the pressure plate 102. The pressure plate drive mechanism 130 includes a second motor M2, a second electromagnetic clutch C2, an input gear 131, a planetary gear mechanism 140, a torque limiter 132, and a push-up member 150.

The second electromagnetic clutch C2 is an electromagnetic clutch that allows or cuts off transmission of drive force from the second motor M2 to the input gear 131. The second motor M2 and the second electromagnetic clutch C2 are connected directly or indirectly via a particular number of gears. The second electromagnetic clutch C2 and the input gear 131 are connected directly or indirectly via a particular number of gears.

Figure 4B:
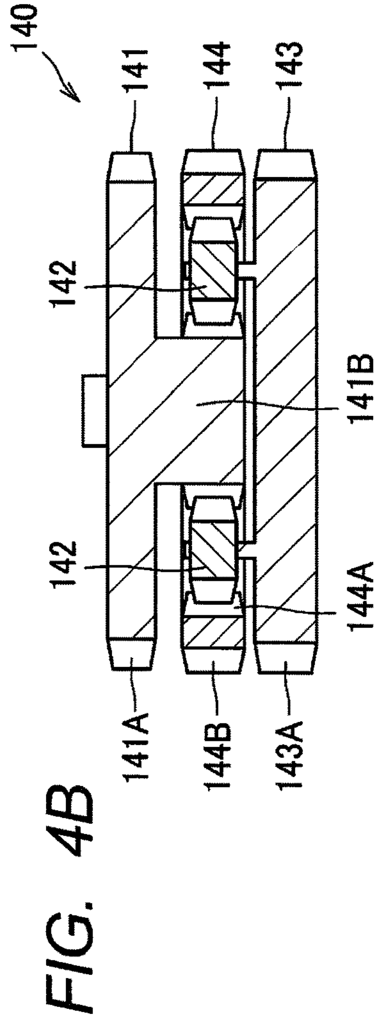
FIG. 4B is a cross-sectional view showing a planetary gear mechanism.

As shown in FIG. 4B, the planetary gear mechanism 140 includes a sun gear 141, a plurality of planetary gears 142, a planetary carrier 143, and an outer gear 144. The planetary gear mechanism 140 has a structure in which when rotation of one of the three components of the sun gear 141, the planetary carrier 143, and the outer gear 144 is stopped, the remaining components rotate in an interlocking manner.

The sun gear 141 is a two-stage gear. The sun gear 141 includes a large-diameter gear portion 141A and a small-diameter gear portion 141B having a smaller diameter than the large-diameter gear portion 141A.

The plurality of planetary gears 142 are arranged around the small-diameter gear portion 141B and engage with the small-diameter gear portion 141B. The plurality of planetary gears 142 are rotatably attached to the planetary carrier 143.

The planetary carrier 143 is rotatable about the rotation axis of the sun gear 141. The planetary carrier 143 has gear teeth 143A on its outer circumferential surface.

The outer gear 144 is a ring-shaped member. The outer gear 144 has internal teeth 144A located on the inner circumferential surface and external teeth 144B located on the outer circumferential surface. The internal teeth 144A engage with the planetary gears 142.

Figure 4C:
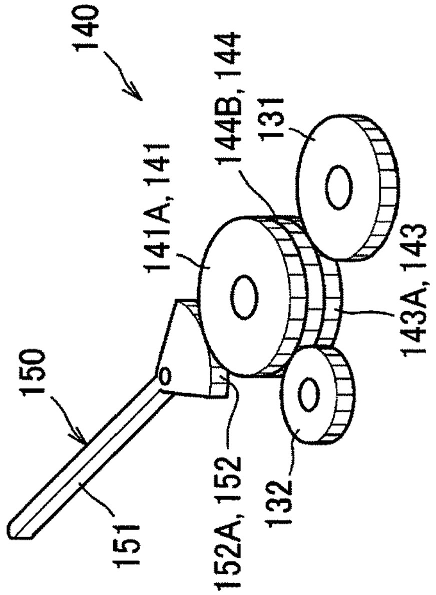
FIG. 4C is a perspective view showing a structure around the planetary gear mechanism.

As shown in FIG. 4C, the input gear 131 engages with the gear teeth 143A of the planetary carrier 143. The torque limiter 132 engages with the external teeth 144B of the outer gear 144. Gear teeth 152A described later of the push-up member 150 engage with the large-diameter gear portion 141A of the sun gear 141.

That is, the input gear 131 is connected to the planetary carrier 143 as an example of a first component. The torque limiter 132 is connected to the outer gear 144 as an example of a second component. The push-up member 150 is connected to the sun gear 141 as an example of a third component. Note that connection ("connected to") includes direct connection as well as indirect connection via a particular number of gears.

The torque limiter 132 is rotatable when a torque greater than or equal to a threshold value is applied. When the torque applied from the outer gear 144 is less than the threshold value, the torque limiter 132 does not rotate to restrict the rotation of the outer gear 144. The threshold value of the torque limiter 132 is set to a value corresponding to the force pressing the pressure plate 102 against the second pickup roller 111. The torque limiter 132 functions as a torque limiter in both forward and reverse directions.

The push-up member 150 is a member that pushes up the pressure plate 102 from the separated position to the contact position. The push-up member 150 is rotatable about a first axis X1 between a push-up position indicated by a solid line and a retracted position indicated by a two-dot chain line. The push-up position is the position of the push-up member 150 when the pressure plate 102 is located at the contact position. The retracted position is the position of the push-up member 150 when the pressure plate 102 is located at the separated position. When located at the retracted position, the push-up member 150 is positioned by contacting a portion of the main housing 10.

The push-up member 150 includes a first portion 151 extending from the first axis X1 toward the pressure plate 102 and a second portion 152 having a fan shape whose center is the first axis X1.

Figure 5:
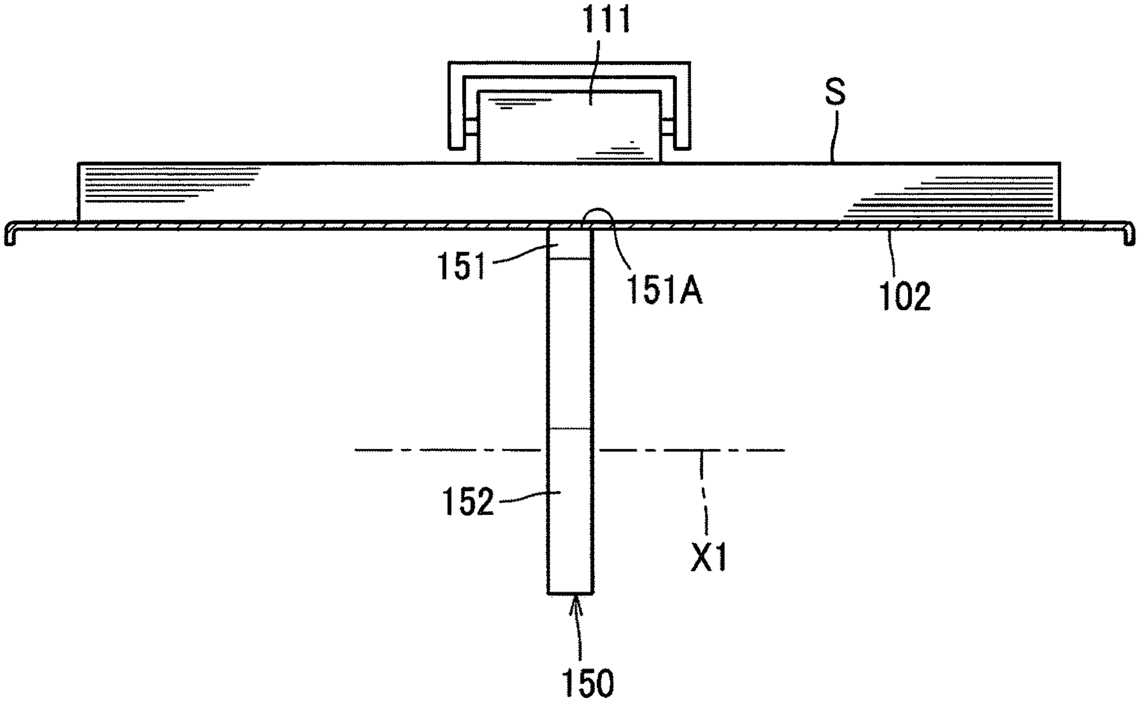
FIG. 5 is a diagram showing a positional relationship between a contact portion of a push-up member and a second pickup roller.

The first portion 151 has a contact portion 151A that contacts the pressure plate 102 when the pressure plate 102 is located at the contact position. As shown in FIG. 5, the contact portion 151A of the push-up member 150 is located within the range of the second pickup roller 111 in the width direction of the sheet S. Specifically, in the width direction of the sheet S, the center of the second pickup roller 111 is located within the range of the contact portion 151A. More specifically, in the width direction of the sheet S, the center of the second pickup roller 111 is located at the same position as the center of the contact portion 151A. In the present embodiment, the second pickup roller 111 is located at the center in the width direction with respect to the sheet S on the manual feed tray 101.

As shown in FIG. 4A, the second portion 152 extends from the first axis X1 toward the opposite side of the first portion 151 so as to gradually widen. As shown in FIG. 4C, the second portion 152 has gear teeth 152A on its outer circumferential surface. The gear teeth 152A engage with the large-diameter gear portion 141A of the sun gear 141.

With the configuration described above, the drive force transmitted from the input gear 131 to the planetary gear mechanism 140 is output to either the torque limiter 132 or the push-up member 150. Specifically, in a case where a drive force is input to the input gear 131 to rotate the input gear 131 in the direction indicated by the arrow in the figure (hereinafter also referred to as "first rotation direction") when the pressure plate 102 is located at the separated position, the rotation of the outer gear 144 is stopped by the torque limiter 132 and thus the sun gear 141 rotates in conjunction with the planetary carrier 143. Thereby, the push-up member 150 is rotated from the retracted position to the push-up position by the drive force input from the input gear 131, and thus the pressure plate 102 moves from the separated position to the contact position.

When the pressure plate 102 reaches the contact position, the rotation of the push-up member 150 is stopped. This stops the rotation of the sun gear 141 connected to the push-up member 150, and thus the outer gear 144 rotates in conjunction with the planetary carrier 143 that rotates by being connected to the input gear 131, and the torque limiter 132 is rotated by the drive force input from the input gear 131.

In a case where a drive force is input to the input gear 131 in a second rotation direction opposite to the first rotation direction when the pressure plate 102 is located at the contact position, rotation of the outer gear 144 is stopped by the torque limiter 132 and the sun gear 141 rotates in conjunction with the planetary carrier 143. Since the push-up member 150 rotates from the push-up position to the retracted position by the drive force input from the input gear 131, the pressure plate 102 moves from the contact position to the separated position.

When the push-up member 150 reaches the retracted position, the push-up member 150 contacts the main housing 10, and the rotation of the push-up member 150 is stopped. Since this stops the rotation of the sun gear 141 connected to the push-up member 150, the outer gear 144 rotates in conjunction with the planetary carrier 143 that rotates by being connected to the input gear 131, and the torque limiter 132 is rotated by the drive force input from the input gear 131.

The controller CT includes a CPU, a ROM, a RAM, a non-volatile memory, and so on, and is configured to perform various controls based on programs prepared in advance. When printing a plurality of sheets S, the controller CT has a function of conveying a plurality of sheets S by moving the pressure plate 102 from the separated position to the contact position and then intermittently driving the second pickup roller 111 without moving the pressure plate 102 from the contact position. Specifically, as the number of sheets S stacked on the pressure plate 102 decreases, the pressure plate 102 relatively rises.

Specifically, in response to receiving a print instruction for printing a plurality of sheets S, the controller CT rotates the second motor M2 in the forward direction, supplies current to the second electromagnetic clutch C2 to be in the transmission state to transmit the drive force of the second motor M2 to the input gear 131, thereby rotating the input gear 131 in the first rotation direction. This causes the pressure plate 102 to move from the separated position to the contact position, as described above.

After the pressure plate 102 has moved to the contact position, the controller CT stops the second motor M2 and stops the supply of current to the second electromagnetic clutch C2 to be in the cut-off state. Thereby, the pressure plate 102 is maintained at the contact position.

After that, the controller CT drives the first motor M1 and controls the first electromagnetic clutch C1 according to the number of sheets S, thereby intermittently driving the second pickup roller 111. Since the second pickup roller 111 is intermittently driven in a state where the pressure plate 102 is maintained at the contact position, a plurality of sheets S are conveyed without moving the pressure plate 102 from the contact position.

In a case where the drive force of the first motor M1 is used for other components such as the photosensitive drum 51, the driving timing of the first motor M1 may be before the timing at which the second pickup roller 111 is first rotated for the first sheet S. In this case, the second pickup roller 111 may be first rotated for the first sheet S by controlling only the first electromagnetic clutch C1.

After printing is completed, the controller CT performs processing for returning the pressure plate 102 from the contact position to the separated position. More specifically, the controller CT reversely rotates the second motor M2 and applies a current to the second electromagnetic clutch C2 to be in the transmission state, thereby transmitting the drive force of the second motor M2 to the input gear 131 so that the input gear 131 is rotated in the second rotation direction. Thereby, the pressure plate 102 moves from the contact position to the separated position, as described above.

After the pressure plate 102 has moved to the separated position, the controller CT stops the second motor M2 and stops the supply of current to the second electromagnetic clutch C2 to be in the cut-off state. Thereby, the pressure plate 102 is maintained at the separated position.

As described above, according to the first embodiment, the following effects are obtained.

When printing a plurality of sheets S, the second pickup roller 111 is intermittently driven without moving the pressure plate 102 from the contact position. This suppresses the generation of noise due to movement of the pressure plate 102 when printing a plurality of sheets S.

As shown in FIG. 5, in the width direction of the sheet S, the contact portion 151A of the push-up member 150 is located within the range of the second pickup roller 111. Thus, when the pressure plate 102 is pushed up to the contact position by the push-up member 150, bending (deflection) of the pressure plate 102 with the second pickup roller 111 as a fixed point is suppressed.

Second Embodiment

Next, a second embodiment of the present disclosure will be described in detail with reference to the drawings as appropriate. Since the present embodiment partially modifies the structure of the pressure plate drive mechanism 130 according to the first embodiment described above, the same reference numerals are given to components that are substantially the same as those of the first embodiment and descriptions thereof are omitted.

Figure 6:
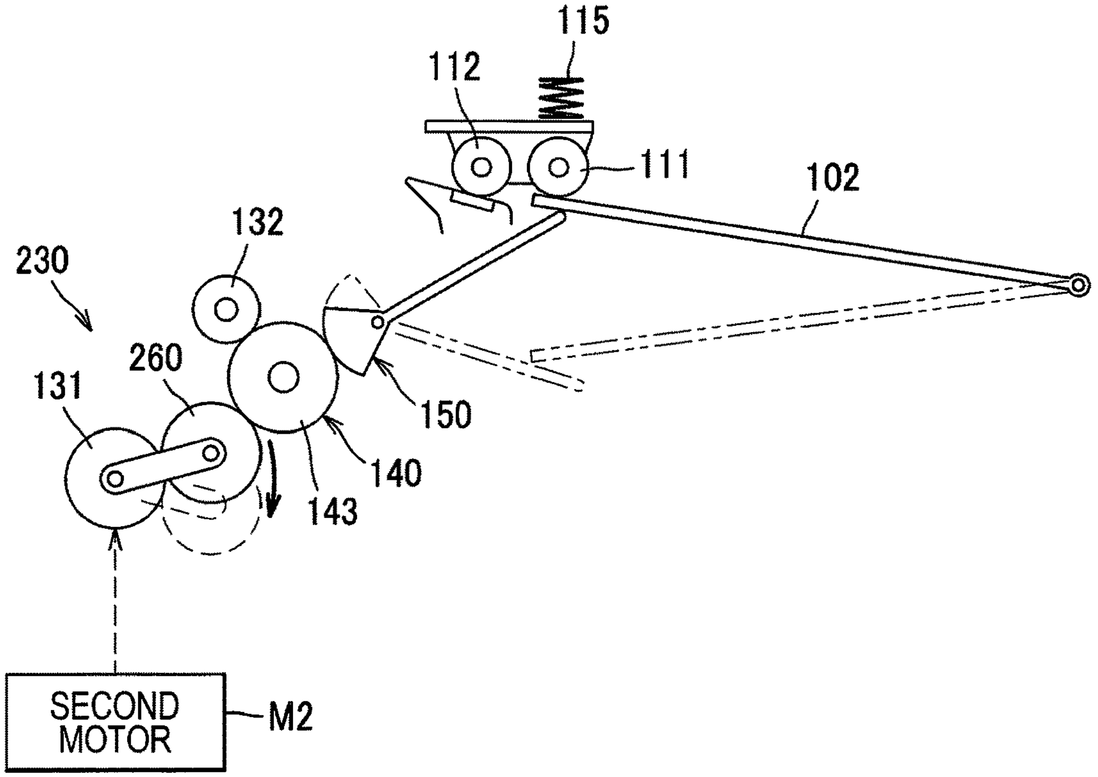
FIG. 6 is a diagram showing a pressure plate drive mechanism.

As shown in FIG. 6, a pressure plate drive mechanism 230 according to the second embodiment includes a pendulum gear 260 instead of the second electromagnetic clutch C2 of the pressure plate drive mechanism 130 according to the first embodiment. The pendulum gear 260 is rotatable around the input gear 131 while engaging with the input gear 131. The pendulum gear 260 is rotatable between a transmission position indicated by a solid line in FIG. 6 and a cutoff position indicated by a two-dot chain line.

When the pendulum gear 260 is located at the transmission position, the pendulum gear 260 transmits drive force from the second motor M2 to the planetary carrier 143. Specifically, when the pendulum gear 260 is located at the transmission position, the pendulum gear 260 engages with the planetary carrier 143.

When the pendulum gear 260 is located at the cutoff position, the pendulum gear 260 cuts off the drive force from the second motor M2 to the planetary carrier 143. Specifically, when the pendulum gear 260 is located at the cutoff position, the pendulum gear 260 is separated from the planetary carrier 143.

The pendulum gear 260 is configured to be switched between the transmission position and the cutoff position by a solenoid actuator (not shown) and so on. When transmitting the drive force of the second motor M2 to the planetary carrier 143, the controller CT controls the pendulum gear 260 to rotate from the cutoff position to the transmission position.

The pendulum gear 260 may move from the cutoff position to the transmission position when the second motor M2 rotates in the forward direction, and may move from the transmission position to the cutoff position when the second motor M2 rotates in the reverse direction. In this case, rotation of the second motor M2 in the reverse direction may disconnect the pendulum gear 260 from the planetary carrier 143, and the planetary carrier 143 may idly rotate due to the force by own weight of the pressure plate 102, and the pressure plate 102 may move from the contact position to the separated position by its own weight.

As described above, also in the second embodiment, by controlling the position of the pendulum gear 260 by the controller CT, the pressure plate 102 is moved up and down in the same manner as in the first embodiment. Alternatively, the pendulum gear may be movable linearly.

Third Embodiment

Next, a third embodiment of the present disclosure will be described in detail with reference to the drawings as appropriate. Since this embodiment is obtained by modifying the structure of the pressure plate drive mechanism 130 according to the first embodiment, the same components as those in the first embodiment are denoted by the same reference numerals and descriptions thereof are omitted.

Figure 7:
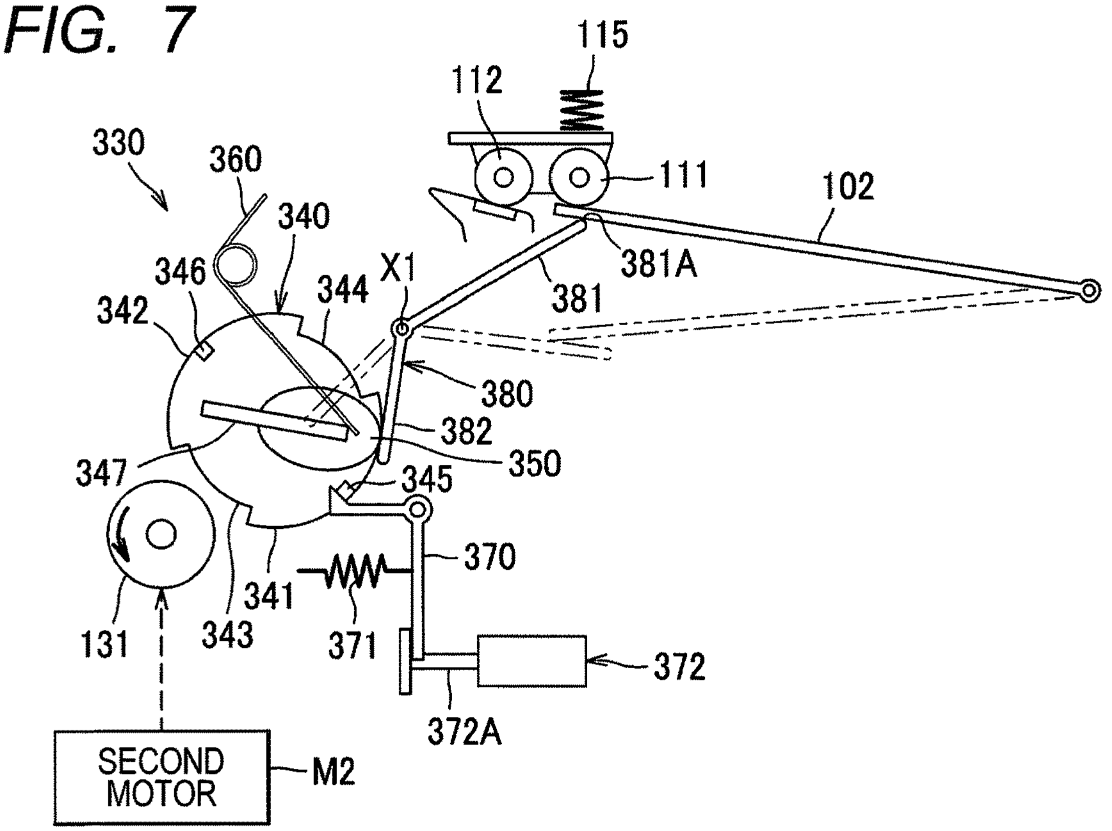
FIG. 7 is a view showing a pressure plate drive mechanism in a state where a cam is located at a first cam position.

As shown in FIG. 7, a pressure plate drive mechanism 330 according to the third embodiment includes the second motor M2 and the input gear 131 substantially same as those of the first embodiment, and a sector gear 340, a cam 350, a spring 360, a sector lever 370, and a push-up member 380 different from the first embodiment.

The sector gear 340 has a first tooth portion 341, a second tooth portion 342, a first toothless portion 343, and a second toothless portion 344 on the outer circumferential surface. The first tooth portion 341 and the second tooth portion 342 are portions that are engageable with the input gear 131. The first toothless portion 343 and the second toothless portion 344 are portions that are not engageable with the input gear 131. The first tooth portion 341, the second tooth portion 342, the first toothless portion 343, and the second toothless portion 344 are arranged on the outer circumferential surface of the sector gear 340 in the order of the first toothless portion 343, the first tooth portion 341, the second toothless portion 344, and the second tooth portion 342.

Specifically, toward the upstream side in the rotation direction of the sector gear 340 (see FIG. 8), the first toothless portion 343, the first tooth portion 341, the second toothless portion 344, and the second tooth portion 342 are arranged in this order. Here, the rotation direction of the sector gear 340 is the rotation direction of the sector gear 340 when the sector gear 340 receives the drive force from the input gear 131, and is the clockwise direction in the figure.

The first toothless portion 343 is located upstream of the second tooth portion 342 in the rotation direction of the sector gear 340. The first tooth portion 341 is located upstream of the first toothless portion 343 in the rotation direction of the sector gear 340. The second toothless portion 344 is located upstream of the first tooth portion 341 in the rotation direction of the sector gear 340. The second tooth portion 342 is located upstream of the second toothless portion 344 in the rotation direction of the sector gear 340.

The sector gear 340 has a first protrusion 345, a second protrusion 346, a spring contact portion 347, and a cam 350. The first protrusion 345 and the second protrusion 346 are protrusions with which the sector lever 370 engages. The spring contact portion 347 is a portion with which the spring 360 makes contact.

Figure 9:
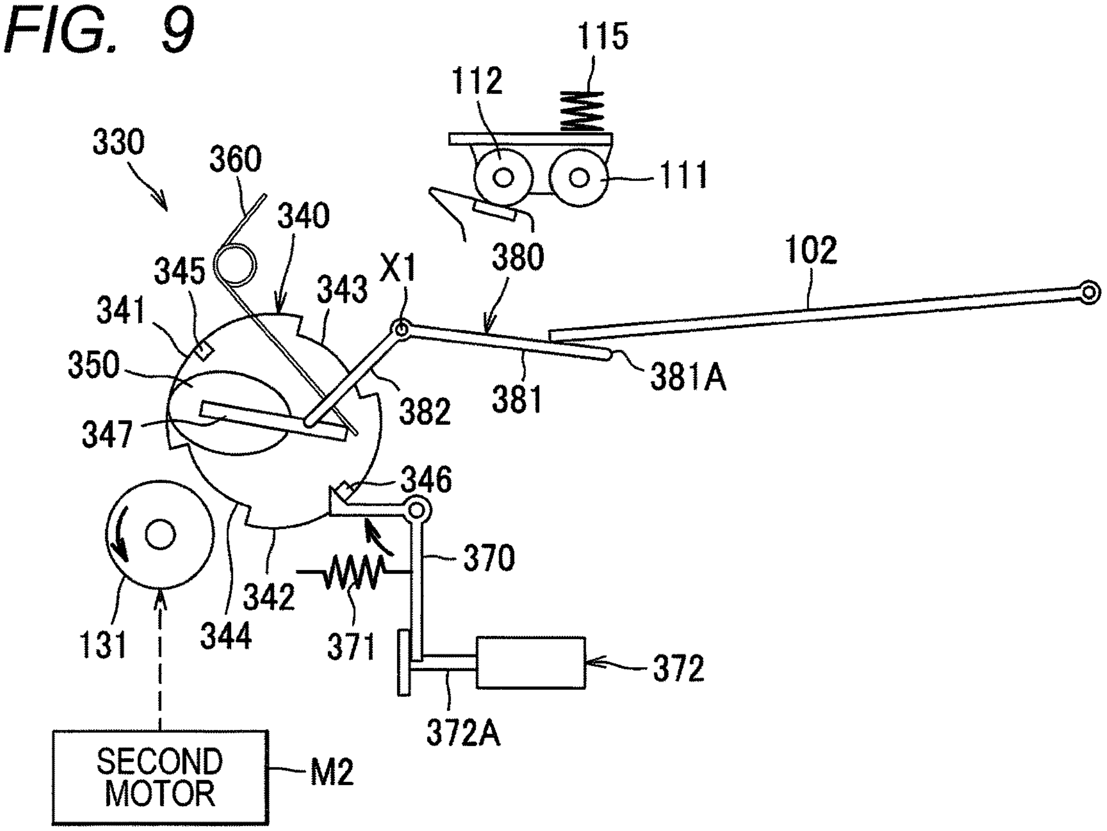
FIG. 9 is a diagram showing a state where the cam is located at the second cam position.

When the sector lever 370 engages with the first protrusion 345, the first toothless portion 343 faces the input gear 131 and no drive force is transmitted from the input gear 131 to the sector gear 340. As shown in FIG. 9, when the sector lever 370 engages with the second protrusion 346, the second toothless portion 344 faces the input gear 131 and no drive force is transmitted from the input gear 131 to the sector gear 340.

The cam 350 is a cam that moves the push-up member 380. The cam 350 is fixed or integrally formed with the sector gear 340. The cam 350 rotates together with the sector gear 340. The cam 350 is alternately switchable between a first cam position shown in FIG. 7 and a second cam position shown in FIG. 9.

The push-up member 380 is rotatable about the first axis X1 between a push-up position indicated by a solid line in the figure and a retracted position indicated by a two-dot chain line. The push-up position is the position of the push-up member 380 when the pressure plate 102 is located at the contact position. The retracted position is the position of the push-up member 380 when the pressure plate 102 is located at the separated position. When the push-up member 380 is located at the retracted position, the push-up member 380 is positioned by contacting a portion of the main housing 10. The push-up member 380 is urged from the push-up position toward the retracted position by a spring (not shown).

The push-up member 380 has a first portion 381 substantially same as the first portion 151 of the first embodiment and a second portion 382 different from the first embodiment. A contact portion 381A of the first portion 381 for contacting the pressure plate 102 is located within the range of the second pickup roller 111 in the width direction of the sheet S. The second portion 382 extends from the first axis X1 toward the cam 350 located at the first cam position.

When the cam 350 is located at the first cam position, the cam 350 contacts the second portion 382 to hold the push-up member 380 at the push-up position. When the cam 350 rotates from the first cam position to the second cam position, the cam 350 separates from the second portion 382 and the push-up member 380 rotates from the push-up position to the retracted position by a spring (not shown).

The spring 360 urges the sector gear 340 in the rotation direction of the sector gear 340. The spring 360 urges the spring contact portion 347 in the rotation direction regardless of whether the cam 350 is located at the first cam position or the second cam position.

Figure 8:
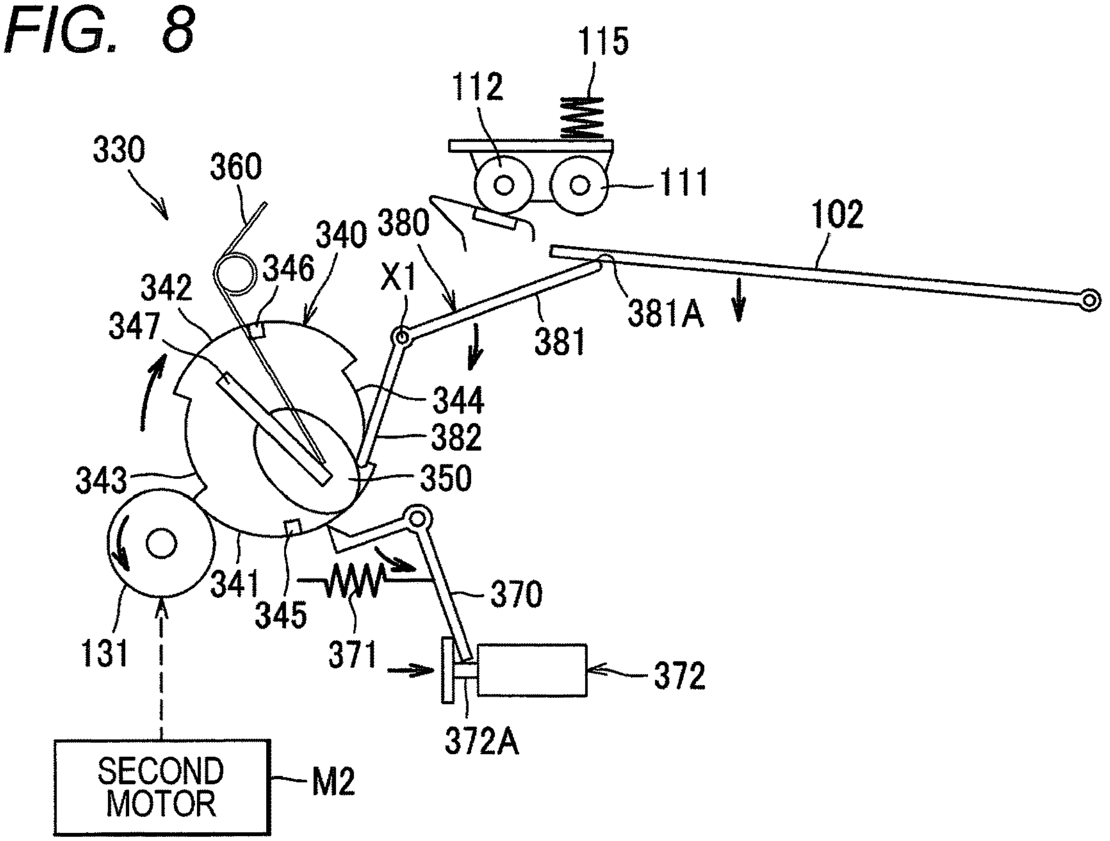
FIG. 8 is a diagram showing a state where the cam has rotated from the first cam position toward a second cam position.

The sector lever 370 is rotatable between a rotation restricting position shown in FIG. 7 and a rotation allowing position shown in FIG. 8. The sector lever 370 is configured to engage with the first protrusion 345 or the second protrusion 346 of the sector gear 340 when the sector lever 370 is located at the rotation restricting position. By engaging with the first protrusion 345 or the second protrusion 346, the sector lever 370 stops the rotation of the sector gear 340 due to the urging force of the spring 360.

As shown in FIG. 8, the sector lever 370 separates from the first protrusion 345 or the second protrusion 346 of the sector gear 340 when the sector lever 370 is located at the rotation allowing position. By separating from the first protrusion 345 or the second protrusion 346, the sector lever 370 allows rotation of the sector gear 340 due to the urging force of the spring 360.

The sector lever 370 is switchable between the rotation restricting position and the rotation allowing position by a spring 371 and a solenoid actuator 372. The spring 371 urges the sector lever 370 from the rotation allowing position toward the rotation restricting position. The solenoid actuator 372 includes a piston 372A that engages with the sector lever 370. The piston 372A is movable between an advanced position shown in FIG. 7 and a retracted position shown in FIG. 8.

As shown in FIG. 7, in a state where the sector lever 370 is located at the rotation restricting position and engages with the first protrusion 345, the first toothless portion 343 faces the input gear 131 and the pressure plate 102 is located at the contact position. As shown in FIG. 9, in a state where the sector lever 370 is located at the rotation restricting position and engages with the second protrusion 346, the second toothless portion 344 faces the input gear 131 and the pressure plate 102 is located at the separated position.

As shown in FIG. 7, when rotating the pressure plate 102 from the contact position to the separated position, the controller CT drives the second motor M2 in one direction and moves the piston 372A of the solenoid actuator 372 from the advanced position to the retracted position. Then, as shown in FIG. 8, the sector lever 370 moves to the rotation allowing position and separates from the first protrusion 345. When the sector lever 370 separates from the first protrusion 345, the sector gear 340 rotates due to the urging force of the spring 360 and the first tooth portion 341 of the sector gear 340 engages with the input gear 131.

When the first tooth portion 341 engages with the input gear 131, the sector gear 340 rotates and the cam 350 rotates in a direction away from the push-up member 380. Thereby, the push-up member 380 is rotated from the push-up position toward the retracted position by a spring (not shown), and the pressure plate 102 supported by the push-up member 380 rotates from the contact position toward the separated position.

Before the cam 350 reaches the second cam position shown in FIG. 9, the controller CT switches the piston 372A of the solenoid actuator 372 from the retracted position to the advanced position, so that the sector lever 370 is located at the rotation restricting position. As shown in FIG. 9, when the cam 350 reaches the second cam position, the sector lever 370 engages with the second protrusion 346 of the sector gear 340 and the sector gear 340 stops.

Further, when the cam 350 reaches the second cam position, since the push-up member 380 rotates to the retracted position, the pressure plate 102 moves to the separated position. That is, when rotating the pressure plate 102 from the contact position to the separated position, the drive force input to the input gear 131 rotates the cam 350 from the first cam position to the second cam position via the sector gear 340, and thus the push-up member 380 causes the pressure plate 102 to move from the contact position to the separated position.

As shown in FIG. 9, when rotating the pressure plate 102 from the separated position to the contact position, the controller CT drives the second motor M2 in one direction and switches the piston 372A of the solenoid actuator 372 from the advanced position to the retracted position. That is, in the third embodiment, the second motor M2 is rotated in the same direction without switching the rotation direction of the second motor M2, both when the pressure plate 102 is lowered and when the pressure plate 102 is raised.

Figure 10:
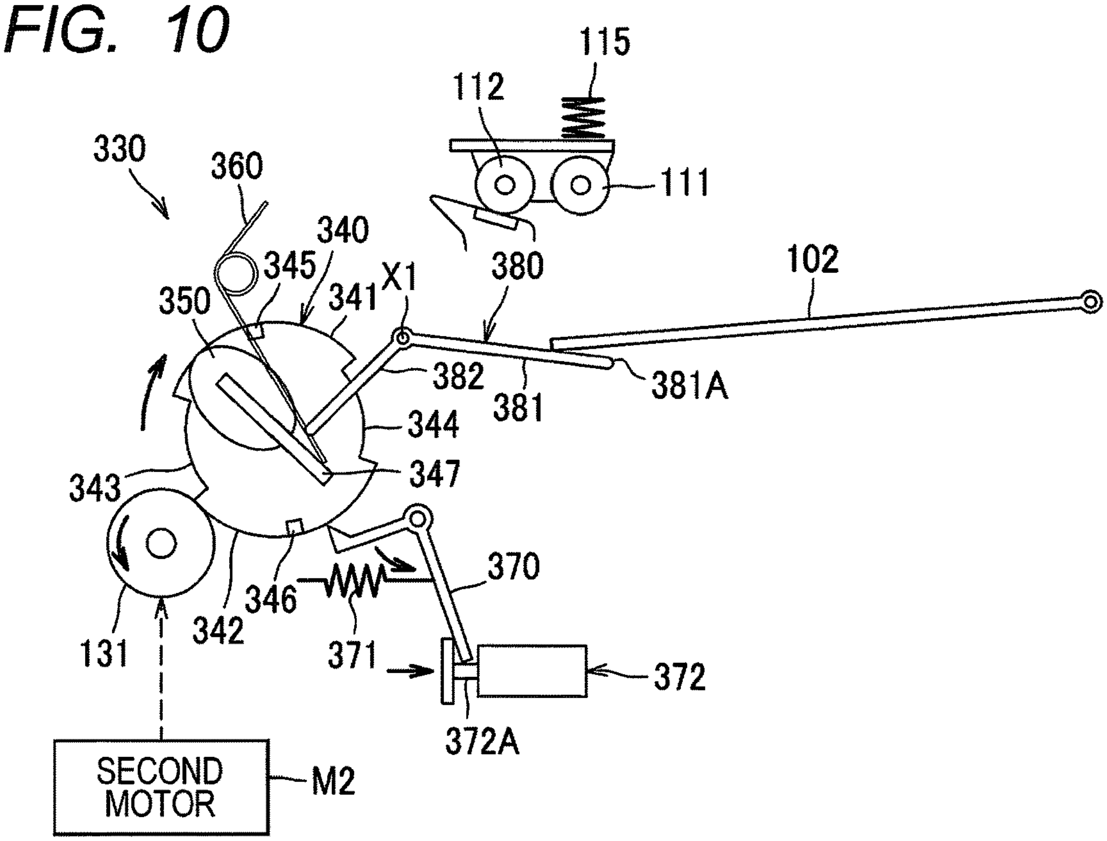
FIG. 10 is a diagram showing a state where the cam has rotated from the second cam position toward the first cam position.

When the piston 372A is switched from the advanced position to the retracted position, as shown in FIG. 10, the sector lever 370 moves to the rotation allowing position and separates from the second protrusion 346. When the sector lever 370 separates from the second protrusion 346, the sector gear 340 rotates due to the urging force of the spring 360 and the second tooth portion 342 of the sector gear 340 engages with the input gear 131.

When the second tooth portion 342 engages with the input gear 131, the sector gear 340 rotates and the cam 350 rotates in a direction approaching the push-up member 380. Thereby, since the cam 350 pushes the push-up member 380 against the urging force of the spring (not shown), the push-up member 380 rotates from the retracted position toward the push-up position, and the pressure plate 102 supported by the push-up member 380 rotates from the separated position toward the contact position.

Before the cam 350 reaches the first cam position shown in FIG. 7, the controller CT switches the piston 372A of the solenoid actuator 372 from the retracted position to the advanced position, so that the sector lever 370 is located at the rotation restricting position. Thereby, as shown in FIG. 7, when the cam 350 reaches the first cam position, the sector lever 370 engages with the first protrusion 345 of the sector gear 340 and the sector gear 340 stops.

When the cam 350 reaches the first cam position, the push-up member 380 rotates to the push-up position, and thus the pressure plate 102 moves to the contact position. That is, when rotating the pressure plate 102 from the separated position to the contact position, the drive force input to the input gear 131 rotates the cam 350 from the second cam position to the first cam position via the sector gear 340, and thus the push-up member 380 causes the pressure plate 102 to move from the separated position to the contact position.

As described above, since the pressure plate 102 is maintained at the contact position also in the third embodiment, the same effects as in the first embodiment are obtained.

Fourth Embodiment

Next, a fourth embodiment of the present disclosure will be described in detail with reference to the drawings as appropriate. Since this embodiment differs from the first embodiment described above in the structure of the sheet conveyance device, components that are substantially the same as those of the first embodiment are denoted by the same reference numerals, and descriptions thereof are omitted.

Figure 11:
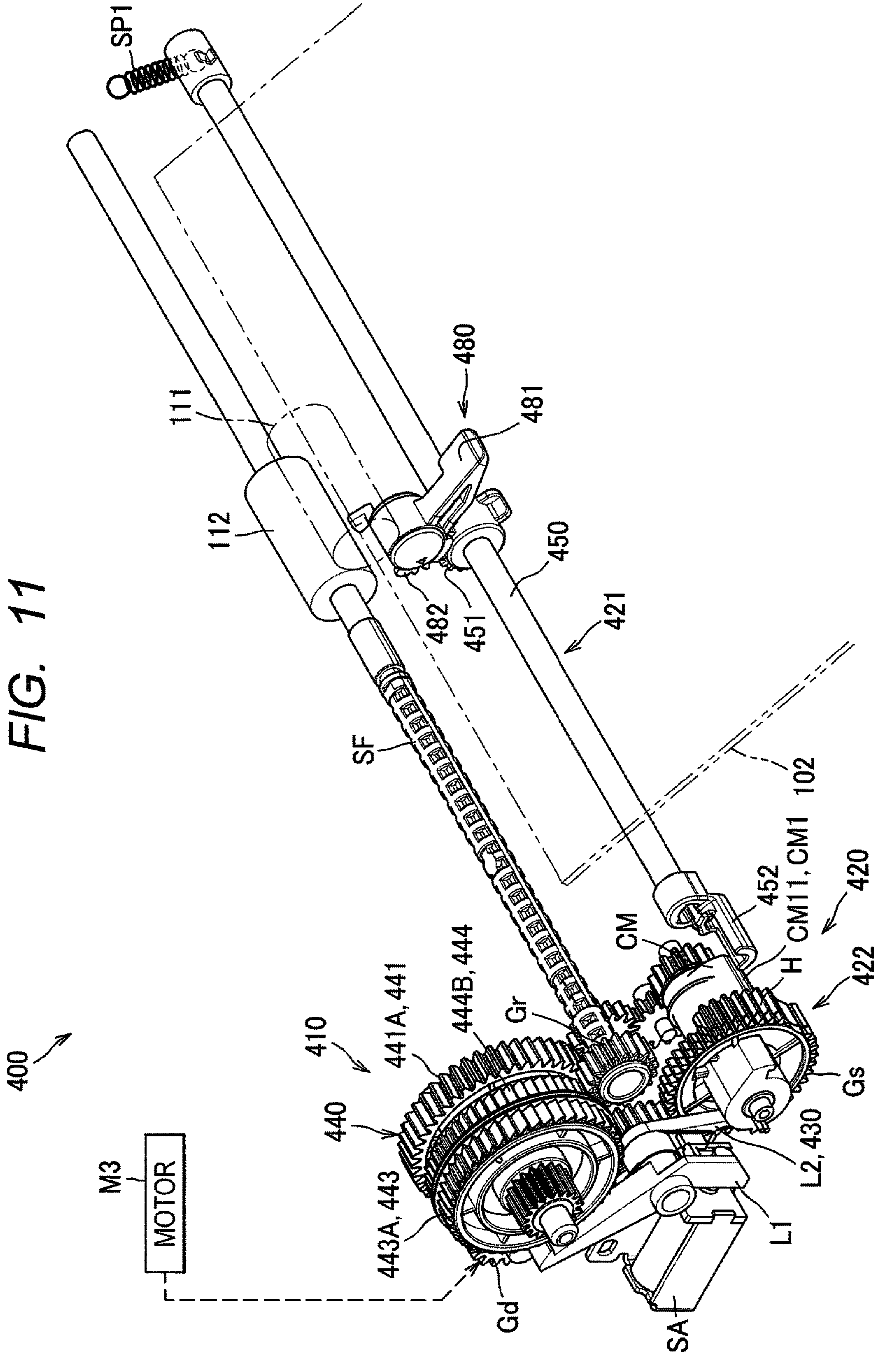
FIG. 11 is a perspective view showing a sheet conveyance device in a state where a push-up member is located at a retracted position.
Figure 13:
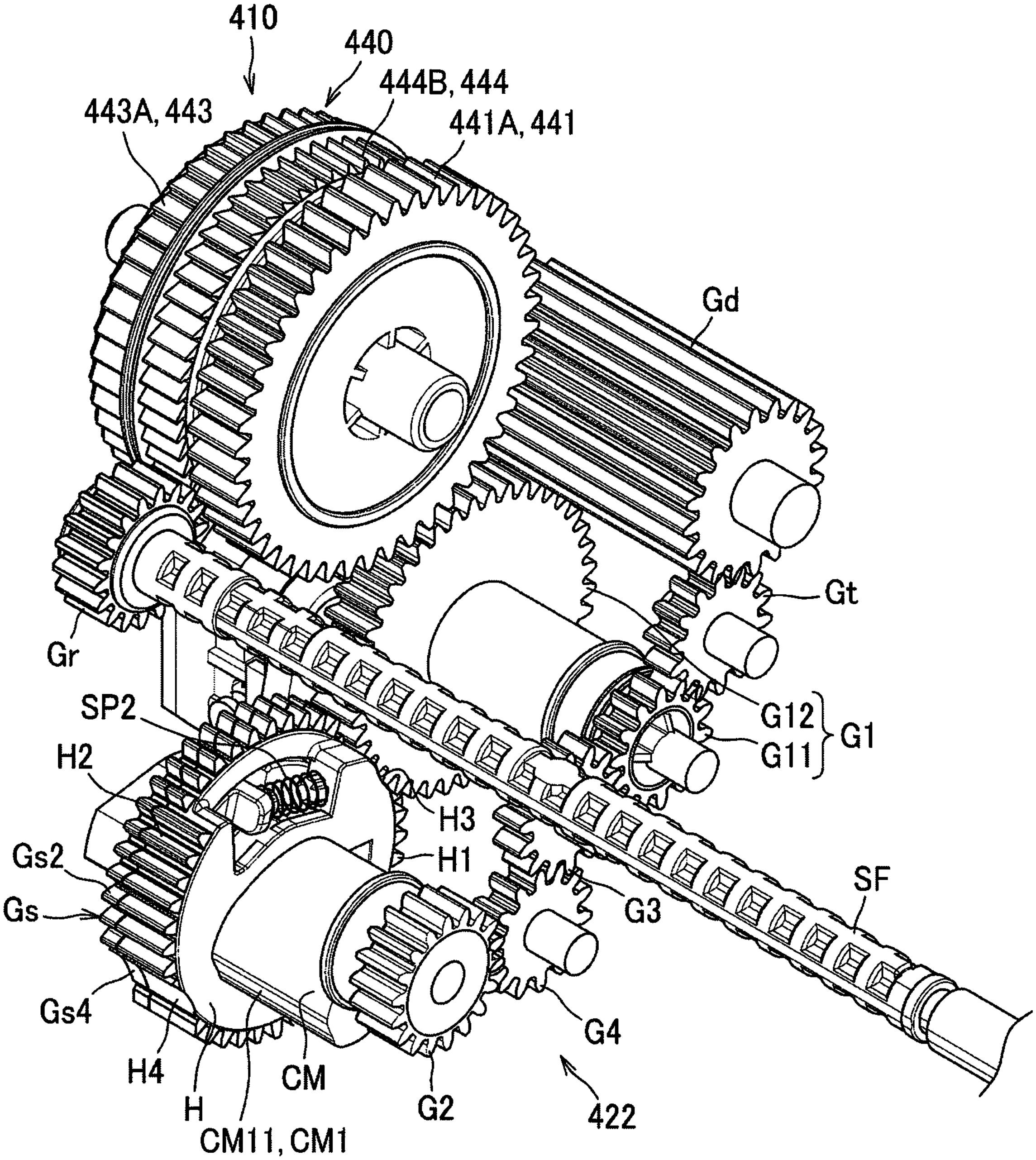
FIG. 13 is a perspective view showing the structure around an operating mechanism.

As shown in FIGS. 11 and 13, a sheet conveyance device 400 according to the fourth embodiment includes a motor M3, a drive gear Gd, a transmission switching mechanism 410, a pressure plate operating mechanism 420, and a switching mechanism 430. In the sheet conveyance device 400 according to the fourth embodiment, the drive force of one motor M3 is used to drive the second pickup roller 111 and to rotate a push-up member 480 described later.

Specifically, the controller CT according to the fourth embodiment rotates the motor M3 forward when conveying the sheet S or when raising the pressure plate 102. The motor M3 is a stepping motor. The controller CT rotates the motor M3 reversely by a particular amount when lowering the pressure plate 102.

The drive gear Gd is connected to the motor M3 directly or indirectly via a particular number of gears. As shown in FIG. 13, the drive gear Gd engages with a sun gear 441 of the transmission switching mechanism 410 described later, and also engages with a transmission gear Gt of the pressure plate operating mechanism 420 described later.

As shown in FIGS. 11 and 13, the transmission switching mechanism 410 is a mechanism configured to switch between a transmission state in which the drive force of the motor M3 is transmitted to the second pickup roller 111 and a non-transmission state in which the drive force of the motor M3 is not transmitted to the second pickup roller 111. The transmission switching mechanism 410 includes a planetary gear mechanism 440, a transmission switching lever L1, and a solenoid actuator SA.

Figure 16:
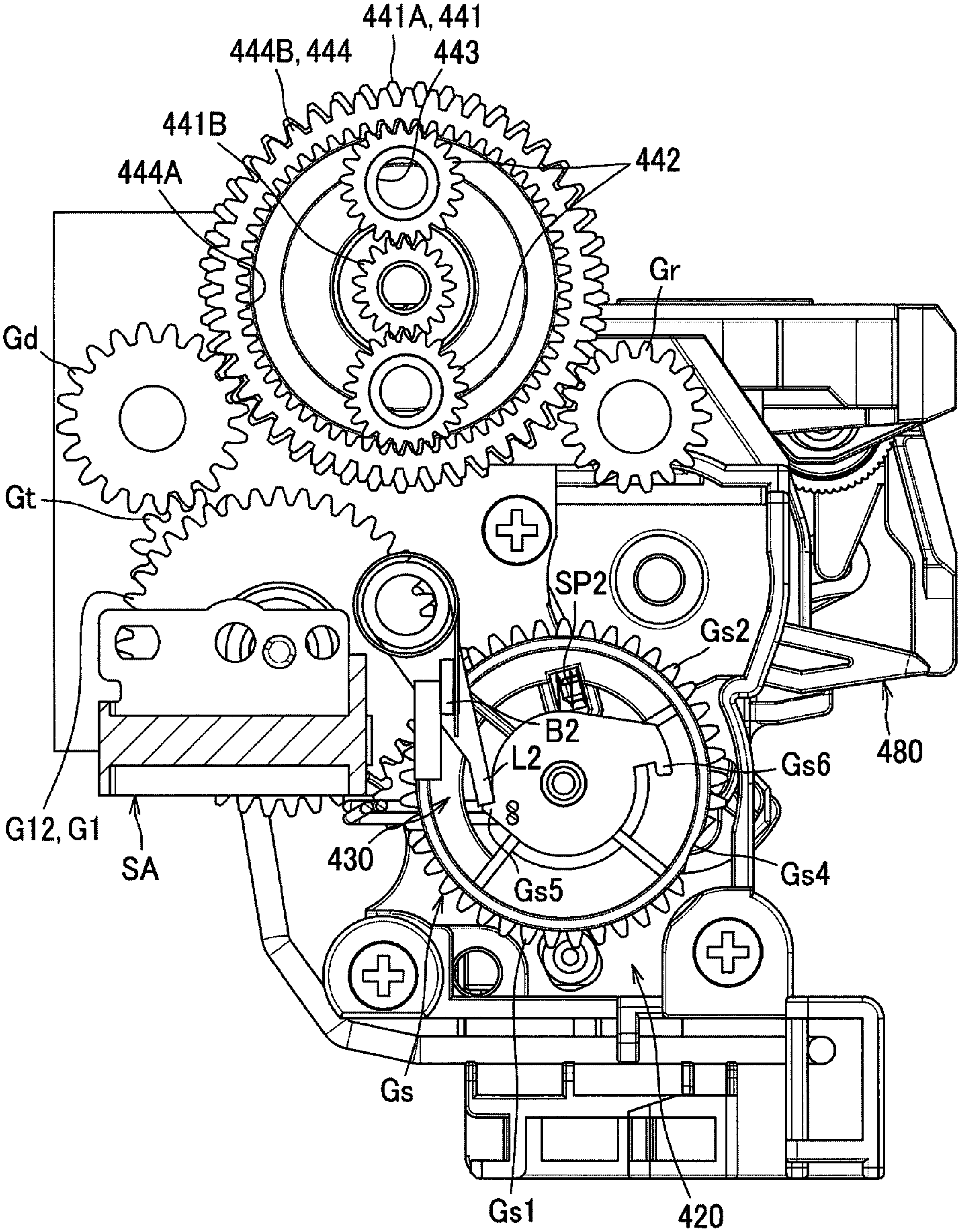
FIG. 16 is a cross-sectional view of the sheet conveyance device taken along a plane passing through a planetary gear.

As shown in FIGS. 13 and 16, the planetary gear mechanism 440 includes a sun gear 441, a plurality of planetary gears 442, a planetary carrier 443, and an outer gear 444. The planetary gear mechanism 440 has a structure in which when rotation of one of the three components of the sun gear 441, the planetary carrier 443, and the outer gear 444 is stopped, the remaining components rotate in an interlocking manner.

The sun gear 441 is a two-stage gear. The sun gear 441 includes a large-diameter gear portion 441A shown in FIG. 13 and a small-diameter gear portion 441B shown in FIG. 16. The small-diameter gear portion 441B has a smaller diameter than the large-diameter gear portion 441A.

The plurality of planetary gears 442 are arranged around the small-diameter gear portion 441B and engage with the small-diameter gear portion 441B. The plurality of planetary gears 442 are rotatably attached to the planetary carrier 443.

As shown in FIG. 13, the planetary carrier 443 is rotatable about the rotation axis of the sun gear 441. The planetary carrier 443 has a plurality of pawls 443A on the outer circumferential surface.

As shown in FIG. 16, the outer gear 444 is a ring-shaped member. The outer gear 444 has internal teeth 444A located on the inner circumferential surface and external teeth 444B located on the outer circumferential surface. The internal teeth 444A engage with the planetary gear 442.

As shown in FIG. 13, the drive gear Gd engages with the large-diameter gear portion 441A of the sun gear 441. The external teeth 444B of the outer gear 444 engage with the roller gear Gr. As shown in FIG. 11, the roller gear Gr is attached to one end of a shaft SF that supports the second separation roller 112. The drive force transmitted to the shaft SF is also transmitted to the second pickup roller 111 via a gear (not shown).

In a state where rotation of the planetary carrier 443 is stopped, the drive force from the drive gear Gd is transmitted to the second separation roller 112 and the second pickup roller 111 via the planetary gear mechanism 440. In a state where rotation of the planetary carrier 443 is allowed, the roller gear Gr and so on act as resistance to the rotation of the outer gear 444 and stop the rotation of the outer gear 444, thereby the drive force from the drive gear Gd is transmitted to the planetary carrier 443 and the planetary carrier 443 rotates idly. That is, in a state where rotation of the planetary carrier 443 is allowed, the drive force from the drive gear Gd is not transmitted to the second pickup roller 111, and the second pickup roller 111 does not rotate.

Figure 14:
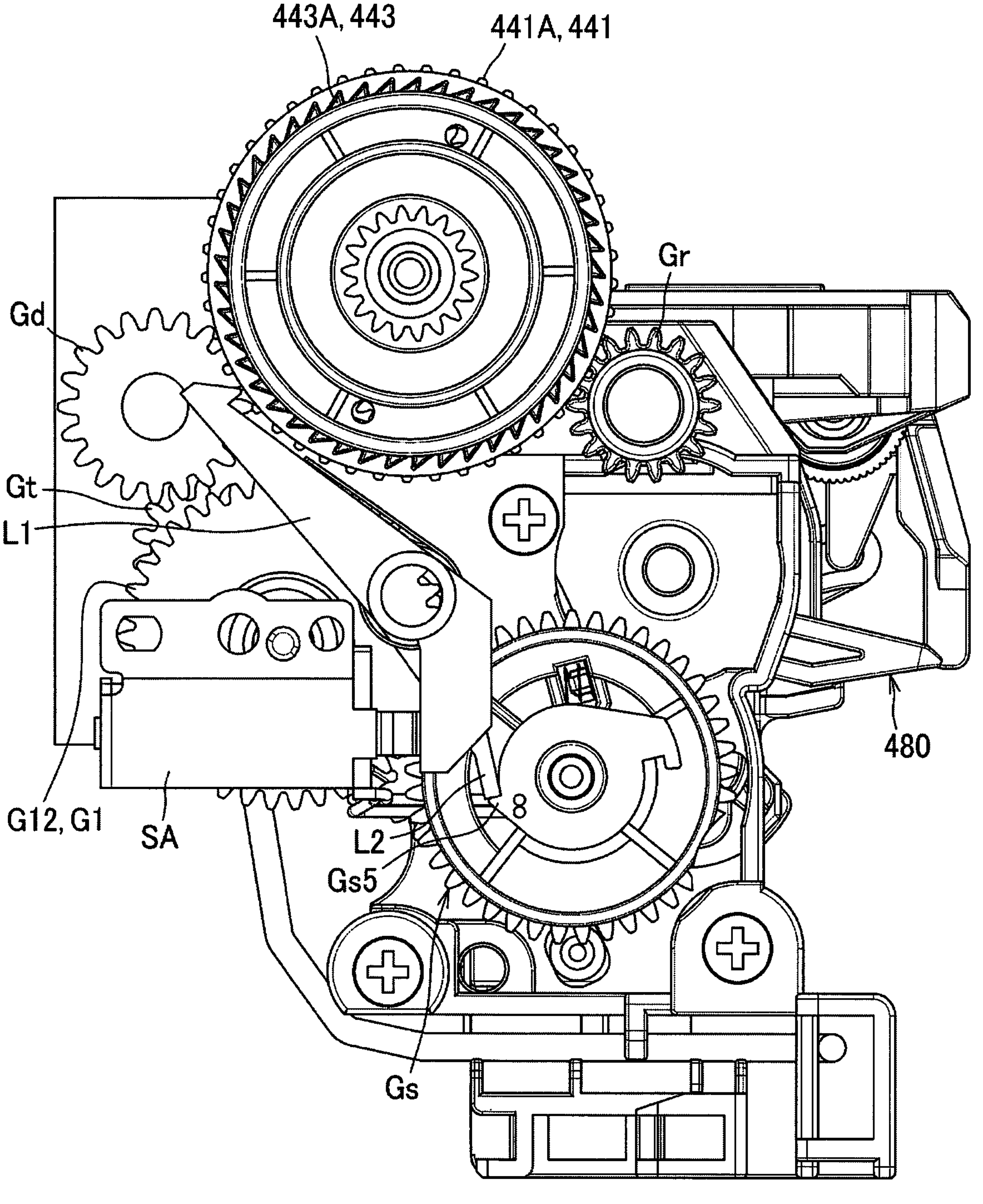
FIG. 14 is a side view of the sheet conveyance device viewed from a transmission switching lever side.

The transmission switching lever L1 is a lever for stopping or allowing rotation of the planetary carrier 443. The transmission switching lever L1 is rotatable between a transmission position shown in FIG. 21 and a non-transmission position shown in FIG. 14. When the transmission switching lever L1 is located at the transmission position, the transmission switching lever L1 engages with a pawl 443A of the planetary carrier 443 to stop rotation of the planetary carrier 443. In this way, when the transmission switching lever L1 is located at the transmission position, the transmission switching mechanism 410 is in the transmission state.

When the transmission switching lever L1 is located at the non-transmission position, the transmission switching lever L1 disengages from the pawl 443A of the planetary carrier 443, thereby allowing rotation of the planetary carrier 443. In this way, when the transmission switching lever L1 is located at the non-transmission position, the transmission switching mechanism 410 is in the non-transmission state.

Figure 15:
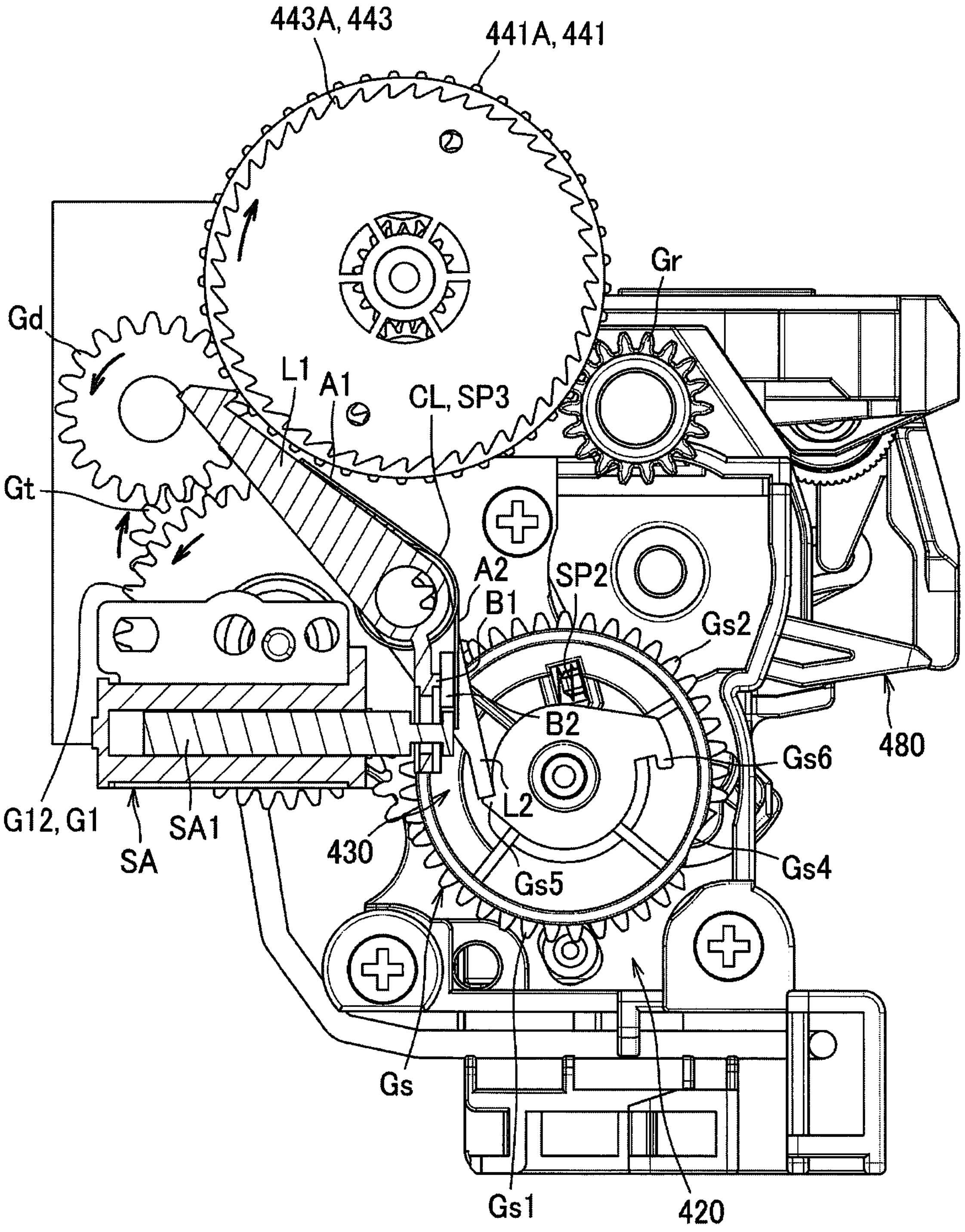
FIG. 15 is a cross-sectional view of the sheet conveyance device taken along a plane passing through a connecting portion between a solenoid actuator and the transmission switching lever.

The solenoid actuator SA is an actuator for moving the transmission switching lever L1 between the transmission position and the non-transmission position. As shown in FIG. 15, the solenoid actuator SA includes a piston SA1 engaging with the transmission switching lever L1. The piston SA1 is movable between an advanced position shown in FIG. 15 and a retracted position shown in FIG. 21. The tip of the piston SA1 engages with the transmission switching lever L1.

The transmission switching lever L1 is urged from the transmission position toward the non-transmission position by a spring (not shown). When the piston SA1 is moved from the advanced position to the retracted position, the transmission switching lever L1 rotates from the non-transmission position to the transmission position against the urging force of the spring. When the piston SA1 is moved from the retracted position to the advanced position, the transmission switching lever L1 rotates from the transmission position to the non-transmission position by the urging force of the spring.

As shown in FIG. 11, the pressure plate operating mechanism 420 is switchable between an operating state in which the pressure plate 102 is operated by using the drive force of the motor M3 and a non-operating state in which the drive force of the motor M3 is cut off and the pressure plate 102 is not operated. The pressure plate operating mechanism 420 includes a push-up mechanism 421 for pushing up the pressure plate 102 and an operating mechanism 422 for operating the push-up mechanism 421.

The push-up mechanism 421 includes a push-up member 480, a drive shaft 450 for moving the push-up member 480, and a pressure plate spring SP1.

Figure 12:
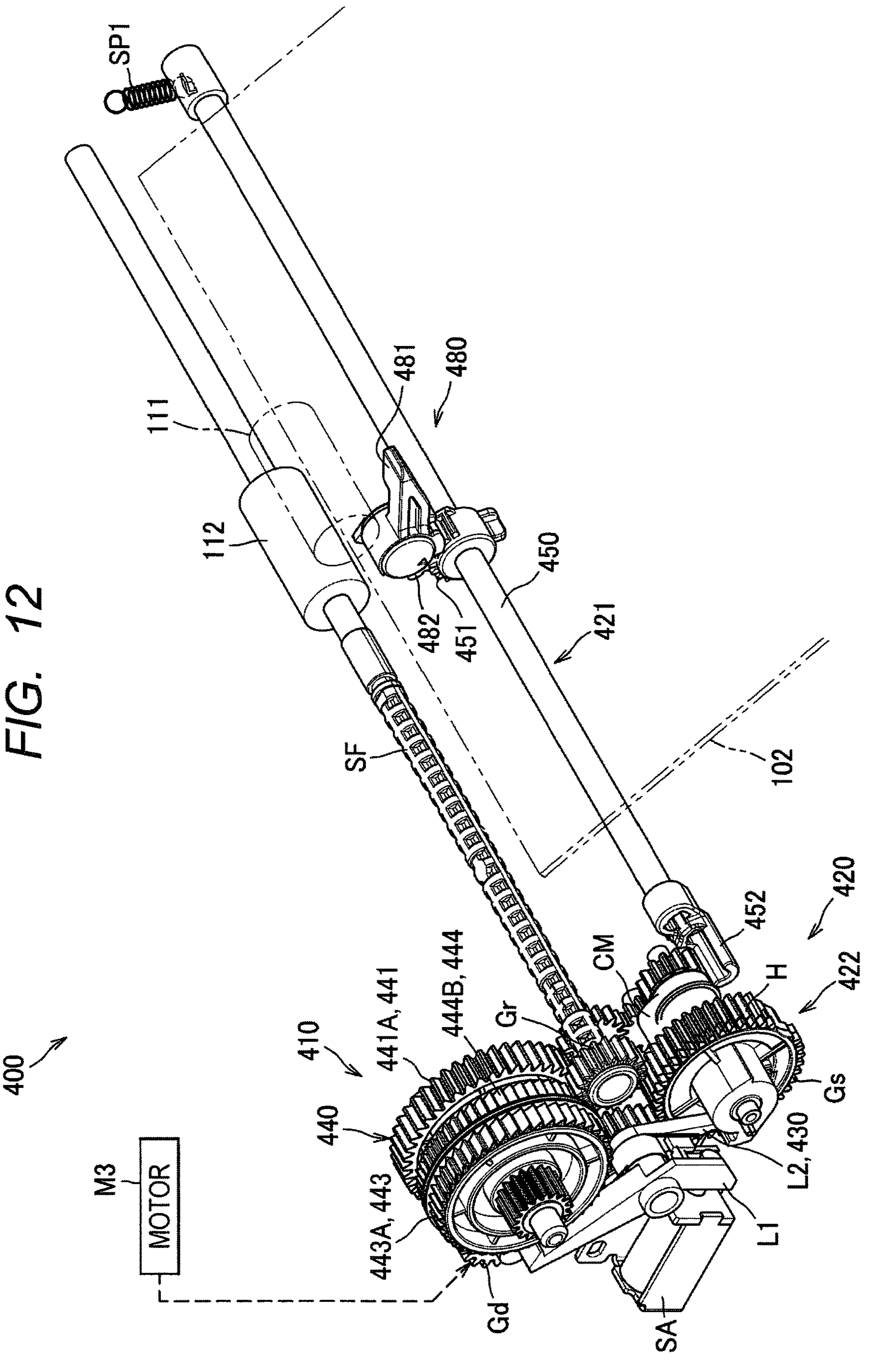
FIG. 12 is a diagram showing a state where the push-up member is located at a push-up position.

The push-up member 480 is rotatable between a retracted position shown in FIG. 11 and a push-up position shown in FIG. 12. The push-up member 480 has a contact portion 481 that contacts the pressure plate 102 and a gear portion 482. The contact portion 481 is located within the range of the second pickup roller 111 in the width direction of the sheet S.

Figure 20:
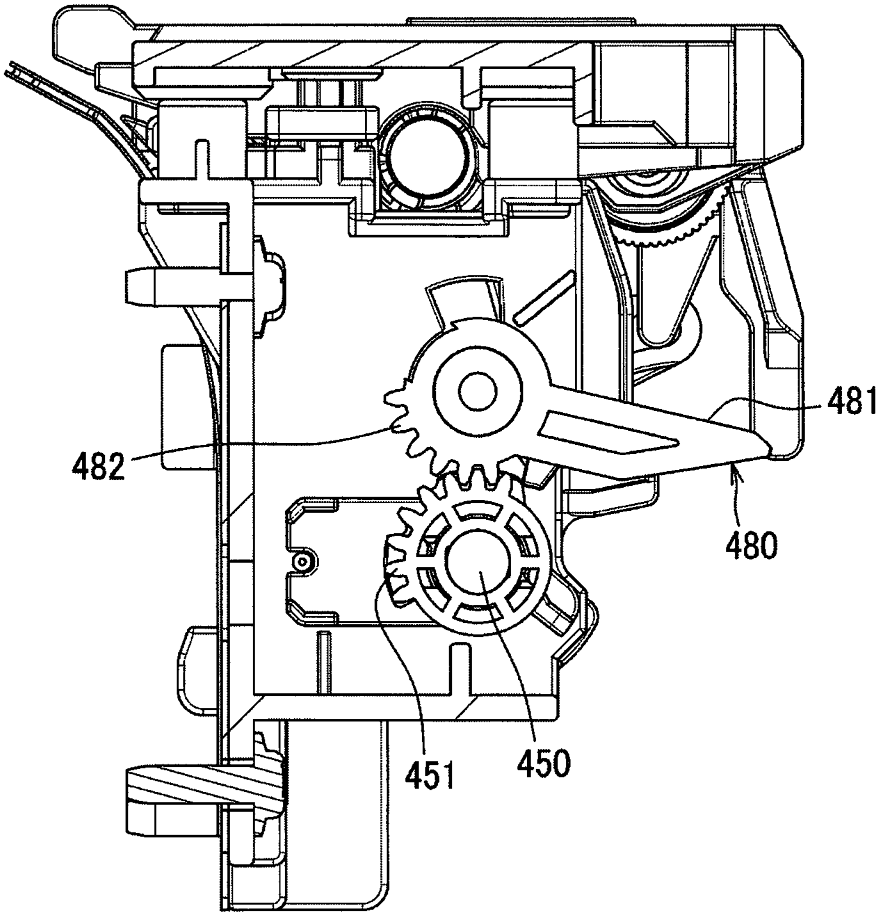
FIG. 20 is a cross-sectional view of the sheet conveyance device taken along a plane passing through the push-up member.

The drive shaft 450 extends in the width direction of the sheet S. The drive shaft 450 has a gear portion 451 in the center in the width direction. The gear portion 451 engages with the gear portion 482 of the push-up member 480 (see also FIG. 20). The drive shaft 450 has a cam contact portion 452 at its one end. The cam contact portion 452 configured to contact a cam CM of the operating mechanism 422 described later. The cam contact portion 452 is rotatable between a separated-state position shown in FIG. 11 and a contact-state position shown in FIG. 12.

When the cam contact portion 452 rotates from the separated-state position to the contact-state position, the drive shaft 450 rotates clockwise in the figure, and the push-up member 480 engaging with the gear portion 451 rotates from the retracted position to the push-up position. When the cam contact portion 452 rotates from the contact-state position to the separated-state position, the drive shaft 450 rotates counterclockwise in the figure, and the push-up member 480 engaging with the gear portion 451 rotates from the push-up position to the retracted position.

The pressure plate spring SP1 is connected to the other end of the drive shaft 450. The pressure plate spring SP1 urges the drive shaft 450 clockwise in the figure. Thus, the pressure plate spring SP1 urges the pressure plate 102 from the separated position toward the contact position via the drive shaft 450 and the push-up member 480.

As shown in FIG. 13, the operating mechanism 422 includes a transmission gear Gt, an input gear G1, a sector gear Gs, a spring SP2, a spring holder H holding the spring SP2, the cam CM, an output gear G2, and two idle gears G3 and G4.

The transmission gear Gt engages with the drive gear Gd. The input gear G1 is a gear to which drive force is input from the drive gear Gd via the transmission gear Gt. The input gear G1 includes a first gear G11 and a second gear G12.

The first gear G11 engages with the transmission gear Gt. A drive force is input to the first gear G11 from the transmission gear Gt.

The second gear G12 is a gear with a larger diameter than the first gear G11. The second gear G12 is connected to the first gear G11 via a second one-way clutch C4 shown in FIG. 18.

The second one-way clutch C4 has a function of connecting the first gear G11 and the second gear G12 such that the first gear G11 rotates together with the second gear G12 when raising the pressure plate 102. The second one-way clutch C4 has a function of disconnecting the first gear G11 and the second gear G12 such that the first gear G11 rotates relative to the second gear G12 when lowering the pressure plate 102.

Figure 17:
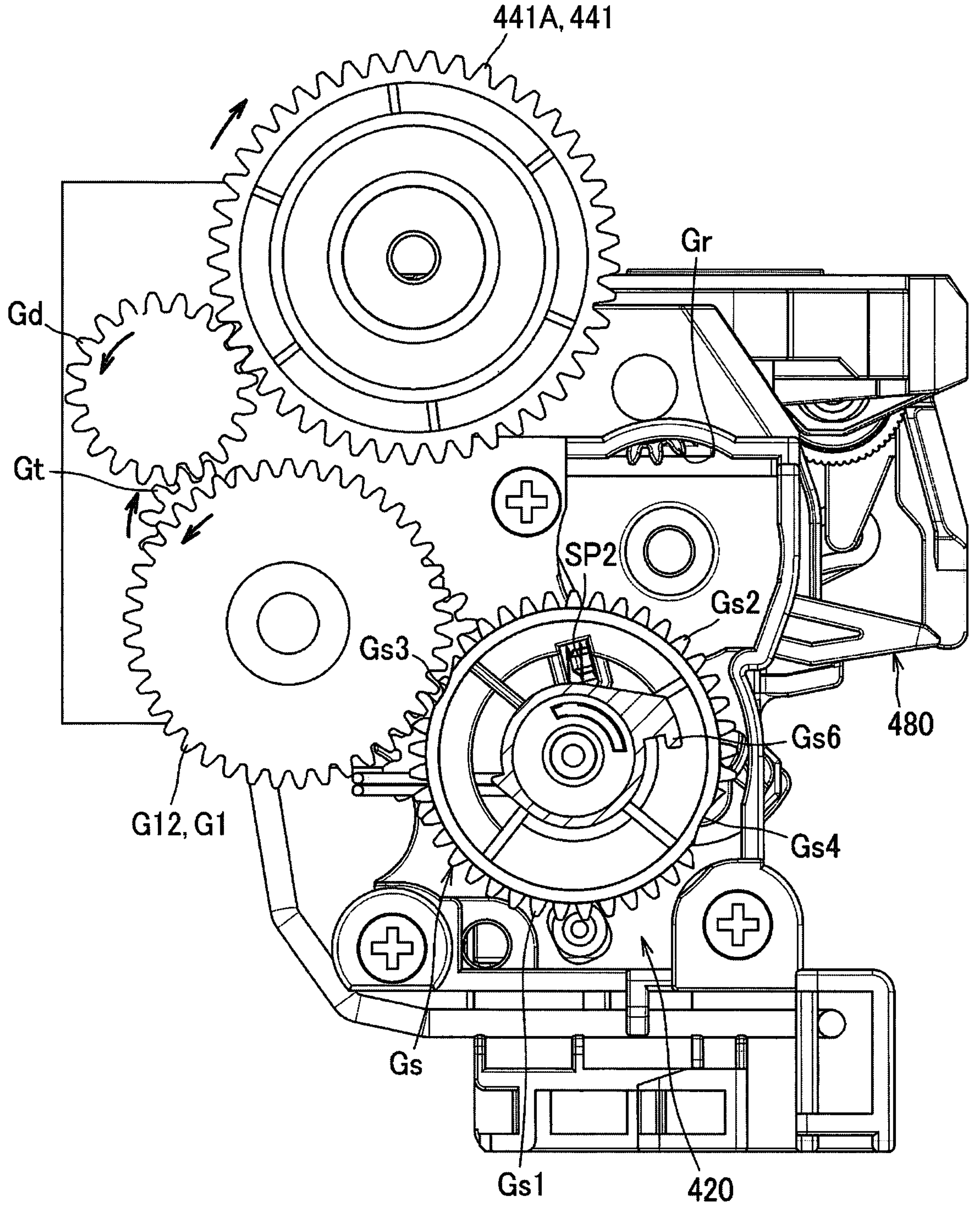
FIG. 17 is a cross-sectional view of the sheet conveyance device taken along a plane passing through a first toothless portion of a sector gear.

As shown in FIG. 17, the sector gear Gs has a first tooth portion Gs1, a second tooth portion Gs2, a first toothless portion Gs3, and a second toothless portion Gs4 on the outer circumferential surface. The first tooth portion Gs1 and the second tooth portion Gs2 are portions that are engageable with the second gear G12 of the input gear G1. The first toothless portion Gs3 and the second toothless portion Gs4 are portions that are not engageable with the second gear G12 of the input gear G1.

The first tooth portion Gs1, the second tooth portion Gs2, the first toothless portion Gs3 and the second toothless portion Gs4 are arranged on the outer circumferential surface of the sector gear Gs in the order of the first toothless portion Gs3, the first tooth portion Gs1, the second toothless portion Gs4, and the second tooth portion Gs2. Specifically, toward the upstream side in the rotation direction of the sector gear Gs (see FIG. 22) when the pressure plate 102 is raised, the first toothless portion Gs3, the first tooth portion Gs1, the second toothless portion Gs4, and the second tooth portion Gs2 are arranged in this order.

Figure 25A:
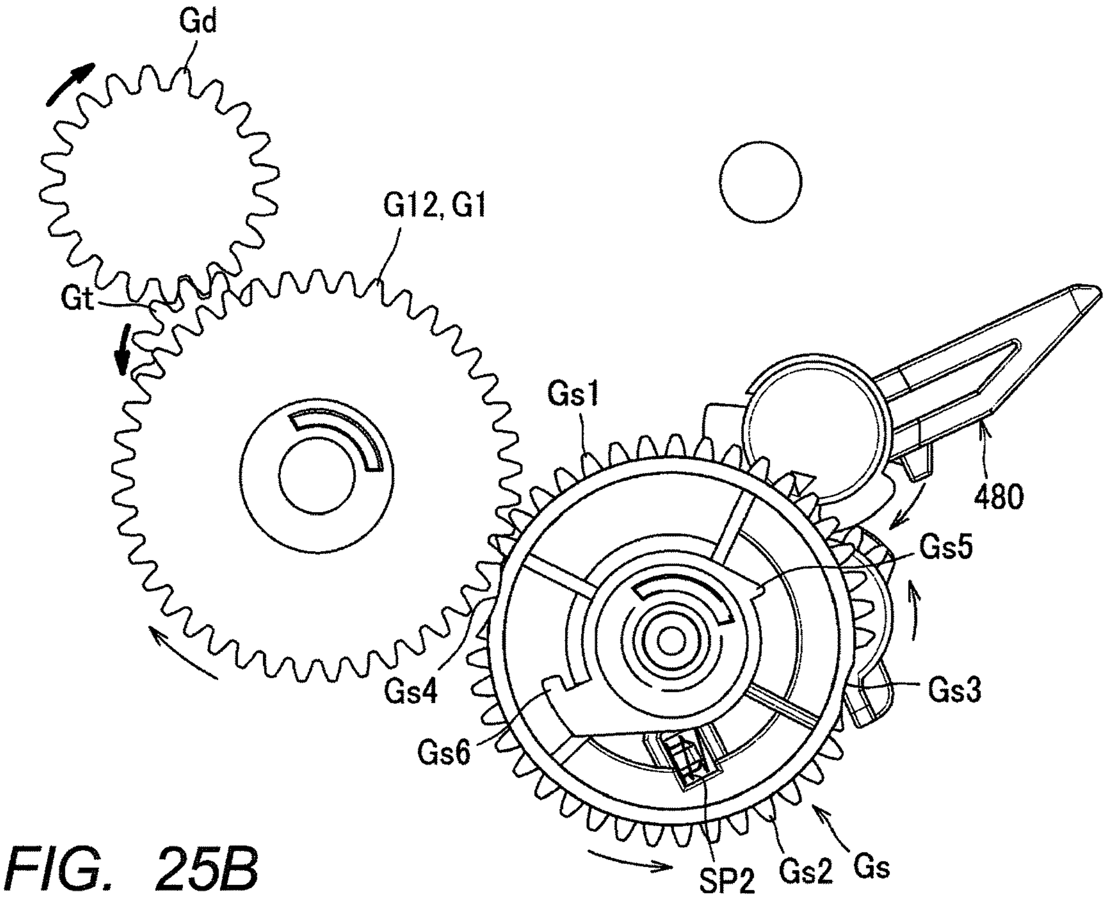
FIG. 25A shows movement of the sector gear and so on when the pressure plate is lowered.

The sector gear Gs is rotatable between a first sector position shown in FIG. 17 and a second sector position shown in FIG. 25A. When the sector gear Gs is located at the first sector position, the first toothless portion Gs3 faces the second gear G12. When the sector gear Gs is located at the second sector position, the second toothless portion Gs4 faces the second gear G12.

When the first toothless portion Gs3 or the second toothless portion Gs4 faces the second gear G12, the state of the pressure plate operating mechanism 420 is the non-operating state. When the first tooth portion Gs1 engages with the second gear G12, the state of the pressure plate operating mechanism 420 is the operating state.

When the pressure plate 102 is raised, the sector gear Gs rotates clockwise in the figure from the first sector position to the second sector position. When the pressure plate 102 is lowered, the sector gear Gs rotates counterclockwise in the figure from the second sector position to the first sector position.

As shown in FIG. 15, the sector gear Gs further includes a protrusion Gs5 and a holding portion Gs6. The protrusion Gs5 is configured to, when the sector gear Gs is located at the first sector position, engage with a sector lever L2 (described later) in the rotation direction of the sector gear Gs.

The holding portion Gs6 is configured to, when the sector gear Gs is located at the second sector position, engage with the sector lever L2 in the rotation direction of the sector gear Gs. The holding portion Gs6 has a recess into which the tip of the sector lever L2 is inserted. With this configuration, the holding portion Gs6 is engageable with the sector lever L2 in the rotation direction of the sector lever L2 as well.

The spring SP2 urges the sector gear Gs in the rotation direction of the sector gear Gs when raising the pressure plate 102. That is, the spring SP2 urges the sector gear Gs clockwise in the figure (FIG. 15, for example). As shown in FIG. 13, the spring SP2 is located between the sector gear Gs and the spring holder H.

The spring holder H holds the spring SP2. The spring holder H is rotatable relative to the sector gear Gs within a particular angular range. The rotation center of the spring holder H and the rotation center of the sector gear Gs are the same. The diameter of the spring holder H is the same as the diameter of the sector gear Gs.

The spring holder H has a portion that engages with a part of the sector gear Gs in the rotation direction of the sector gear Gs. When the sector gear Gs rotates relative to the spring holder H by a particular angle, the part of the sector gear Gs engages with a part of the spring holder H, and the sector gear Gs and the spring holder H rotate together.

The spring holder H has a first tooth portion H1, a second tooth portion H2, a first toothless portion H3, and a second toothless portion H4 on the outer circumferential surface. The first tooth portion H1 and the second tooth portion H2 are portions that are engageable with the second gear G12 of the input gear G1. The first toothless portion H3 and the second toothless portion H4 are portions that are not engageable with the second gear G12 of the input gear G1.

When viewed from the axial direction of the sector gear Gs, the first tooth portion H1 has a shape that matches the first tooth portion Gs1. When viewed from the axial direction, the second tooth portion H2 has a shape that matches the second tooth portion Gs2. When viewed from the axial direction, the first toothless portion H3 has a shape that matches the shape of the first toothless portion Gs3. When viewed from the axial direction, the second toothless portion H4 has a shape that matches the shape of the second toothless portion Gs4.

The cam CM is formed integrally with the spring holder H. Thus, the cam CM rotates in conjunction with the sector gear Gs.

The cam CM is rotatable between a separation corresponding position shown in FIG. 11 and a contact corresponding position shown in FIG. 12. The rotation center of the cam CM and the rotation center of the spring holder H are the same. When the cam CM is located at the separation corresponding position, the cam CM causes the pressure plate 102 to be located at the separated position. When the cam CM is located at the contact corresponding position, the cam CM causes the pressure plate 102 to be located at the contact position.

As shown in FIGS. 11 and 13, the outer peripheral surface of the cam CM has a distal end portion CM1 farthest from the center of rotation of the cam CM. The distal end portion CM1 has a concave portion CM11 recessed toward the rotation center of the cam CM. When the cam CM is located at the separation corresponding position, the distal end portion CM1 of the cam CM contacts the cam contact portion 452. Specifically, when the cam CM is located at the separation corresponding position, the cam contact portion 452 enters the concave portion CM11 (see FIG. 11). Thus, the cam contact portion 452 is located at the separated-state position, the push-up member 480 is located at the retracted position, and the pressure plate 102 is located at the separated position.

When the distal end portion CM1 of the cam CM contacts the cam contact portion 452, the frictional force between the distal end portion CM1 of the cam CM and the cam contact portion 452 is high due to the urging force of the pressure plate spring SP1. This suppresses rotation of the spring holder H due to the urging force of the spring SP2 in a state where the cam CM is located at the separation corresponding position.

When the cam CM rotates from the separation corresponding position to the contact corresponding position, the distal end portion CM1 of the cam CM separates from the cam contact portion 452. Thus, the urging force of the pressure plate spring SP1 causes the cam contact portion 452 to rotate toward the contact-state position, the push-up member 480 rotates toward the push-up position, and the pressure plate 102 rotates toward the contact position.

When the cam CM is located at the contact corresponding position, a portion of the outer peripheral surface of the cam CM on the side opposite to the distal end portion CM1 contacts the cam contact portion 452. Thus, the cam contact portion 452 is located at the contact-state position, the push-up member 480 is located at the push-up position, and the pressure plate 102 is located at the contact position.

Even when the portion of the cam CM opposite to the distal end portion CM1 contacts the cam contact portion 452, the frictional force between the cam CM and the cam contact portion 452 is high due to the urging force of the pressure plate spring SP1. Thus, even when the cam CM is located at the contact corresponding position, rotation of the spring holder H due to the urging force of the spring SP2 is suppressed.

Note that, when the cam CM is located at the contact corresponding position, the cam contact portion 452 need not necessarily contact the cam CM. For example, when the cam CM is located at the contact corresponding position, the pressure plate 102 may be maintained at the contact position due to contact between the gear portion 451, the cam contact portion 452, or the push-up member 480 and a part of the main housing 10. Further, when the cam CM is located at the contact corresponding position, the pressure plate 102 may be maintained at the contact position by stopping the movement of the pressure plate 102 by the second pickup roller 111.

When the cam CM rotates from the contact corresponding position to the separation corresponding position, the distal end portion CM1 of the cam CM pushes the cam contact portion 452 toward the separated-state position against the urging force of the pressure plate spring SP1. Thereby, the cam contact portion 452 rotates toward the separated-state position, the push-up member 480 rotates toward the retracted position, and the pressure plate 102 rotates toward the separated position.

As shown in FIG. 13, the output gear G2 is rotatable about the rotation center of the cam CM. The output gear G2 is connected to the first gear G11 of the input gear G1 via two idle gears G3 and G4 (see also FIG. 19). Thereby, the drive force of the motor M3 transmitted to the first gear G11 is transmitted to the output gear G2 via the idle gears G3 and G4.

The first gear G11, the idle gears G3 and G4, and the output gear G2 have the same module, the same pitch diameter, and the same number of teeth. The second gear G12 and the sector gear Gs have the same module and the same pitch diameter.

Figure 18:
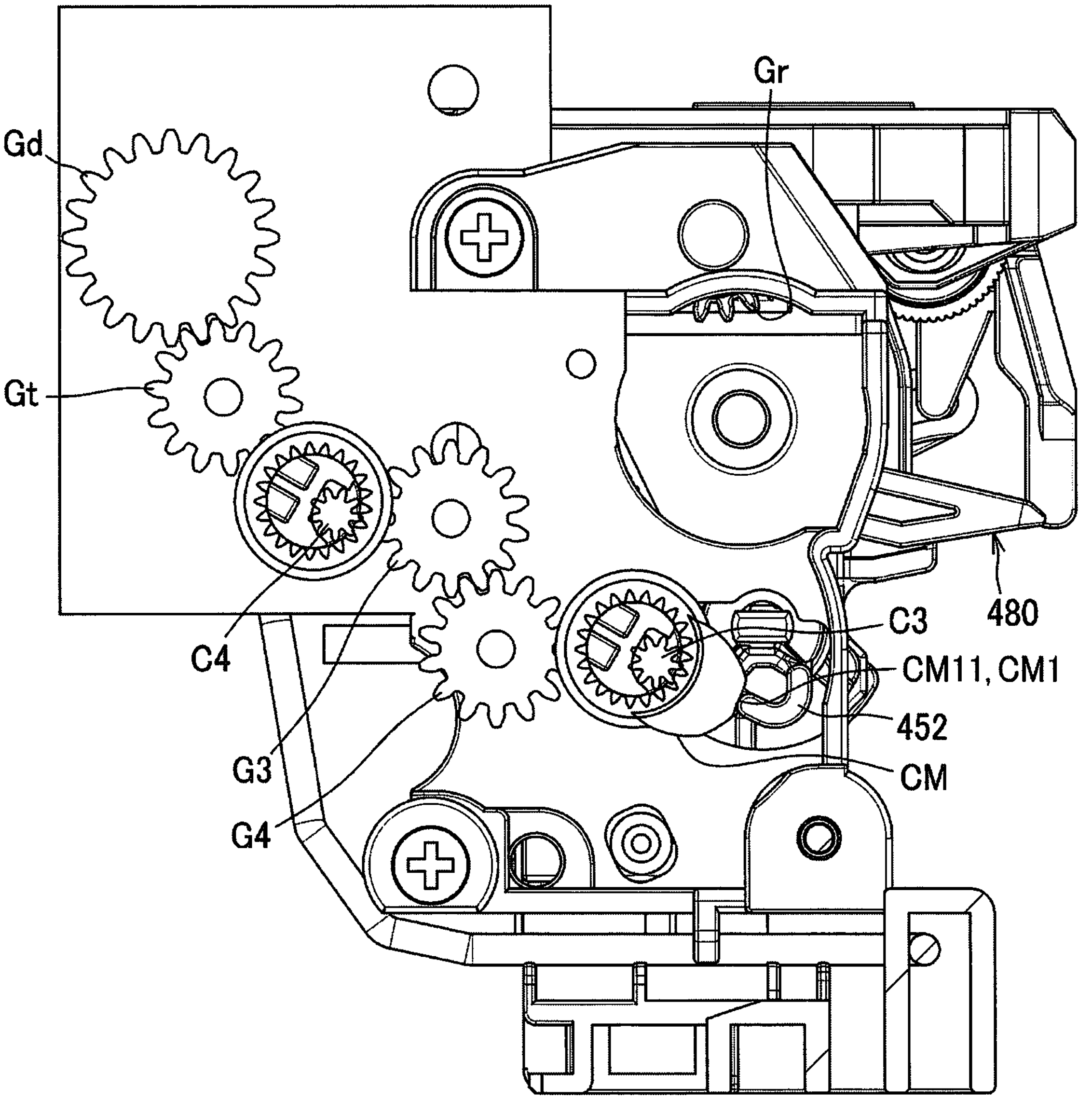
FIG. 18 is a cross-sectional view of the sheet conveyance device taken along a plane passing through a first one-way clutch.

The output gear G2 is connected to the cam CM via a first one-way clutch C3 shown in FIG. 18.

The first one-way clutch C3 is a clutch for idly rotating the output gear G2 relative to the cam CM when transmitting the drive force of the motor M3 to the second pickup roller 111 in a state where the pressure plate 102 is located at the contact position. That is, the first one-way clutch C3 disconnects the output gear G2 and the cam CM such that the output gear G2 is rotatable relative to the cam CM when the motor M3 is rotating forward. The first one-way clutch C3 connects the output gear G2 and the cam CM when the motor M3 is rotating reversely.

As shown in FIG. 15, the switching mechanism 430 is a mechanism for switching the state of the pressure plate operating mechanism 420. The switching mechanism 430 includes the sector lever L2 and a connecting spring SP3.

The sector lever L2 is rotatable relative to the transmission switching lever L1. The sector lever L2 is rotatable about the same axis as the transmission switching lever L1. The sector lever L2 is rotatable between a rotation restricting position shown in FIG. 15 and a rotation allowing position shown in FIG. 21.

When the sector lever L2 is located at the rotation restricting position, the sector lever L2 stops rotation of the sector gear Gs due to the urging force of the spring SP2 by engaging with the protrusion Gs5 of the sector gear Gs. When the sector lever L2 is located at the rotation allowing position, the sector lever L2 allows rotation of the sector gear Gs due to the urging force of the spring SP2 by disengaging from the protrusion Gs5 of the sector gear Gs.

The sector lever L2 is configured to interlock with the transmission switching lever L1. Specifically, the transmission switching lever L1 has a protrusion B1. The sector lever L2 has a protrusion B2. When the transmission switching lever L1 rotates from the transmission position toward the non-transmission position, the protrusion B1 pushes the protrusion B2, causing the sector lever L2 to rotate from the rotation allowing position to the rotation restricting position.

The connection spring SP3 is a torsion spring. The connection spring SP3 has a coil portion CL, a first arm portion A1, and a second arm portion A2. The coil portion CL is arranged so as to surround the rotation center of the sector lever L2.

The tip of the first arm portion A1 is located at a position where the tip of the first arm portion A1 is pushed by the transmission switching lever L1 when the transmission switching lever L1 rotates from the non-transmission position toward the transmission position. Specifically, the tip of the first arm portion A1 engages with the surface of the transmission switching lever L1 on the planetary carrier 443 side.

The second arm portion A2 is located at a position where the second arm portion A2 pushes the sector lever L2 when the transmission switching lever L1 rotates from the non-transmission position toward the transmission position. Specifically, the second arm portion A2 engages with the protrusion B2. The protrusion B2 is located between the protrusion B1 and the second arm portion A2. When the transmission switching lever L1 rotates from the non-transmission position toward the transmission position, the second arm A2 pushes the protrusion B2, causing the sector lever L2 to rotate from the rotation restricting position to the rotation allowing position.

Figure 24:
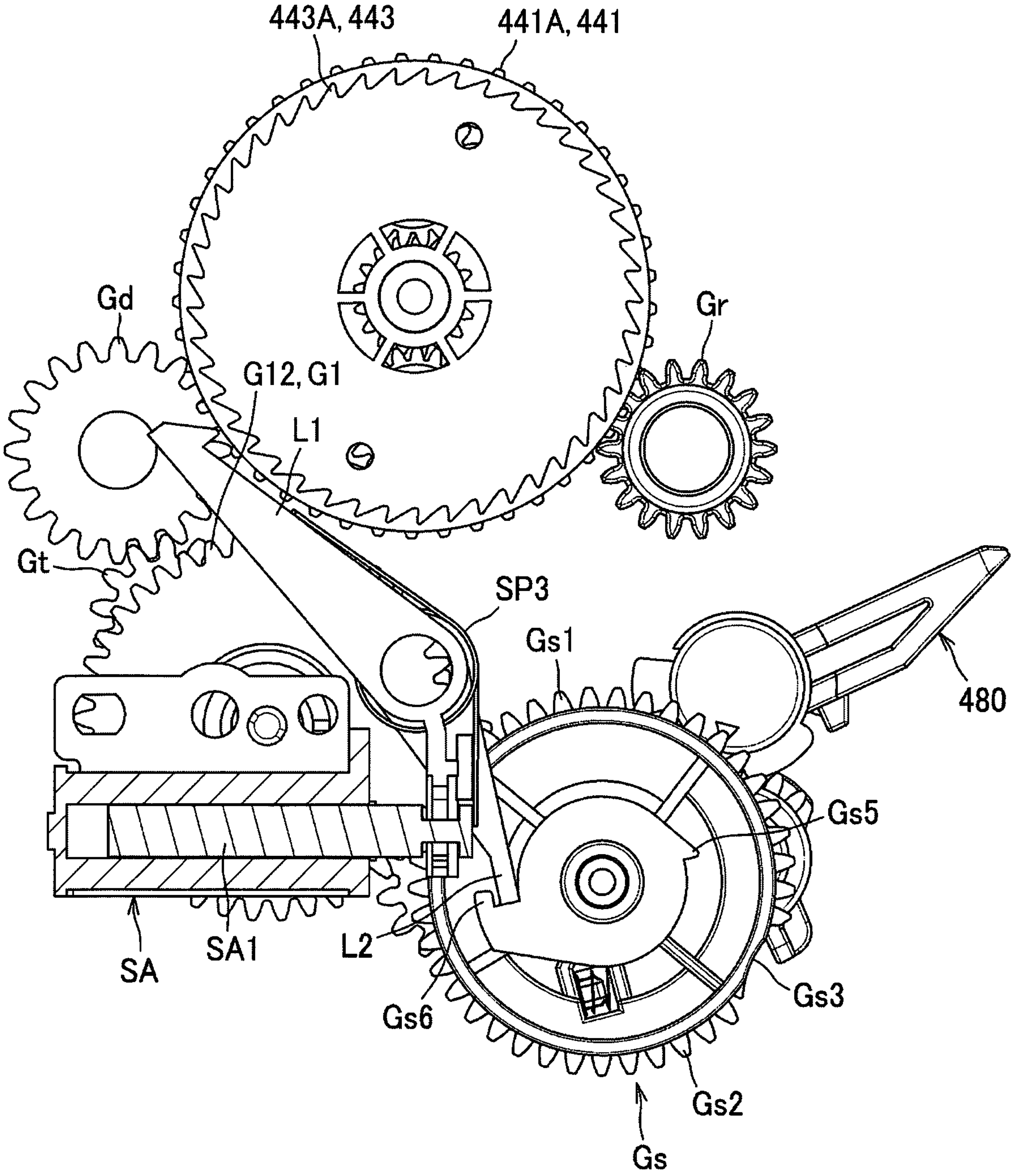
FIG. 24 is a diagram showing a state where a tip of the sector lever is inserted into a concave portion of a holding portion of the sector gear.

As shown in FIG. 24, when the sector gear Gs is located at the second sector position, the tip of the sector lever L2 is in the holding portion Gs6 of the sector gear Gs. Thus, when the pressure plate 102 is located at the contact position, the sector lever L2 engages with the holding portion Gs6 so as not to rotate from the rotation restricting position to the rotation allowing position. The transmission switching lever L1 is rotatable between the transmission position and the non-transmission position in a state where the sector lever L2 engages with the holding portion Gs6.

More specifically, when the transmission switching lever L1 rotates from the non-transmission position to the transmission position in a state where the movement of the sector lever L2 is stopped by the holding portion Gs6, the transmission switching lever L1 moves to the transmission position against the urging force of the connection spring SP3. At this time, the protrusion B1 moves away from the protrusion B2. When the transmission switching lever L1 rotates from the transmission position to the non-transmission position in a state where the movement of the sector lever L2 is stopped by the holding portion Gs6, the transmission switching lever L1 is rotatable to the non-transmission position because the protrusion B1 is separated from the protrusion B2.

Next, operations of the controller CT and the sheet conveyance device 400 will be described in detail. The position of each member when printing is not performed is the position shown in FIG. 15.

In response to receiving a print instruction for printing a plurality of sheets S, the controller CT controls the motor M3 to rotate forward. When the motor M3 rotates forward, the drive gear Gd rotates counterclockwise as shown in FIG. 15.

Figure 19:
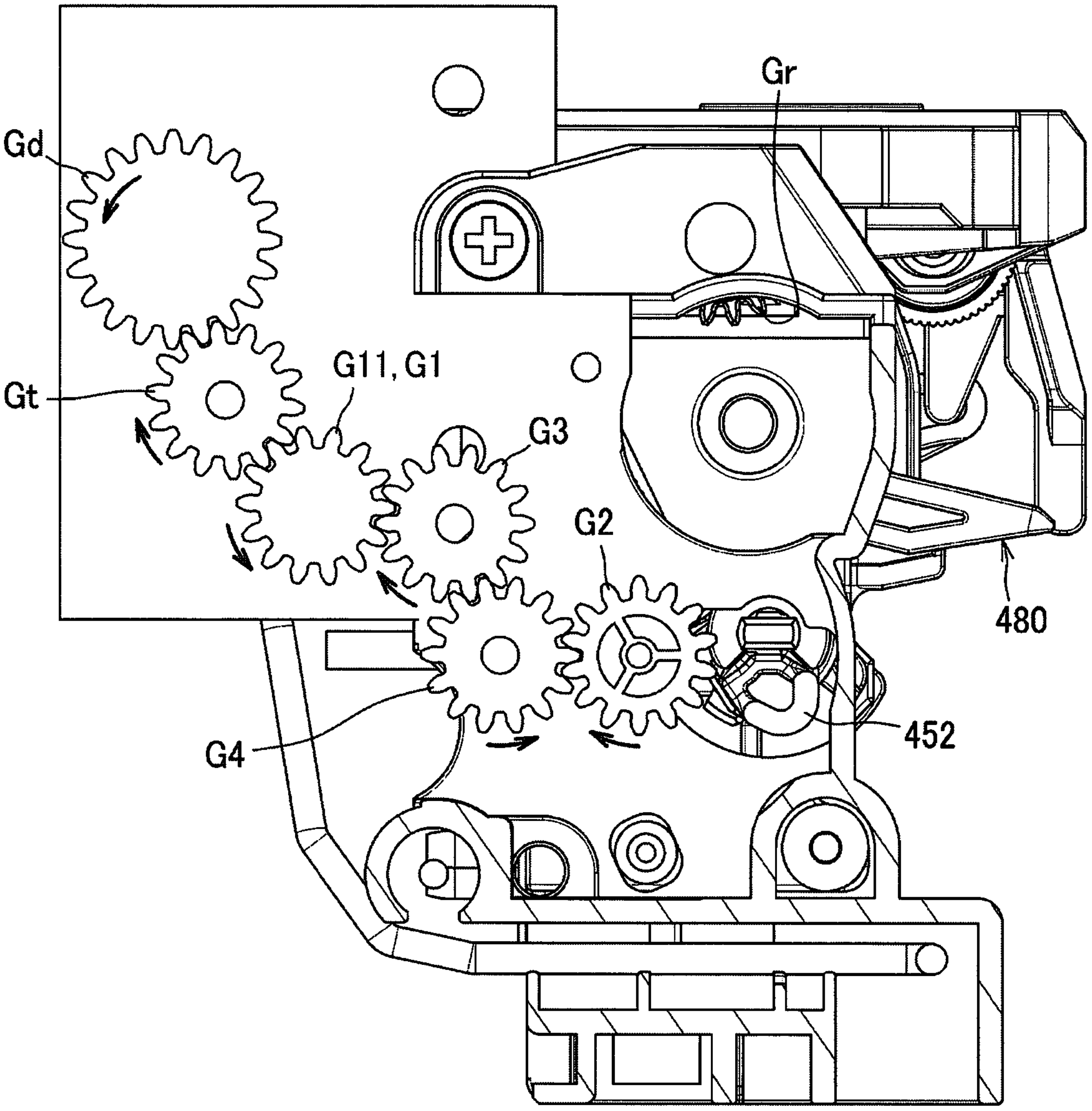
FIG. 19 is a cross-sectional view of the sheet conveyance device taken along a plane passing through a first gear.

When the drive gear Gd rotates, the sun gear 441 rotates. However, since the transmission switching lever L1 is located at the non-transmission position, the drive force of the motor M3 is not transmitted to the roller gear Gr. As shown in FIG. 19, when the drive gear Gd rotates, the transmission gear Gt, the first gear G11, the idle gears G3 and G4 and the output gear G2 rotate.

When the motor M3 rotates forward, no drive force is transmitted from the output gear G2 to the cam CM via the first one-way clutch C3, and thus the output gear G2 rotates relative to the cam CM in a stopped state. Further, when the motor M3 rotates forward, the drive force is transmitted from the first gear G11 to the second gear G12 via the second one-way clutch C4, and thus the second gear G12 rotates as shown in FIG. 17. However, since the first toothless portion Gs3 of the sector gear Gs faces the second gear G12, the sector gear Gs does not rotate.

Similarly, when the motor M3 rotates forward in a state where the second toothless portion Gs4 of the sector gear Gs faces the second gear G12, the sector gear Gs does not rotate and the output gear G2 rotates relative to the cam CM in a stopped state. That is, when the motor M3 rotates forward in a state where the pressure plate 102 is stopped, the sector gear Gs does not rotate and the output gear G2 rotates relative to the cam CM in a stopped state.

After driving the motor M3, the controller CT switches the piston SA1 of the solenoid actuator SA from the advanced position to the retracted position. The actuation of the solenoid actuator SA may be started earlier than the start of driving the motor M3, or may be simultaneous with the start of driving the motor M3.

Figure 21:
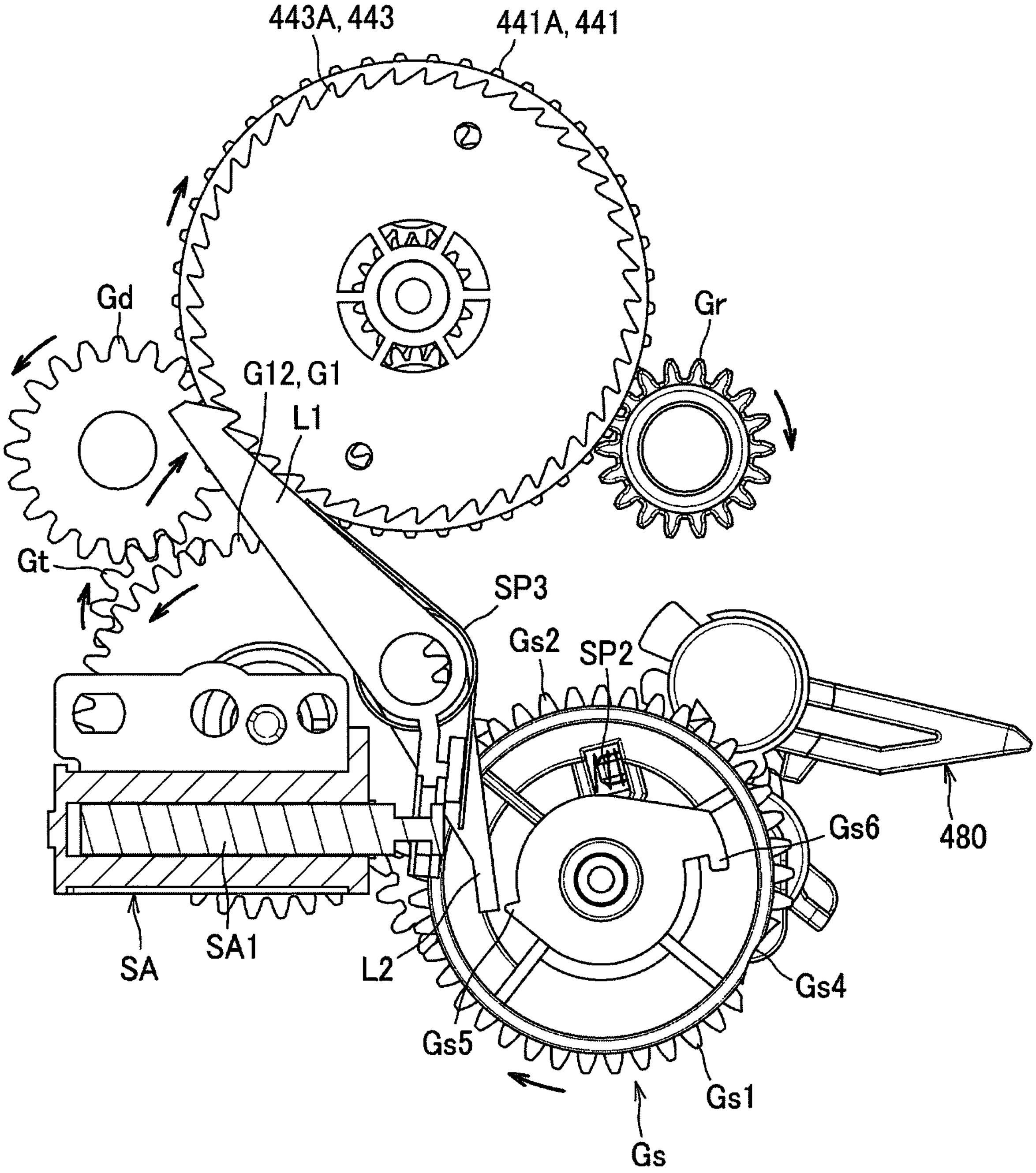
FIG. 21 is a diagram showing a state where a sector lever is rotated from a rotation restricting position to a rotation allowing position.

When the solenoid actuator SA is actuated, the transmission switching lever L1 rotates from the non-transmission position to the transmission position, and as shown in FIG. 21, the tip of the transmission switching lever L1 engages with the pawl 443A of the planetary carrier 443. Thereby, the drive force of the motor M3 is transmitted to the roller gear Gr, and the second pickup roller 111 rotates. At this time, since the pressure plate 102 is located at the separated position, the sheet S on the pressure plate 102 is not conveyed.

When the transmission switching lever L1 rotates from the non-transmission position to the transmission position, the sector lever L2 rotates from the rotation restricting position to the rotation allowing position, and the tip of the sector lever L2 separates from the protrusion Gs5 of the sector gear Gs. Thereby, the sector gear Gs rotates clockwise in the figure due to the urging force of the spring SP2.

Figure 22:
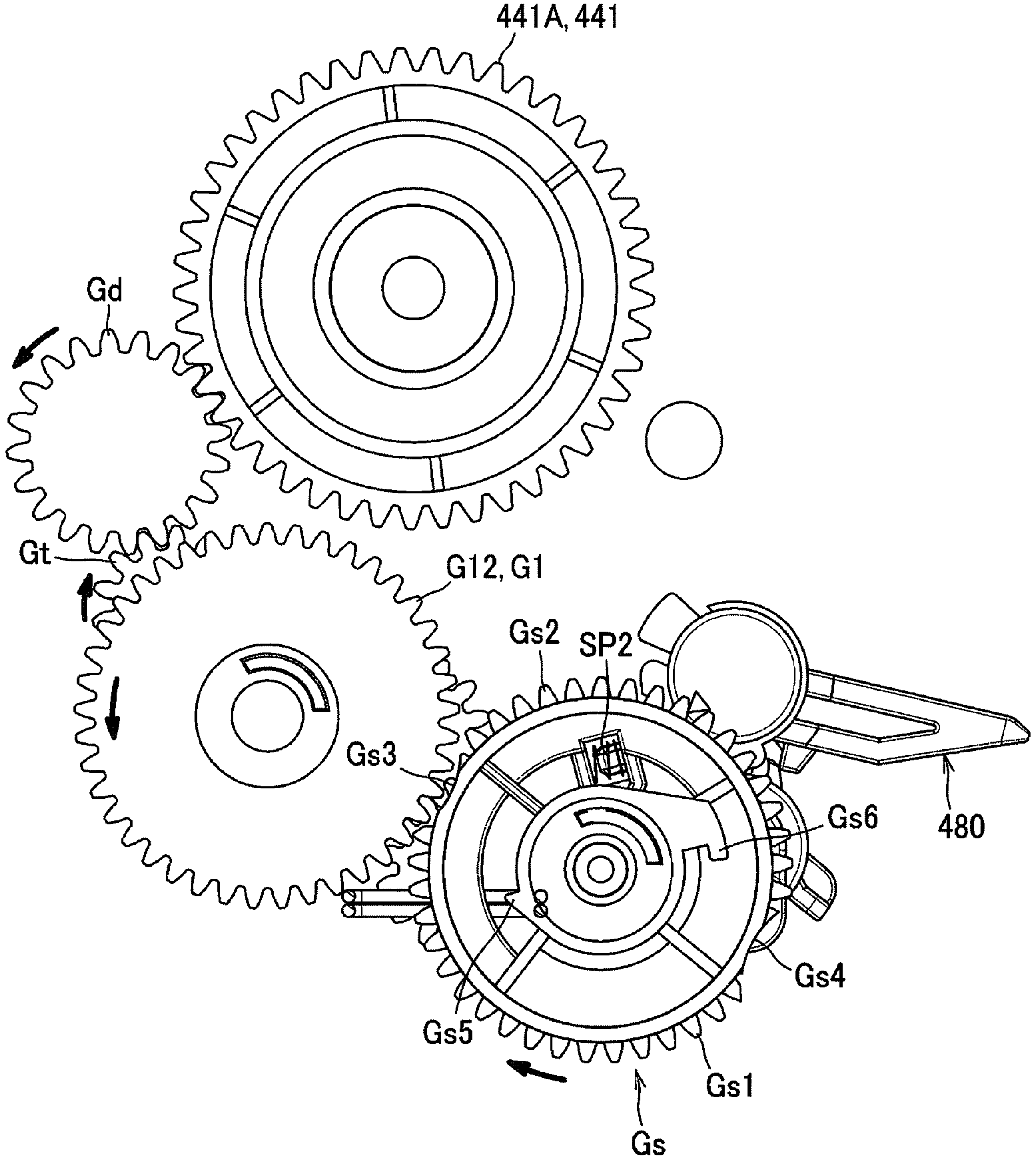
FIG. 22 is a diagram showing a state where a first tooth portion of the sector gear engages with a second gear.

When the sector gear Gs is rotated by the spring SP2, as shown in FIG. 22, the first tooth portion Gs1 of the sector gear Gs engages with the second gear G12. Thereby, the drive force is transmitted from the second gear G12 to the sector gear Gs, and the sector gear Gs rotates.

When the sector gear Gs rotates by a particular angle from the first sector position, a part of the sector gear Gs engages with the spring holder H (see FIG. 11), and the spring holder H rotates together with the sector gear Gs. When the first tooth portion H1 of the spring holder H engages with the second gear G12, the spring holder H is rotated by the drive force from the second gear G12. Specifically, the spring holder H rotates together with the sector gear Gs in a state where the phase of the spring holder H is shifted from the phase of the sector gear Gs.

Figure 23:
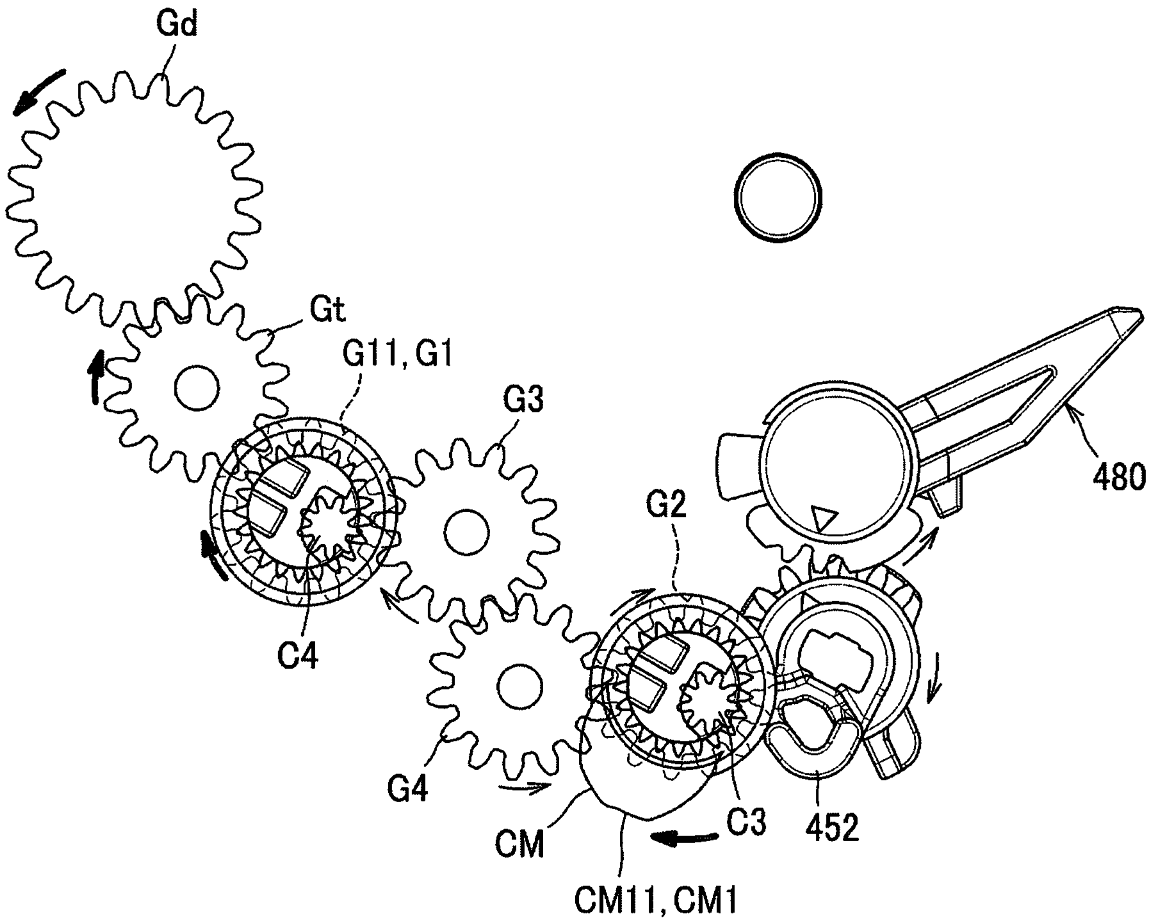
FIG. 23 is a diagram showing movement of a cam and so on when the pressure plate is raised.

When the spring holder H rotates, the cam CM rotates clockwise in the figure. Then, as shown in FIG. 23, since the distal end portion CM1 of the cam CM separates from the cam contact portion 452, the push-up member 480 rotates counterclockwise in the figure due to the urging force of the pressure plate spring SP1 shown in FIG. 11, and the pressure plate 102 moves from the separated position to the contact position.

Before the pressure plate 102 reaches the contact position, the controller CT switches the piston SA1 of the solenoid actuator SA from the retracted position to the advanced position. Then, as shown in FIG. 24, the transmission switching lever L1 rotates from the transmission position to the non-transmission position, and the sector lever L2 rotates from the rotation allowing position to the rotation restricting position.

When the transmission switching lever L1 is located at the non-transmission position, the drive force of the motor M3 is no longer transmitted to the roller gear Gr, and the second pickup roller 111 stops rotating. Thereby, the rotation of the second pickup roller 111 is stopped before the sheet S on the rising pressure plate 102 contacts the second pickup roller 111.

When the first tooth portion Gs1 of the sector gear Gs rotated by the drive force of the motor M3 is disengaged from the second gear G12, the rotation of the sector gear Gs stops, and the tip of the sector lever L2 enters the concave portion of the holding portion Gs6 of the sector gear Gs. Since the spring holder H of which the phase is shifted from the sector gear Gs is still engaged with the second gear G12, the spring holder H rotates even after the rotation of the sector gear Gs stops.

Since the clockwise rotation of the sector gear Gs is restricted by the sector lever L2, the spring holder H rotates relative to the sector gear Gs in a stopped state, and the spring SP2 located between the sector gear Gs and the spring holder H is compressed. When the first tooth portion H1 of the spring holder H rotated by the drive force of the motor M3 is disengaged from the second gear G12, the rotation of the spring holder H stops and the phases of the spring holder H and the sector gear Gs match.

The operation for raising the pressure plate 102 is summarized as follows.

When the motor M3 is rotated forward to raise the pressure plate 102, as shown in FIGS. 22 and 23, the first gear G11 rotates in a particular direction (counterclockwise in the figure). When the first gear G11 rotates in the particular direction, the drive force is transmitted to the sector gear Gs via the first gear G11, the second one-way clutch C4 and the second gear G12, which causes the sector gear Gs to rotate from the first sector position to the second sector position. Also, the drive force is transmitted to the cam CM via the sector gear Gs, which causes the cam CM to rotate from the separation corresponding position to the contact corresponding position. In other words, the drive force of the motor M3 is transmitted to the cam CM through the route indicated by the thick arrows in FIGS. 22 and 23.

The drive force transmitted to the first gear G11 is also transmitted to the output gear G2 through the route indicated by the thin arrows. At this time, if the rotation speed of the output gear G2 and the rotation speed of the cam CM are different, the output gear G2 and the cam CM may interfere with each other. In this regard, the first gear G11, the idle gears G3 and G4, and the output gear G2 have the same module and pitch diameter, and the second gear G12 and the sector gear Gs have the same module and pitch diameter. Thus, the output gear G2 rotates at the same speed as the cam CM, and thus no interference occurs between the output gear G2 and the cam CM due to a difference in rotational speed.

When conveying the sheet S on the pressure plate 102 located at the contact position, the controller CT switches the piston SA1 of the solenoid actuator SA from the advanced position to the retracted position. At this time, since the tip of the sector lever L2 is in the concave portion of the holding portion Gs6 of the sector gear Gs, the transmission switching lever L1 switches from the non-transmission position to the transmission position relative to the sector lever L2 which is substantially stopped. Thereby, the drive force of the motor M3 is transmitted to the second pickup roller 111, and the sheet S on the pressure plate 102 is conveyed by the second pickup roller 111.

After conveying one sheet S to the registration roller 26, the controller CT controls the solenoid actuator SA to switch the transmission switching lever L1 from the transmission position to the non-transmission position.

After that, the controller CT performs an operation of switching the transmission switching lever L1 from the non-transmission position to the transmission position and returning the transmission switching lever L1 from the transmission position to the non-transmission position the number of times corresponding to the number of sheets S. After conveyance of the last sheet S is completed, the controller CT stops the motor M3.

After that, the controller CT reversely rotates the motor M3 by a particular amount. Specifically, the controller CT reversely rotates the motor M3 for a particular time such that the sector gear Gs rotates from the second sector position to the first sector position.

Figure 25B:
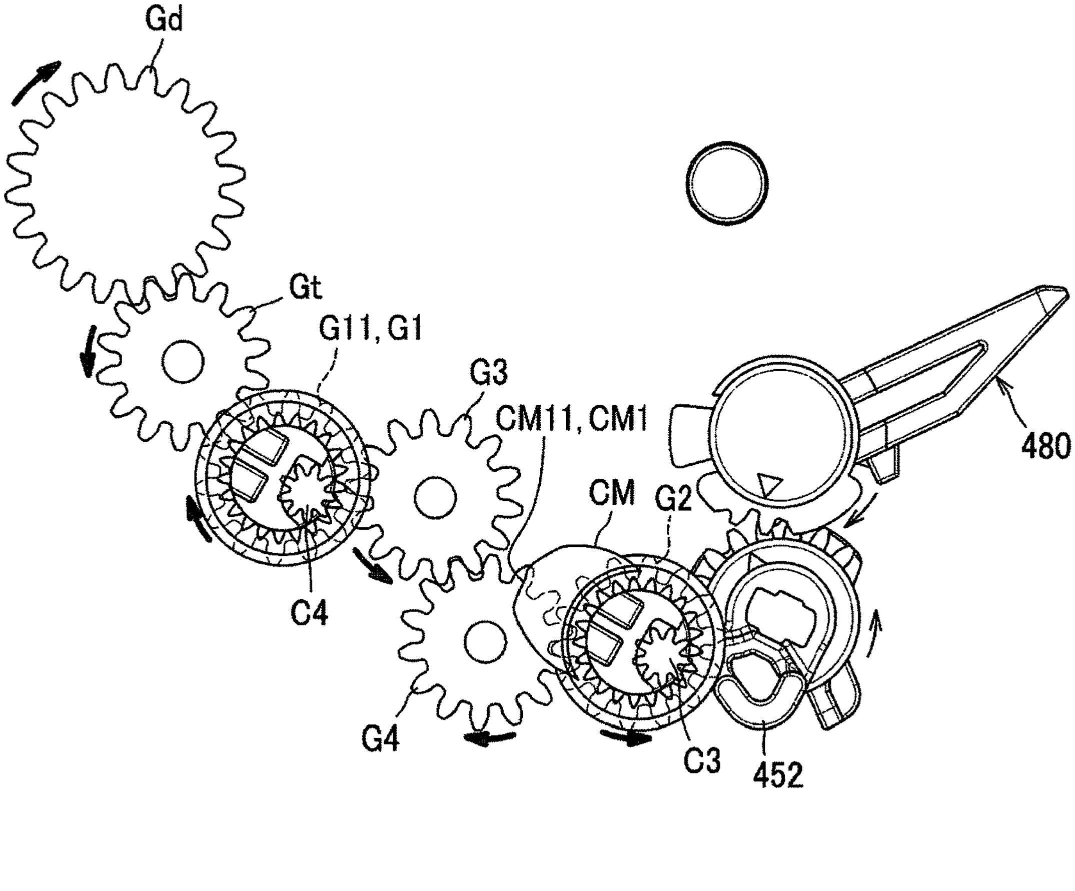
FIG. 25B shows movement of the cam and so on when the pressure plate is lowered.

When the motor M3 rotates in the reverse direction, as shown in FIG. 25B, the first gear G11 rotates in the direction opposite to the particular direction. When the first gear G11 rotates in the reverse direction, the drive force of the motor M3 is transmitted to the cam CM via the first gear G11, the idle gears G3 and G4, the output gear G2, and the first one-way clutch C3, thereby rotating the CM from the contact corresponding position to the separation corresponding position. That is, the drive force of the motor M3 is transmitted to the cam CM through the route indicated by the thick arrows in FIG. 25B.

When the first gear G11 starts rotating in the reverse direction, the second gear G12 is kept in a stopped state due to frictional resistance with a member (not shown) and so on. Thus, the first gear G11 rotates relative to the second gear G12 due to the second one-way clutch C4. Here, in order to keep the second gear G12 in a stopped state, for example, there is a method of pressing a friction pad against the second gear G12.

The cam CM pushes the cam contact portion 452 against the urging force of the pressure plate spring SP1 in the process of rotating from the contact corresponding position to the separation corresponding position. Thereby, the pressing force of the cam CM is transmitted to the push-up member 480 via the cam contact portion 452, the push-up member 480 rotates clockwise in the figure, and the pressure plate 102 moves from the contact position to the separated position. The inner surface of the concave portion CM11 of the distal end portion CM1 of the cam CM serves as a guiding surface for guiding the cam CM to the separation corresponding position. When the edge of the concave portion CM11 on the downstream side in the rotation direction of the cam CM at the time the pressure plate 102 is lowered gets over the cam contact portion 452, the cam contact portion 452 pushes the guiding surface of the concave portion CM11 and the cam CM is guided to the separation corresponding position.

The drive force of the motor M3 transmitted to the cam CM is transmitted to the sector gear Gs via the spring holder H. Thus, as shown in FIG. 25A, the sector gear Gs rotates from the second sector position to the first sector position.

Although not shown, just before the sector gear Gs reaches the first sector position, the protrusion Gs5 of the sector gear Gs contacts the sector lever L2 and slightly rotates the sector lever L2 from the rotation restricting position toward the rotation allowing position. When the sector lever L2 rotates, the protrusion B2 shown in FIG. 15 pushes the protrusion B1, and thus the transmission switching lever L1 also rotates slightly.

Thereafter, when the protrusion Gs5 of the sector gear Gs gets over the tip of the sector lever L2, the transmission switching lever L1 is urged to the non-transmission position by the spring (not shown). Thereby, the transmission switching lever L1 returns to the non-transmission position, and the sector lever L2 also returns to the rotation restricting position and engages with the protrusion Gs5. Thereby, the positions of the members return to the positions shown in FIG. 15.

In the process in which the sector gear Gs rotates from the second sector position to the first sector position, the sector gear Gs engages with the second gear G12 and rotates the second gear G12. At this time, since the first gear G11, the idle gears G3 and G4, and the output gear G2 have the same module and pitch diameter, and the second gear G12 and the sector gear Gs have the same module and pitch diameter, the second gear G12 rotates at the same speed as the first gear G11. Thus, no interference occurs between the second gear G12 and the first gear G11 due to a difference in rotation speed.

According to the fourth embodiment, the following effects are obtained.

In a state where the pressure plate 102 is maintained at the contact position, the transmission switching mechanism 410 is switchable alternately between the transmission state and the non-transmission state. Thus, when printing a plurality of sheets S, in a state where the pressure plate 102 is kept at the contact position, driving and stopping the second pickup roller 111 is switched. This suppresses the generation of noise due to the movement of the pressure plate 102 when printing a plurality of sheets S.

In the fourth embodiment, the sector gear Gs has the second tooth portion Gs2 and the spring holder H has the second tooth portion H2. However, a configuration may be employed in which the sector gear Gs does not have the second tooth portion Gs2 and the spring holder H does not have the second tooth portion H2.

The method of returning the sector gear from the second sector position to the first sector position is not limited to the method of the fourth embodiment. For example, a cam that rotates from the contact corresponding position toward the separation corresponding position by the drive force of the motor may be rotated to a passed position that has passed the separation corresponding position, and thereafter the motor may be stopped and the cam may be returned from the passed position to the separation corresponding position by the guiding surface of the concave portion at the distal end portion of the cam. In this case, the sector gear may be located at the first sector position when the cam is located at the passed position.

Fifth Embodiment

Next, a fifth embodiment of the present disclosure will be described in detail with reference to the drawings as appropriate. Since this embodiment differs from the first embodiment described above in the structure of the sheet conveyance device, components that are substantially the same as those of the first embodiment are denoted by the same reference numerals, and descriptions thereof are omitted.

Figure 26B:
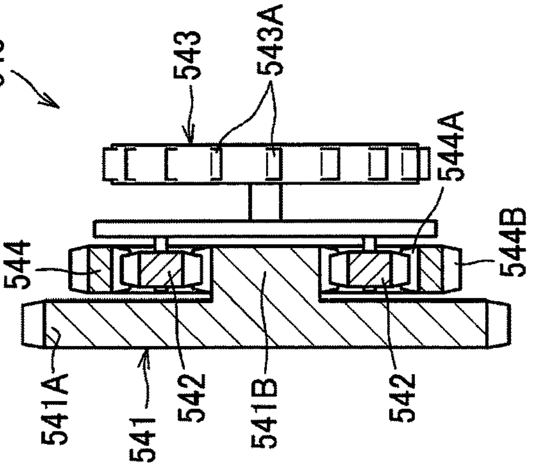
FIG. 26B is a cross-sectional view showing a planetary gear mechanism.
Figure 26A:
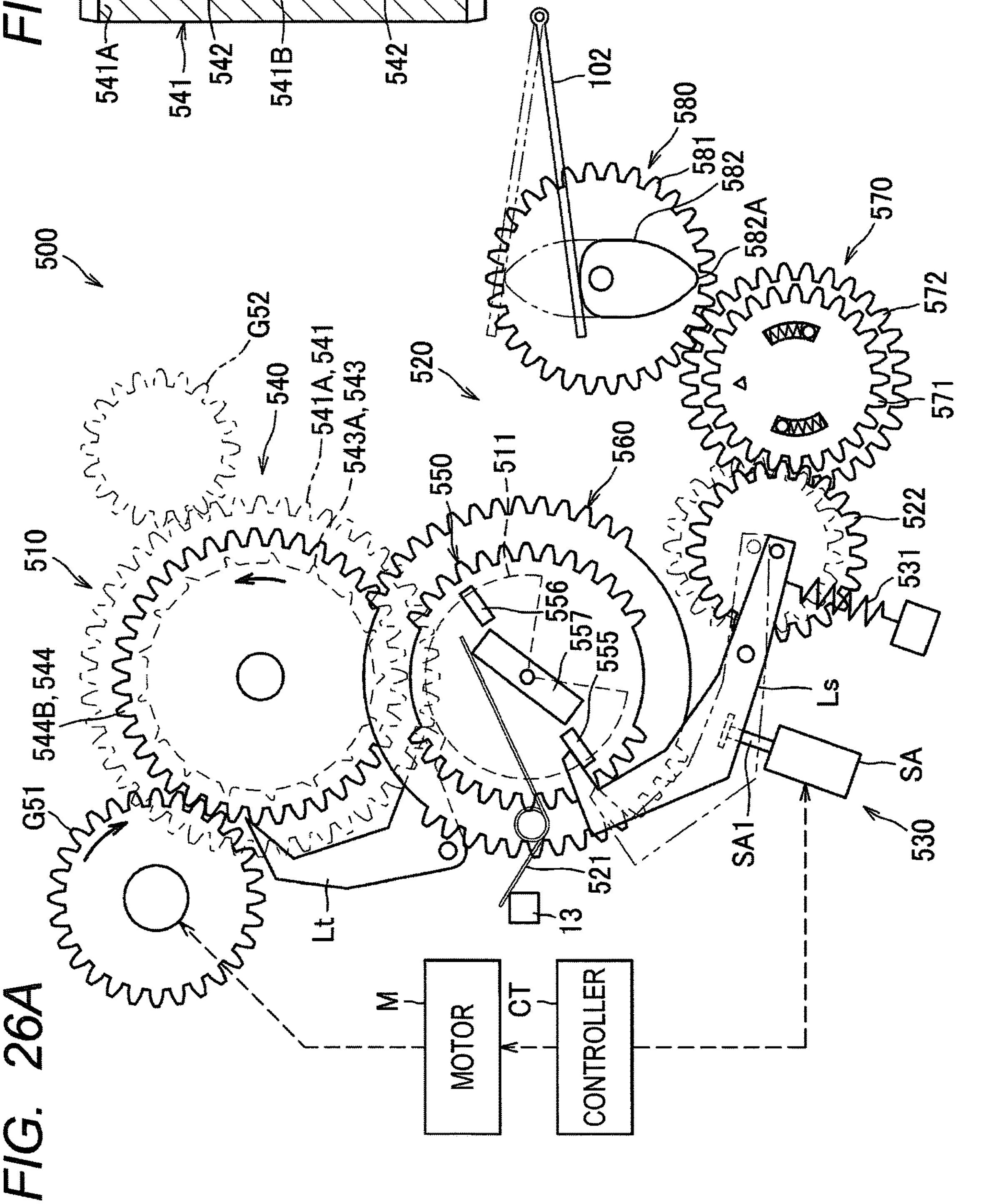
FIG. 26A is a view showing a sheet conveyance device.

As shown in FIG. 26A, a sheet conveyance device 500 according to the fifth embodiment includes a motor M, a push-up member 580, a transmission switching mechanism 510, a pressure plate operating mechanism 520, and a switching mechanism 530. The sheet conveyance device 500 also includes the manual feed tray 101, the pressure plate 102, and the second supply mechanism 110, which are substantially the same as those of the first embodiment as shown in FIG. 3.

As shown in FIG. 26A, the push-up member 580 is a member that pushes up the pressure plate 102 from a separated position to a contact position. The push-up member 580 includes a push-up gear 581 and a push-up cam 582.

The push-up gear 581 is a gear that receives drive force from the motor M via the pressure plate operating mechanism 520. The push-up cam 582 is a cam that rotates together with the push-up gear 581. The push-up cam 582 is switchable between a separation corresponding position indicated by a solid line in the figure and a contact corresponding position indicated by a two-dot chain line.

The push-up cam 582 has a contact portion 582A that contacts the pressure plate 102 when the pressure plate 102 is located at the contact position. The contact portion 582A is located within the range of the second pickup roller 111 in the width direction of the sheet S. Here, the width direction of the sheet S is the same direction as the axial direction of the second pickup roller 111.

The transmission switching mechanism 510 is a mechanism that is switchable between a transmission state in which the drive force of the motor M is transmitted to the second pickup roller 111 and a non-transmission state in which the drive force of the motor M is not transmitted to the second pickup roller 111. The transmission switching mechanism 510 includes a planetary gear mechanism 540, a transmission switching lever Lt, and a cam 511.

As shown in FIGS. 26A and 26B, the planetary gear mechanism 540 includes a sun gear 541, a plurality of planetary gears 542, a planetary carrier 543 as an example of a first component, and an outer gear 544. The planetary gear mechanism 540 has a structure that, when rotation of one of the three components of the sun gear 541, the planetary carrier 543, and the outer gear 544 is stopped, the remaining components rotate in an interlocking manner.

The sun gear 541 is a two-stage gear. The sun gear 541 includes a large-diameter gear portion 541A and a small-diameter gear portion 541B having a smaller diameter than the large-diameter gear portion 541A.

The plurality of planetary gears 542 are arranged around the small-diameter gear portion 541B and engage with the small-diameter gear portion 541B. The plurality of planetary gears 542 are rotatably attached to the planetary carrier 543.

The planetary carrier 543 is rotatable about the rotation axis of the sun gear 541. The planetary carrier 543 has a plurality of pawls 543A on its outer circumferential surface.

Figure 27B:
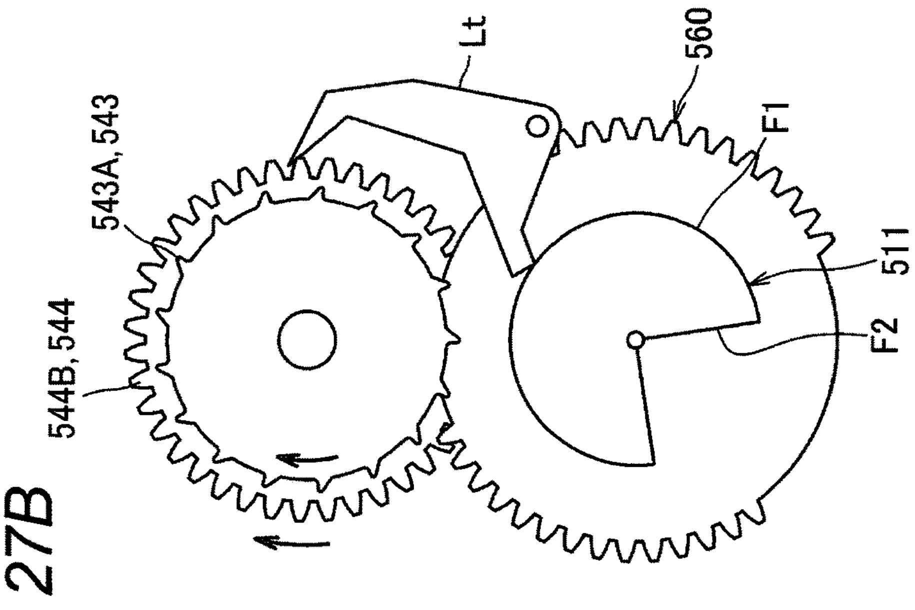
FIG. 27B is a view of the sheet conveyance device as seen from the cam side.
Figure 27A:
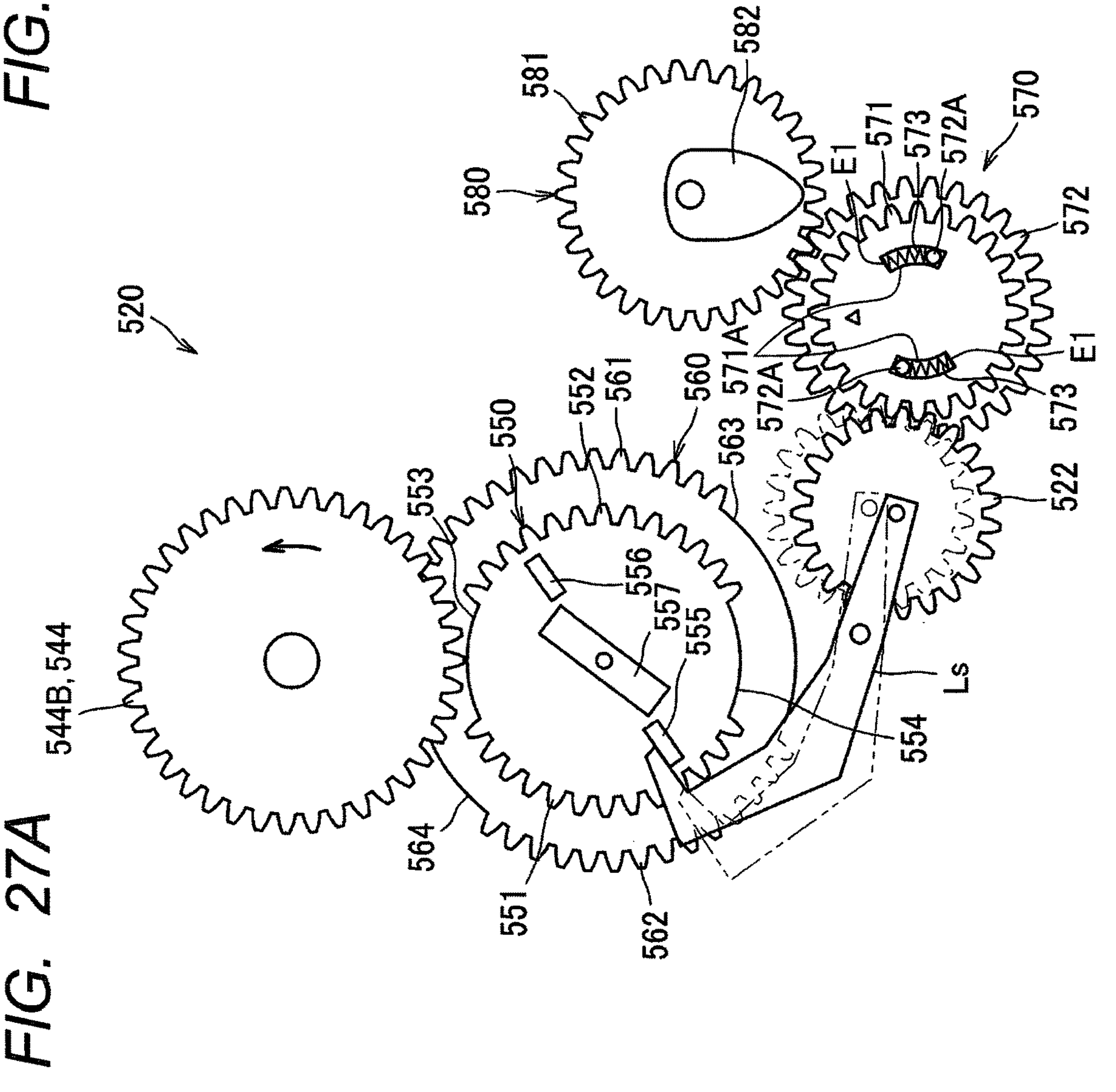
FIG. 27A is a view of the sheet conveyance device as seen from the sector gear side.

The outer gear 544 is a ring-shaped member. The outer gear 544 has internal teeth 544A located on the inner circumferential surface and external teeth 544B located on the outer circumferential surface. The internal teeth 544A engage with the planetary gears 542. In FIG. 26A, FIG. 27A, and so on described later, the internal teeth 544A of the outer gear 544, the planetary gears 542, and so on are omitted for the sake of convenience.

The external teeth 544B of the outer gear 544 engage with a gear G51 to which the drive force of the motor M is input. In this embodiment, the outer gear 544 is an example of an input gear to which the drive force of the motor M is input. The outer gear 544 and the motor M may be directly connected or may be indirectly connected via a plurality of gears. As for the other gears, similarly, the connection between two gears may be direct or indirect.

The large-diameter gear portion 541A of the sun gear 541 engages with a gear G52 that outputs drive force to the second separation roller 112 and the second pickup roller 111.

In a state where rotation of the planetary carrier 543 is stopped, the drive force from the motor M is transmitted to the second separation roller 112 and the second pickup roller 111 via the planetary gear mechanism 540. In a state where rotation of the planetary carrier 543 is allowed, the gear G52 and so on act as resistance to the rotation of the sun gear 541 and stop the rotation of the sun gear 541, thereby the drive force from the motor M is transmitted to the planetary carrier 543 and the planetary carrier 543 rotates idly. In other words, in a state where rotation of the planetary carrier 543 is allowed, the drive force from the motor M is not transmitted to the second pickup roller 111, and thus the second pickup roller 111 does not rotate.

The transmission switching lever Lt is a lever for stopping or allowing rotation of the planetary carrier 543. The transmission switching lever Lt is rotatable between a transmission position shown in FIG. 31B and a non-transmission position shown in FIG. 27B. When the transmission switching lever Lt is located at the transmission position, the transmission switching lever Lt engages with the pawl 543A of the planetary carrier 543 and stops rotation of the planetary carrier 543. Thus, when the transmission switching lever Lt is located at the transmission position, the transmission switching lever Lt causes the transmission switching mechanism 510 to be in the transmission state.

When the transmission switching lever Lt is located at the non-transmission position, the transmission switching lever Lt disengages from the pawl 543A of the planetary carrier 543, thereby allowing the planetary carrier 543 to rotate. Thus, when the transmission switching lever Lt is located at the non-transmission position, the transmission switching lever Lt causes the transmission switching mechanism 510 to be in the non-transmission state. The transmission switching lever Lt is urged from the non-transmission position toward the transmission position by a spring (not shown).

The cam 511 is a cam for switching the transmission switching lever Lt between the transmission position and the non-transmission position. As shown in FIG. 27B, the cam 511 has a cam surface F1 and a retracted surface F2.

The cam surface F1 is a cylindrical surface of which the center is the rotation axis of a sector gear 550. The cam surface F1 is configured to contact the transmission switching lever Lt. The retracted surface F2 is retracted farther toward the rotation axis of the sector gear 550 than the cam surface F1.

Figures 31A, 31B:
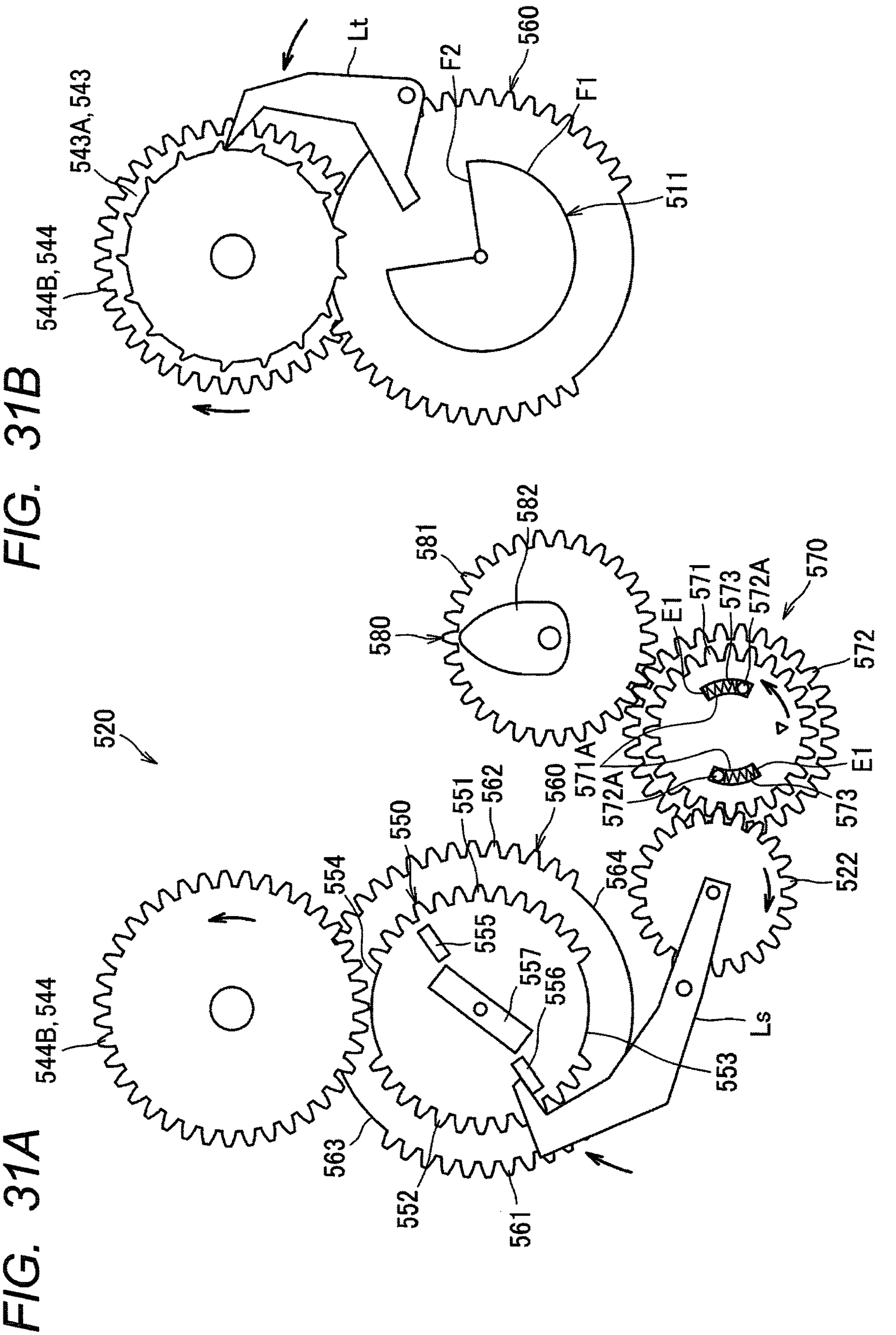
FIG. 31A is a diagram showing a state where a second protrusion of the sector lever is stopped by the sector lever at a position where the sector gear is rotated 180 degrees from the state in FIG. 27A.
FIG. 31B is a diagram showing a state where the transmission switching lever is switched to a transmission position.
Figure 32B:
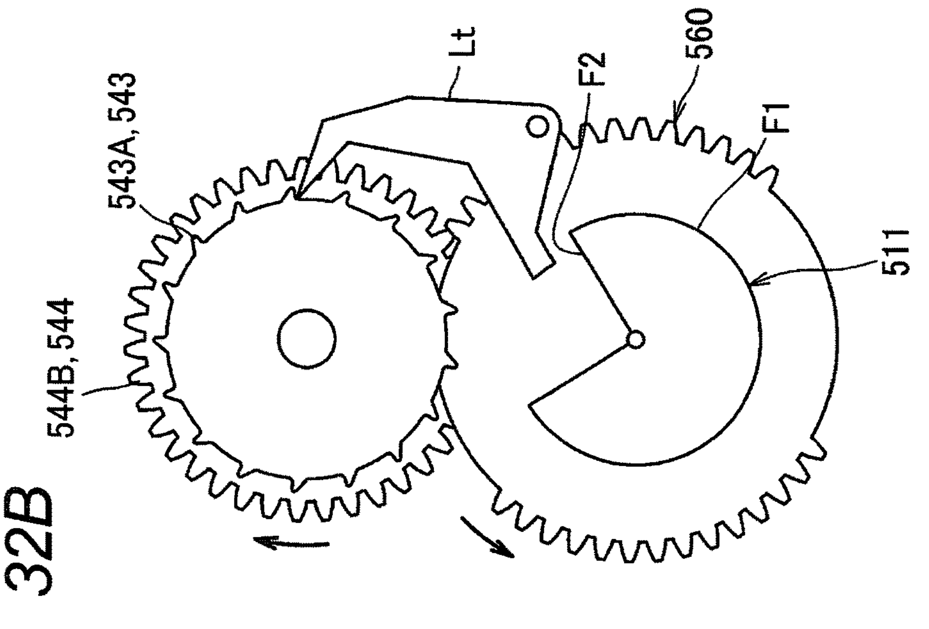
FIGS. 32A and 32B are diagrams showing a state where the sector lever is disengaged from the second protrusion and the sector gear is rotated from the state of FIGS. 31A and 31B.
Figure 32A:
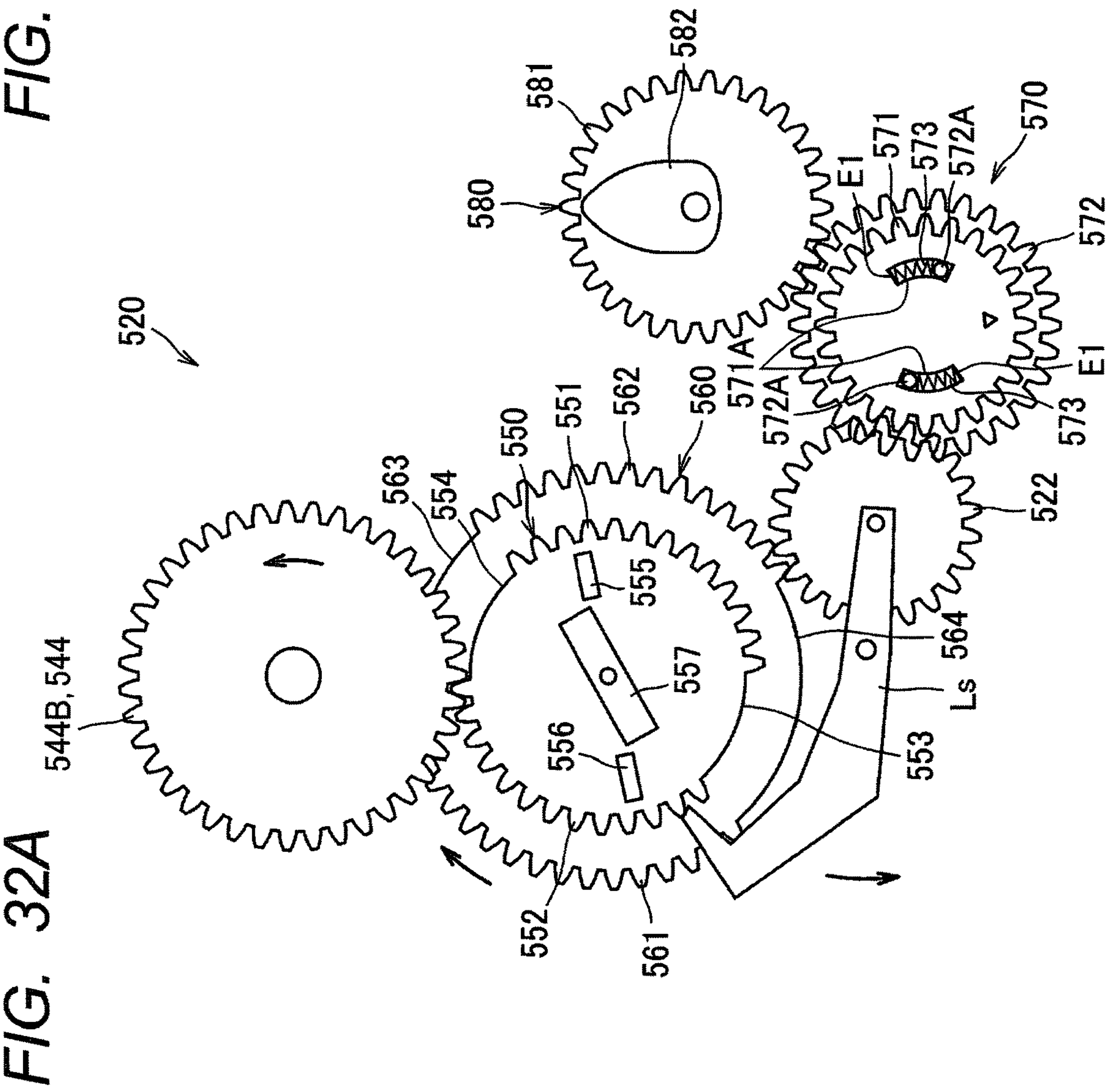
Figure 33B:
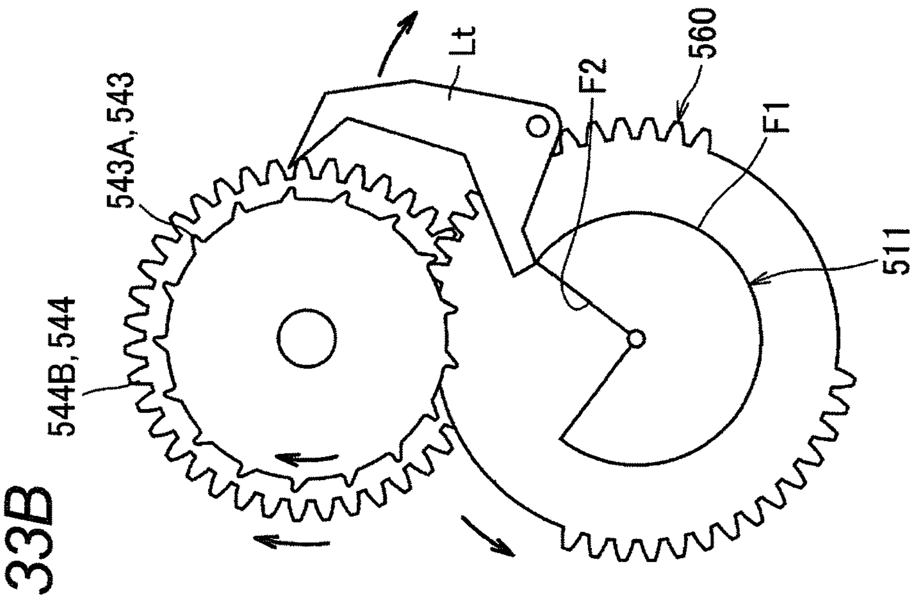
FIG. 33B is a view showing a state where the transmission switching lever is switched to a non-transmission position.
Figure 33A:
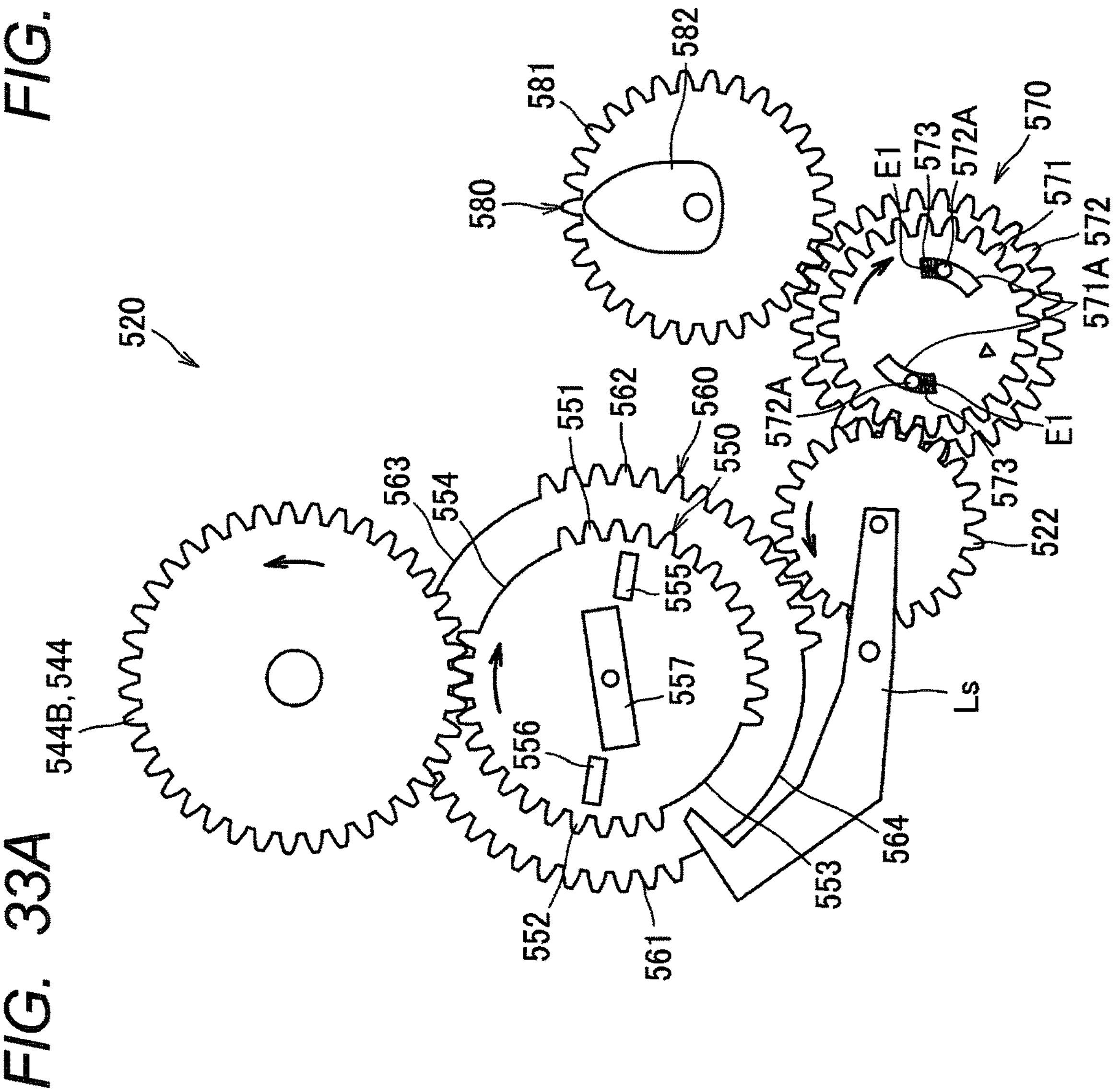
FIG. 33A is a view showing a state where the sector gear is rotated from the state of FIG. 32A.
Figure 34B:
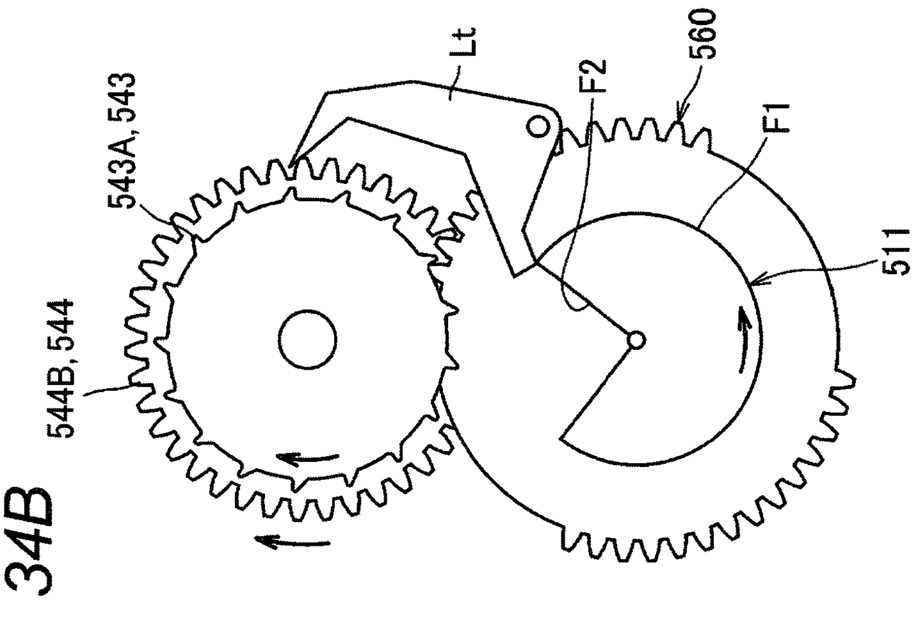
FIG. 34B is a diagram showing a state of the transmission switching lever.
Figure 34A:
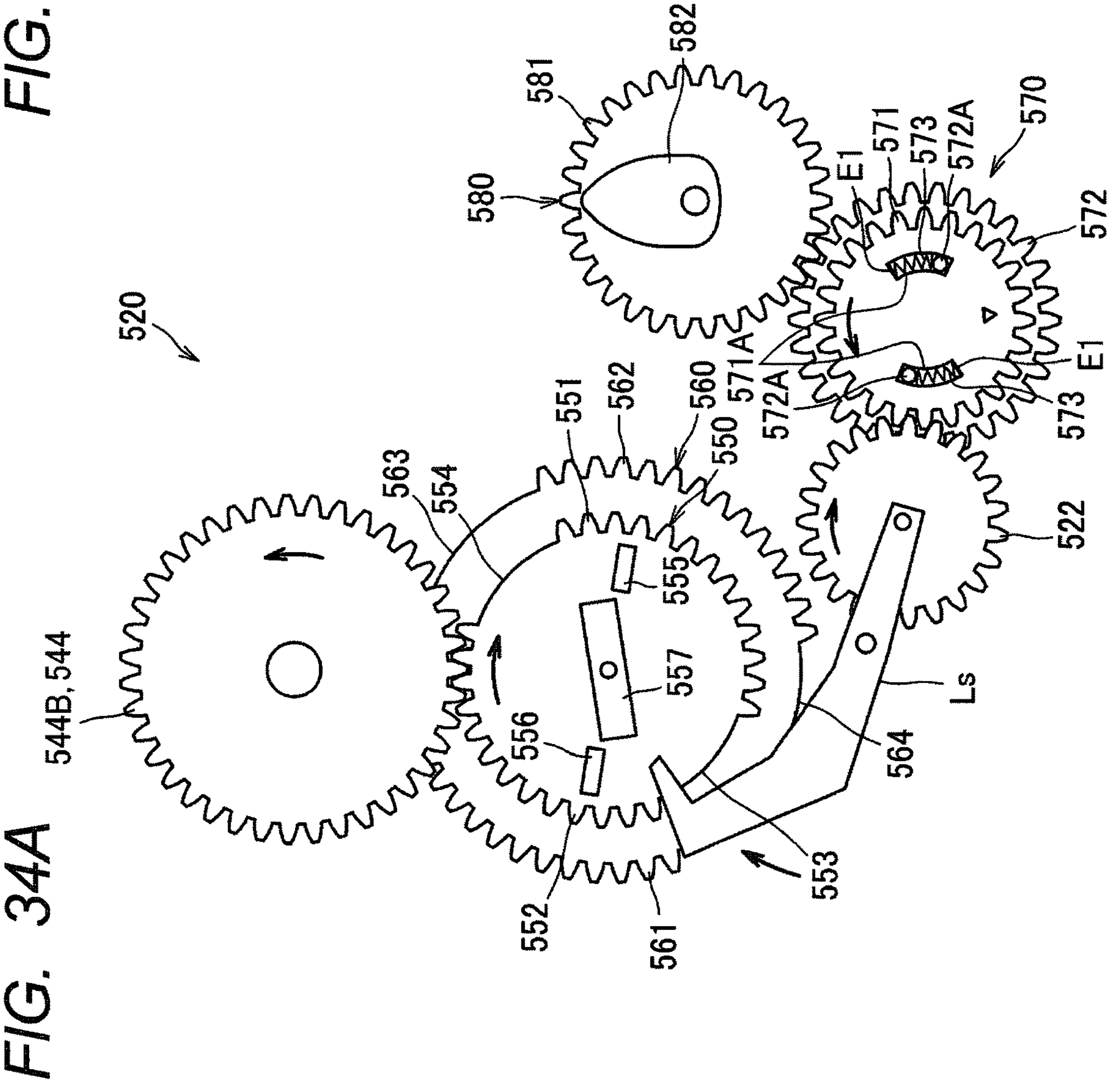
FIG. 34A is a diagram showing a state where an interlocking gear and a movable gear are disconnected and the upstream gear returns to its initial position.

When the cam 511 rotates from the state of FIG. 31B and the cam surface F1 contacts the transmission switching lever Lt, the cam surface F1 causes the transmission switching lever Lt to move from the transmission position to the non-transmission position against the urging force of the spring. When the cam 511 rotates from the state shown in FIG. 27B, the transmission switching lever Lt separates from the cam surface F1, and the retracted surface F2 faces the transmission switching lever Lt, the transmission switching lever Lt moves from the non-transmission position to the transmission position by the urging force of the spring.

The cam 511 rotates in conjunction with the sector gear 550 (described later) of the pressure plate operating mechanism 520. Specifically, the cam 511 rotates together with the sector gear 550 about the rotation axis of the sector gear 550.

The sector gear 550 is configured to rotate 180 degrees, which is an example of a second angle, as will be described later. Thereby, each time the sector gear 550 rotates 180 degrees, the cam 511 is switched to the position shown in FIG. 31B or the position shown in FIG. 27B and the transmission switching lever Lt is switched to the transmission position or the non-transmission position. Thus, the transmission switching mechanism 510 is configured to switch the state between the transmission state and the non-transmission state each time the sector gear 550 rotates 180 degrees.

As shown in FIG. 26A, the pressure plate operating mechanism 520 is switchable between an operating state in which the pressure plate 102 is operated by using the drive force of the motor M, and a non-operating state in which the drive force of the motor M is cut off so as not to operate the pressure plate 102. The pressure plate operating mechanism 520 includes the above-described outer gear 544, the sector gear 550, an interlocking gear 560, a spring 521, a movable gear 522, a gear unit 570, and the push-up member 580.

As shown in FIG. 27A, the sector gear 550 has a first tooth portion 551, a second tooth portion 552, a first toothless portion 553, and a second toothless portion 554 on the outer circumferential surface. The first tooth portion 551 and the second tooth portion 552 are portions that are engageable with the external teeth 544B of the outer gear 544. The first toothless portion 553 and the second toothless portion 554 are portions that are not engageable with the external teeth 544B of the outer gear 544. The first tooth portion 551, the second tooth portion 552, the first toothless portion 553, and the second toothless portion 554 are arranged on the outer circumferential surface of the sector gear 550 in the order of the first toothless portion 553, the first tooth portion 551, the second toothless portion 554, and the second tooth portion 552.

Specifically, toward the upstream side in the rotation direction of the sector gear 550 (see FIG. 28A), the first toothless portion 553, the first tooth portion 551, the second toothless portion 554, and the second tooth portion 552 are arranged in this order. Here, the rotation direction of the sector gear 550 is the rotation direction of the sector gear 550 when the sector gear 550 receives the drive force from the outer gear 544, and is the clockwise direction in FIG. 28A.

The first toothless portion 553 is located upstream of the second tooth portion 552 in the rotation direction of the sector gear 550. The first tooth portion 551 is located upstream of the first toothless portion 553 in the rotation direction of the sector gear 550. The second toothless portion 554 is located upstream of the first tooth portion 551 in the rotation direction of the sector gear 550. The second tooth portion 552 is located upstream of the second toothless portion 554 in the rotation direction of the sector gear 550.

The sector gear 550 includes a first protrusion 555, a second protrusion 556, and a spring contact portion 557. The first protrusion 555, the second protrusion 556, and the spring contact portion 557 protrude from a surface of the sector gear 550 on one side in the axial direction. The first protrusion 555 and the second protrusion 556 are protrusions with which a sector lever Ls described later is engageable.

When the sector lever Ls engages with the first protrusion 555, the first toothless portion 553 faces the outer gear 544 and the drive force is not transmitted from the outer gear 544 to the sector gear 550. As shown in FIG. 31A, when the sector lever Ls engages with the second protrusion 556, the second toothless portion 554 faces the outer gear 544 and the drive force is not transmitted from the outer gear 544 to the sector gear 550.

As shown in FIG. 26A, the spring contact portion 557 is a portion with which the spring 521 makes contact. The spring 521 urges the sector gear 550 in the rotation direction of the sector gear 550. The spring 521 is, for example, a torsion spring. One end of the spring 521 contacts the spring contact portion 557. The other end of the spring 521 contacts a portion 13 of the main housing 10.

The interlocking gear 560 is a gear that rotates together with the sector gear 550. The interlocking gear 560 is fixed to or integrally formed with the surface of sector gear 550 on the other side in the axial direction. As shown in FIG. 27B, the interlocking gear 560 has the above-mentioned cam 511 on the surface opposite to the surface on which the sector gear 550 is located. The cam 511 is fixed to or integrally formed with the interlocking gear 560.

As shown in FIG. 27A, the interlocking gear 560 includes a third tooth portion 561, a fourth tooth portion 562, a third toothless portion 563, and a fourth toothless portion 564 on the outer circumferential surface. The third tooth portion 561 and the fourth tooth portion 562 are portions that are engageable with the movable gear 522 located at a connection position (the position indicated by a two-dot chain line) described later. The number of teeth of the third tooth portion 561 and the fourth tooth portion 562 is the number that causes a downstream gear 572 described later to be rotated 180 degrees. Specifically, the number of teeth of the third tooth portion 561 and the fourth tooth portion 562 is the number that causes an upstream gear 571 described later to be rotated by an angle obtained by adding 180 degrees to the first angle.

The third toothless portion 563 and the fourth toothless portion 564 are portions that are not engageable with the movable gear 522 located at the connection position. The third tooth portion 561, the fourth tooth portion 562, the third toothless portion 563, and the fourth toothless portion 564 are arranged on the outer circumferential surface of the interlocking gear 560 in the order of the third toothless portion 563, the third tooth portion 561, the fourth toothless portion 564, and the fourth tooth portion 562.

Specifically, toward the upstream side in the rotation direction of the interlocking gear 560, the third toothless portion 563, the third tooth portion 561, the fourth toothless portion 564, and the fourth tooth portion 562 are arranged in this order. Here, the rotation direction of the interlocking gear 560 is the same direction as the rotation direction of the sector gear 550.

The third toothless portion 563 is located upstream of the fourth tooth portion 562 in the rotation direction of the interlocking gear 560. The third tooth portion 561 is located upstream of the third toothless portion 563 in the rotation direction of the interlocking gear 560. The fourth toothless portion 564 is located upstream of the third tooth portion 561 in the rotation direction of the interlocking gear 560. The fourth tooth portion 562 is located upstream of the fourth toothless portion 564 in the rotation direction of the interlocking gear 560.

When the sector lever Ls engages with the first protrusion 555, the third toothless portion 563 faces the movable gear 522. As shown in FIG. 31A, when the sector lever Ls engages with the second protrusion 556, the fourth toothless portion 564 faces the movable gear 522.

As shown in FIG. 27A, the movable gear 522 is movable between a connection position indicated by a two-dot chain line and a separation position indicated by a solid line. When the movable gear 522 is located at the connection position, the movable gear 522 are engageable with the third tooth portion 561 or the fourth tooth portion 562 of the interlocking gear 560. Thus, when the movable gear 522 is located at the connection position, the movable gear 522 receives the drive force from the sector gear 550.

When the movable gear 522 is located at the separation position, the movable gear 522 is not engageable with the third tooth portion 561 or the fourth tooth portion 562 of the interlocking gear 560. Thus, when the movable gear 522 is located at the separation position, the movable gear 522 does not receive the drive force from the sector gear 550. The movable gear 522 is rotatably supported by the sector lever Ls described later.

The gear unit 570 has a function of operating the pressure plate 102 by the drive force transmitted from the movable gear 522. Specifically, the gear unit 570 operates the pressure plate 102 by transmitting the drive force transmitted from the movable gear 522 to the push-up member 580.

The gear unit 570 includes an upstream gear 571, a downstream gear 572, and springs 573. The upstream gear 571 engages with the movable gear 522 located at the connection position. In this embodiment, the upstream gear 571 engages with the movable gear 522 even when the movable gear 522 is located at the separation position.

The upstream gear 571 has two grooves 571A. Each groove 571A is formed in an arc shape of which the center is the rotation axis of the upstream gear 571. The two grooves 571A are point symmetrical with respect to the rotation axis of the upstream gear 571.

The downstream gear 572 is a gear that rotates together with the upstream gear 571 when the upstream gear 571 rotates by the first angle or more. Here, the first angle is an angle smaller than 180 degrees, and in this embodiment, an angle smaller than 90 degrees.

The downstream gear 572 has two protrusions 572A. The protrusions 572A are fitted in the grooves 571A of the upstream gear 571. Specifically, one protrusion 572A is fitted in one groove 571A, and the other protrusion 572A is fitted in the other groove 571A.

One protrusion 572A is separated from an upstream end μl of one groove 571A in the rotation direction of the upstream gear 571. Here, the rotation direction of the upstream gear 571 is the direction in which the upstream gear 571 rotates by the drive force of the motor M. The other protrusion 572A is separated from an upstream end μl of the other groove 571A in the rotation direction of the upstream gear 571.

The spring 573 urges the upstream gear 571 toward an initial position. Here, the initial position means the position of the upstream gear 571 when the drive force of the motor M is not input to the upstream gear 571. The initial position when the pressure plate 102 is located at the separated position is the position shown in FIG. 27A. The initial position when the pressure plate 102 is located at the contact position is the position shown in FIG. 31A, that is, the position rotated 180 degrees from the position shown in FIG. 27A.

One spring 573 is arranged in each of one groove 571A and the other groove 571A. One spring 573 is located between one protrusion 572A and the upstream end μl of one groove 571A. The other spring 573 is located between the other protrusion 572A and the upstream end μl of the other groove 571A.

Figure 29B:
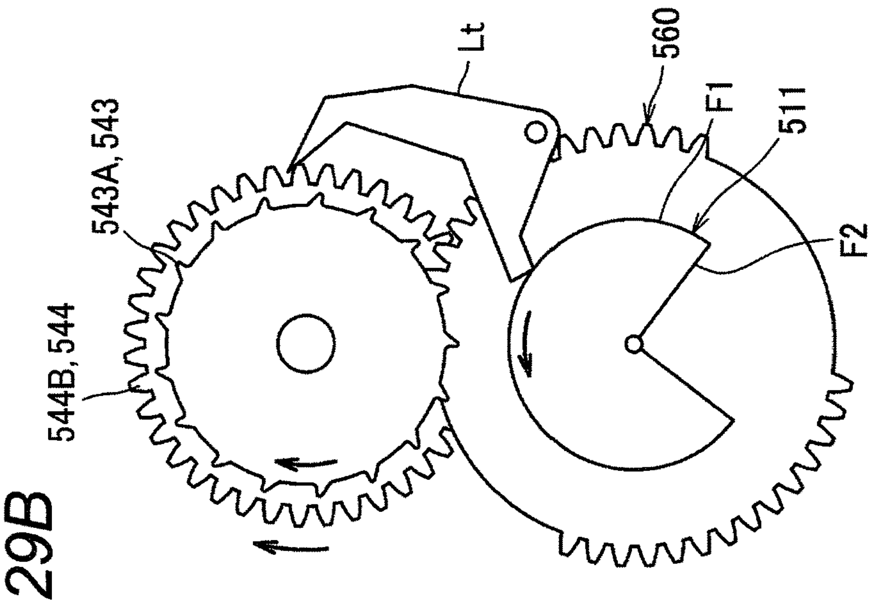
FIGS. 29A and 29B are diagrams showing a state where the sector gear is rotated from the state shown in FIGS. 28A and 28B and an upstream gear is rotated relative to a downstream gear.
Figure 29A:
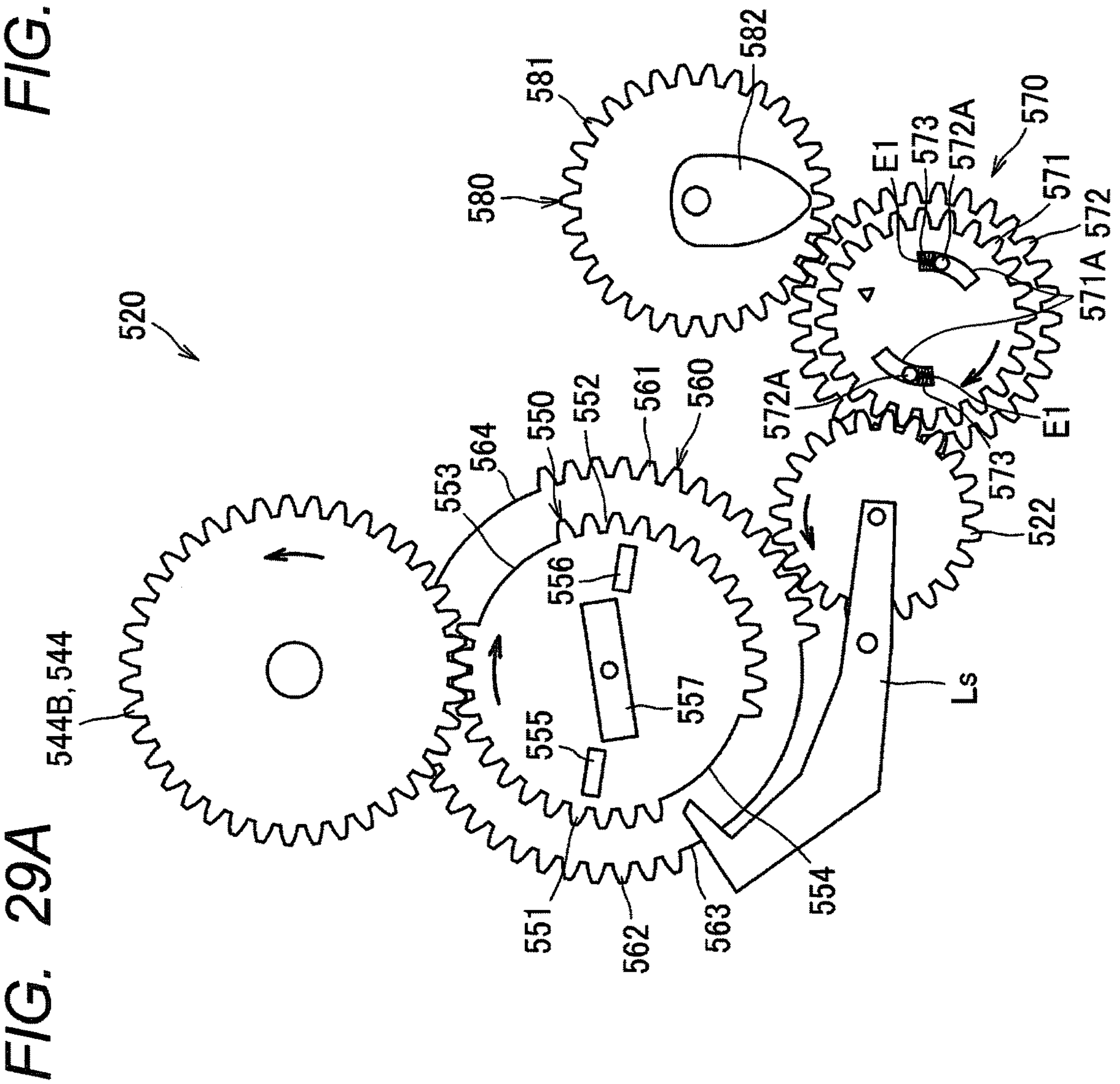
Figures 30A, 30B:
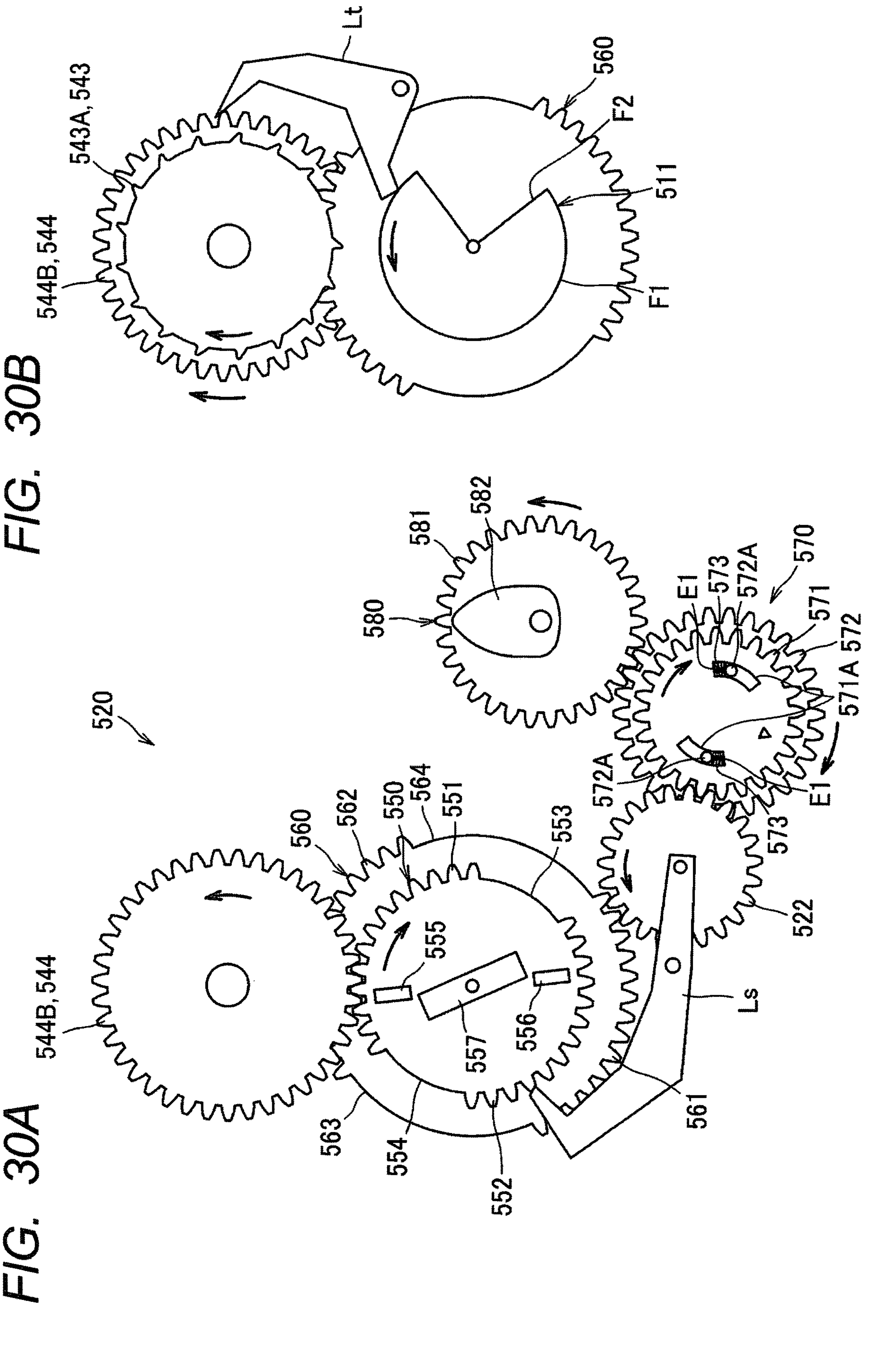
FIGS. 30A and 30B are diagrams showing a state where the sector gear is rotated from the state of FIGS. 29A and 29B and the downstream gear is rotated together with the upstream gear.

Drive force is transmitted to the downstream gear 572 from the upstream gear 571 via the spring 573. Specifically, as shown in FIG. 29A, when the upstream gear 571 rotates from the initial position within a range less than the first angle, the spring 573 is compressed between the upstream gear 571 and the downstream gear 572, and the downstream gear 572 does not rotate. As shown in FIG. 30A, when the upstream gear 571 rotates from the initial position by an angle of the first angle or more, the upstream gear 571 pushes the downstream gear 572 via the spring 573, causing the downstream gear 572 to rotate together with the upstream gear 571.

When all the teeth of the third tooth portion 561 or the fourth tooth portion 562 of the interlocking gear 560 push the teeth of the movable gear 522, the downstream gear 572 rotates 180 degrees. The downstream gear 572 engages with the push-up gear 581. Thus, each time the downstream gear 572 rotates 180 degrees, the push-up member 580 also rotates 180 degrees.

As shown in FIG. 26A, the switching mechanism 530 is a mechanism for switching the state of the pressure plate operating mechanism 520. The switching mechanism 530 includes the sector lever Ls, a solenoid actuator SA, and a spring 531.

The sector lever Ls is rotatable between a rotation restricting position indicated by a solid line in the figure and a rotation allowing position indicated by a two-dot chain line. When the sector lever Ls is located at the rotation restricting position, by engaging with the first protrusion 555 or the second protrusion 556 of the sector gear 550, the sector lever Ls stops rotation of the sector gear 550 due to the urging force of the spring 521. When the sector lever Ls is located at the rotation allowing position, by separating from the first protrusion 555 or the second protrusion 556 of the sector gear 550, the sector lever Ls allows rotation of the sector gear 550 due to the urging force of the spring 521.

One end of the sector lever Ls engages with the first protrusion 555 or the second protrusion 556. The other end of the sector lever Ls rotatably supports the movable gear 522. A rotation shaft of the sector lever Ls is located between one end and the other end of the sector lever Ls.

When the sector lever Ls is located at the rotation restricting position, the movable gear 522 is located at the separation position. When the sector lever Ls is located at the rotation allowing position, the movable gear 522 is located at the connection position.

The solenoid actuator SA is an actuator for moving the sector lever Ls between the rotation restricting position and the rotation allowing position. The solenoid actuator SA includes a piston SA1 that advances and retracts. The piston SA1 engages with the sector lever Ls. The piston SA1 is movable between an advanced position shown in the figure and a retracted position (not shown).

The spring 531 urges the sector lever Ls from the rotation allowing position toward the rotation restricting position.

When the solenoid actuator SA is energized, the solenoid actuator SA is actuated, and the piston SA1 moves from the advanced position to the retracted position to pull the sector lever Ls. Thereby, the sector lever Ls moves from the rotation restricting position to the rotation allowing position against the urging force of the spring 531.

When energization of the solenoid actuator SA is stopped, the piston SA1 moves from the retracted position to the advanced position. Thereby, the sector lever Ls moves from the rotation allowing position to the rotation restricting position by the urging force of the spring 531.

As shown in FIG. 26A, the controller CT includes a CPU, a ROM, a RAM, a non-volatile memory, and so on, and is configured to perform various controls based on programs prepared in advance. The controller CT has a function of, when printing a plurality of sheets S, moving the pressure plate 102 from the separated position to the contact position, and then intermittently driving the second pickup roller 111 to convey a plurality of sheets S, without moving the pressure plate 102 from the contact position.

The operation of the controller CT will be described in detail below. In a state where the controller CT does not receive a print instruction, the position of each component is the position shown in FIG. 26A.

In response to receiving a print instruction for printing a plurality of sheets S, the controller CT first rotates the motor M. Then, the gear G51, the outer gear 544, and the planetary carrier 543 rotate.

Figure 28B:
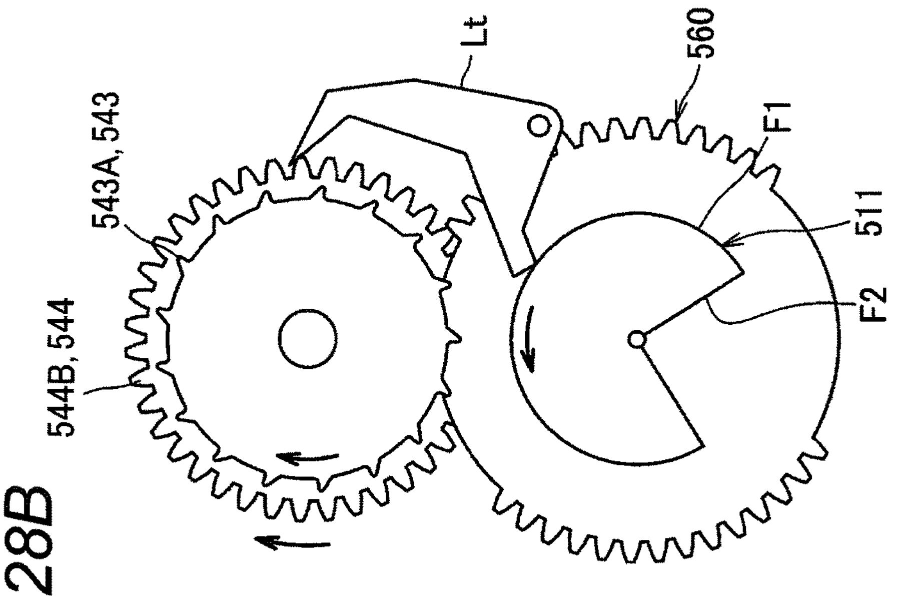
FIGS. 28A and 28B show a state where the sector lever is disengaged from a first protrusion and the sector gear is rotated from the state shown in FIGS. 27A and 27B.
Figure 28A:
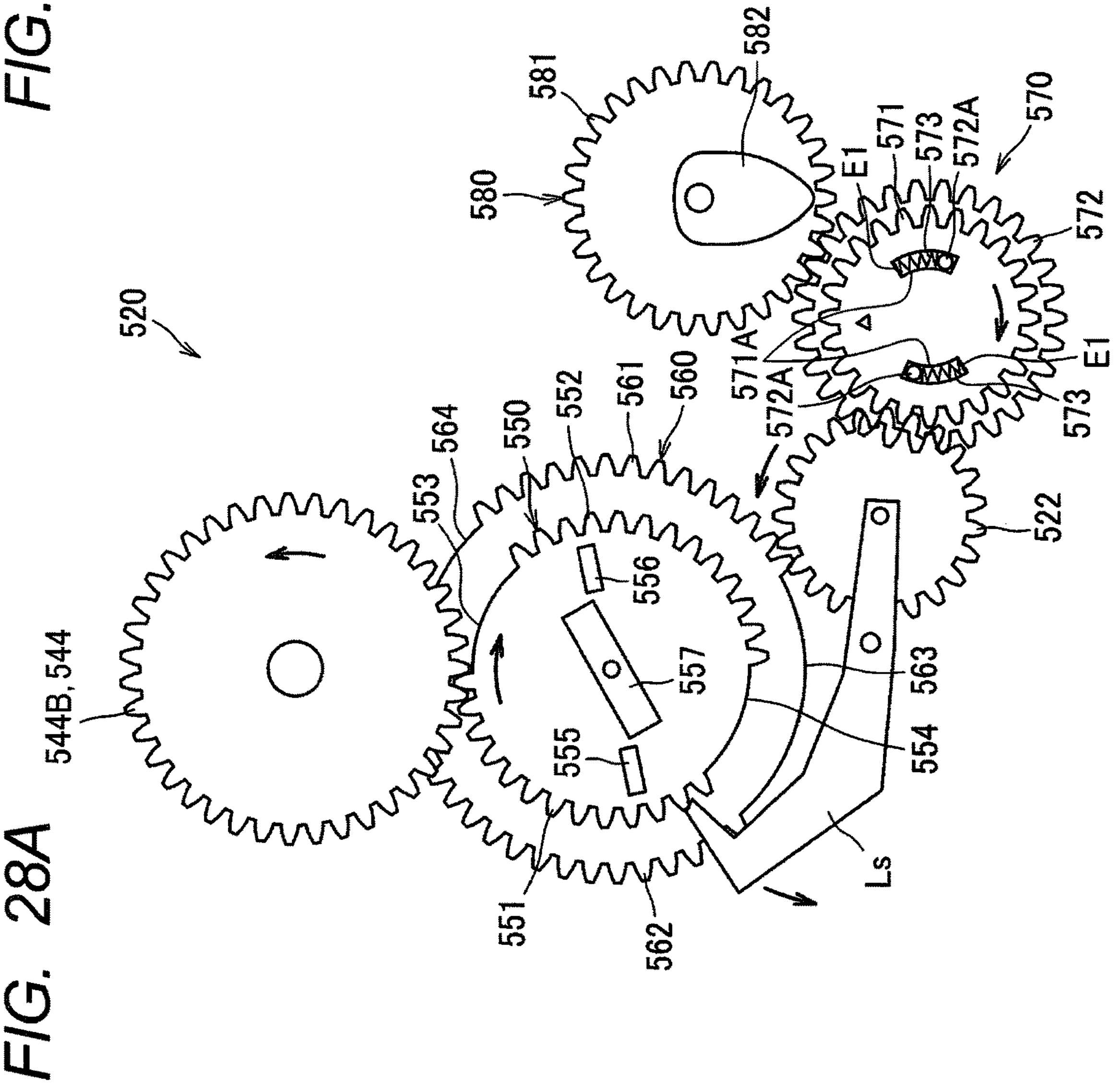

After that, when the controller CT energizes the solenoid actuator SA to operate the solenoid actuator SA, as shown in FIG. 28A, the sector lever Ls rotates from the rotation restricting position to the rotation allowing position. Thereby, the sector lever Ls separates from the first protrusion 555 of the sector gear 550, and the movable gear 522 moves from the separation position to the connection position.

When energizing the solenoid actuator SA for the first time after receiving a print instruction, the controller CT sets an energizing time to a first time required to move the pressure plate 102 from the separated position to the contact position. Thus, the actuation time of the solenoid actuator SA is the first time, and the sector lever Ls is maintained at the rotation allowing position during the first time.

When the sector lever Ls separates from the first protrusion 555, as shown in FIGS. 28A and 28B, the sector gear 550, the interlocking gear 560, and the cam 511 rotate by the urging force of the spring 521 shown in FIG. 26A. Thereby, the first tooth portion 551 of the sector gear 550 engages with the outer gear 544, and the third tooth portion 561 of the interlocking gear 560 engages with the movable gear 522 located at the connection position.

In the present embodiment, a first timing at which the first tooth portion 551 engages with the outer gear 544 is substantially the same as a second timing at which the third tooth portion 561 engages with the movable gear 522. However, the second timing may be later than the first timing.

When the sector gear 550 is connected to the outer gear 544 and the interlocking gear 560 is connected to the movable gear 522, the drive force of the motor M is transmitted from the outer gear 544 to the movable gear 522 via the sector gear 550 and the interlocking gear 560. This causes the movable gear 522 and the upstream gear 571 to rotate.

When the upstream gear 571 rotates, as shown in FIG. 29A, the springs 573 are compressed between the upstream gear 571 and the downstream gear 572. During this time, the downstream gear 572 does not move.

When the upstream gear 571 rotates from the initial position by the first angle or more, as shown in FIG. 30A, the upstream gear 571 pushes the downstream gear 572 via the springs 573, and thus the downstream gear 572 rotates together with the upstream gear 571. When the downstream gear 572 rotates, the push-up member 580 rotates from the separation corresponding position to the contact corresponding position, and the pressure plate 102 rotates from the separated position toward the contact position.

When the third tooth portion 561 of the interlocking gear 560 separates from the movable gear 522 located at the connection position, as shown in FIG. 31A, the downstream gear 572 stops at a position rotated 180 degrees from the initial position. Thereby, the push-up member 580 stops at the contact corresponding position, and the pressure plate 102 is maintained at the contact position.

Further, when the third tooth portion 561 of the interlocking gear 560 separates from the movable gear 522, due to the urging force of the spring 573, the upstream gear 571 rotates relative to the stopped downstream gear 572 and moves to the initial position.

After the first time has elapsed since the start of energization of the solenoid actuator SA, the controller CT stops energizing the solenoid actuator SA. The first time is set to be longer than a time from the start of energization of the solenoid actuator SA until the downstream gear 572 rotates 180 degrees from the initial position.

When the energization of the solenoid actuator SA is stopped, the sector lever Ls rotates from the rotation allowing position to the rotation restricting position. Thereby, the sector lever Ls becomes engageable with the second protrusion 556 of the sector gear 550, and the movable gear 522 moves from the connection position to the separation position.

When the first tooth portion 551 of the sector gear 550 separates from the outer gear 544, the drive force of the motor M is no longer transmitted to the sector gear 550, but the sector gear 550 rotates due to the urging force of the spring 521. Thereby, the second protrusion 556 of the sector gear 550 engages with the sector lever Ls located at the rotation restricting position, and the rotation of the sector gear 550 is stopped. That is, the sector gear 550 stops at a position rotated 180 degrees from the position shown in FIG. 27A.

As the sector gear 550 rotates 180 degrees, as shown in FIGS. 27B to 31B, the cam 511 also rotates 180 degrees. Since the cam surface F1 of the cam 511 separates from the transmission switching lever Lt, the transmission switching lever Lt moves from the non-transmission position to the transmission position. Thereby, the state of the transmission switching mechanism 510 is switched from the non-transmission state to the transmission state.

When the transmission switching lever Lt moves from the non-transmission position to the transmission position, rotation of the planetary carrier 543 is stopped. Thereby, the sun gear 541 rotates together with the outer gear 544, and thus the second pickup roller 111 rotates and the conveyance of the first sheet S is started.

In order to convey the sheet S to the registration roller 26 by the second pick-up roller 111 that is rotating, a particular time after energization of the solenoid actuator SA is stopped, the controller CT performs energization of the solenoid actuator SA during a second time. Here, the second time is a period of time during which the upstream gear 571 rotates less than the first angle, and is shorter than the first time.

When the actuation time of the solenoid actuator SA is the second time, as shown in FIGS. 32A to 34A, the movable gear 522 is located at the connection position during the second time and then moves to the separation position. Since the drive force of the motor M is transmitted to the upstream gear 571 during the second time, the upstream gear 571 rotates by a small angle less than the first angle, and then returns to the initial position by the urging force of the spring 573. Thus, when the actuation time of the solenoid actuator SA is the second time, the downstream gear 572 does not rotate. Thus, the position of the pressure plate 102 is maintained at the contact position.

When the actuation time of the solenoid actuator SA is the second time, too, the sector gear 550 rotates 180 degrees and then stops. Specifically, after the sector lever Ls separates from the second protrusion 556, the sector gear 550 rotates 180 degrees by the urging force of the spring 521 and the drive force from the outer gear 544, and then stops due to engagement of the first protrusion 555 with the sector lever Ls. Thereby, as shown in FIGS. 32B to 34B, since the cam surface F1 of the cam 511 pushes the transmission switching lever Lt, the transmission switching lever Lt moves from the transmission position to the non-transmission position, and the state of transmission switching mechanism 510 is switched from the transmission state to the non-transmission state.

After that, the controller CT performs a short-time energization process of energizing the solenoid actuator SA during the second time for the number of times corresponding to the remaining sheets S. Specifically, in order to convey one sheet S, the controller CT performs the short-time energization process twice, thereby switching the state of the transmission switching mechanism 510 from the non-transmission state to the transmission state and then switching from the transmission state to the non-transmission state. The interval between two short-time energization processes corresponding to one sheet S is set to an interval corresponding to the time required to convey one sheet S to the registration roller 26.

When conveying the last sheet S, the controller CT performs the short-time energization process once, and then performs a long-time energization process once in which the solenoid actuator SA is energized during the first time. Thereby, in the short-time energization process the conveyance of the sheet S is started while the pressure plate 102 is maintained at the contact position, and in the long-time energization process the rotation of the second pick-up roller 111 is stopped and the position of the pressure plate 102 is returned to the separated position.

That is, when printing a plurality of sheets S, for the first sheet S, the controller CT performs the long-time energization process, and then performs the short-time energization process, thereby moving the pressure plate 102 to the contact position and conveying the first sheet S. When printing sheets S other than the last sheet S among the remaining sheets S, the controller CT performs two short-time energization processes on one sheet S, thereby conveying the sheets S one sheet at a time while maintaining the pressure plate 102 at the contact position. When printing the last sheet S, the controller CT performs the short-time energization processing and then performs the long-time energization process, thereby conveying the last sheet S and then moving the pressure plate 102 to the separated position.

As described above, according to the fifth embodiment, the following effects are obtained.

When the solenoid actuator SA is actuated during the second time shorter than the first time in a state where the pressure plate 102 is located at the contact position, the state of the transmission switching mechanism 510 is switched to the transmission state or the non-transmission state while the pressure plate 102 is maintained at the contact position. Thus, when printing a plurality of sheets S, driving and stopping the second pickup roller 111 is switched while maintaining the pressure plate 102 at the contact position. Thus, when printing a plurality of sheets S, the generation of noise due to the movement of the pressure plate 102 is suppressed.

Sixth Embodiment

Next, a sixth embodiment of the present disclosure will be described in detail with reference to the drawings as appropriate. Since the sixth embodiment is obtained by changing the position of the gear unit 570 in the above-described fifth embodiment, components that are substantially the same as those of the fifth embodiment are denoted by the same reference numerals, and description thereof are omitted.

Figure 35B:
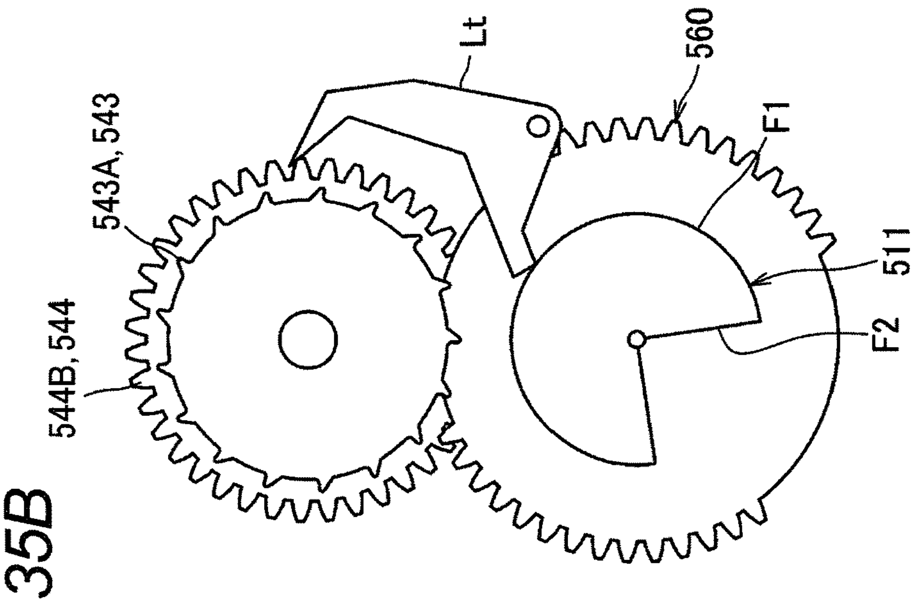
FIG. 35B is a view of the sheet conveyance device as seen from a cam side.
Figure 35A:
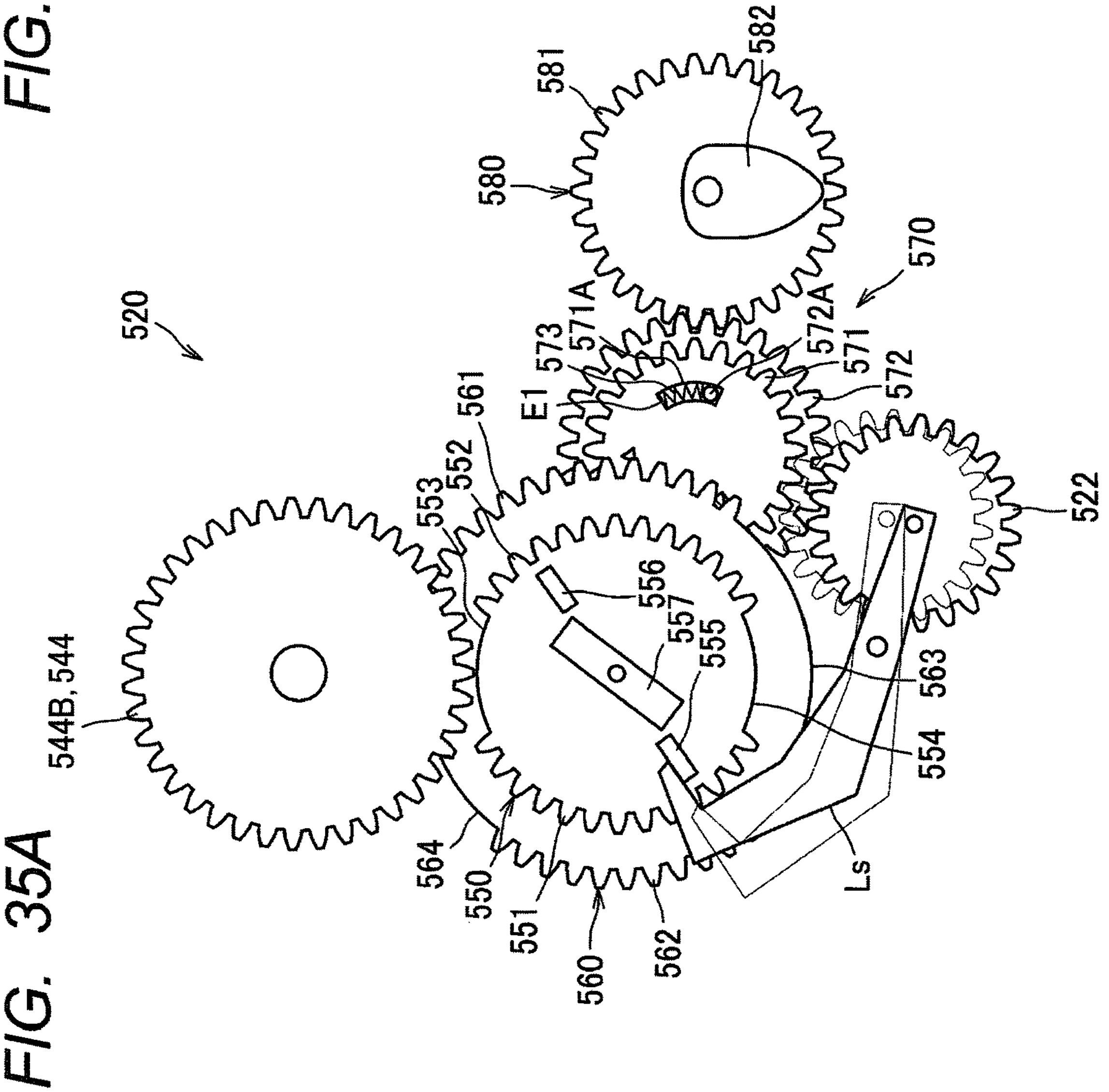
FIG. 35A is a view of a sheet conveyance device as seen from a sector gear side.

As shown in FIGS. 35A and 35B, the upstream gear 571 of the gear unit 570 of the sixth embodiment is located at a position where the upstream gear 571 engages with the movable gear 522 located at the connection position and does not engage with the movable gear 522 located at the separation position. According to the sixth embodiment, the movable gear 522 is moved smoothly.

Seventh Embodiment

Next, a seventh embodiment of the present disclosure will be described in detail with appropriate reference to FIG. 36. The present embodiment is obtained by partially changing the structure of the sheet conveyance device 400 according to the fourth embodiment. Thus, the components that are substantially the same as those of the fourth embodiment are denoted by the same reference numerals, and descriptions thereof are omitted.

Figure 36:
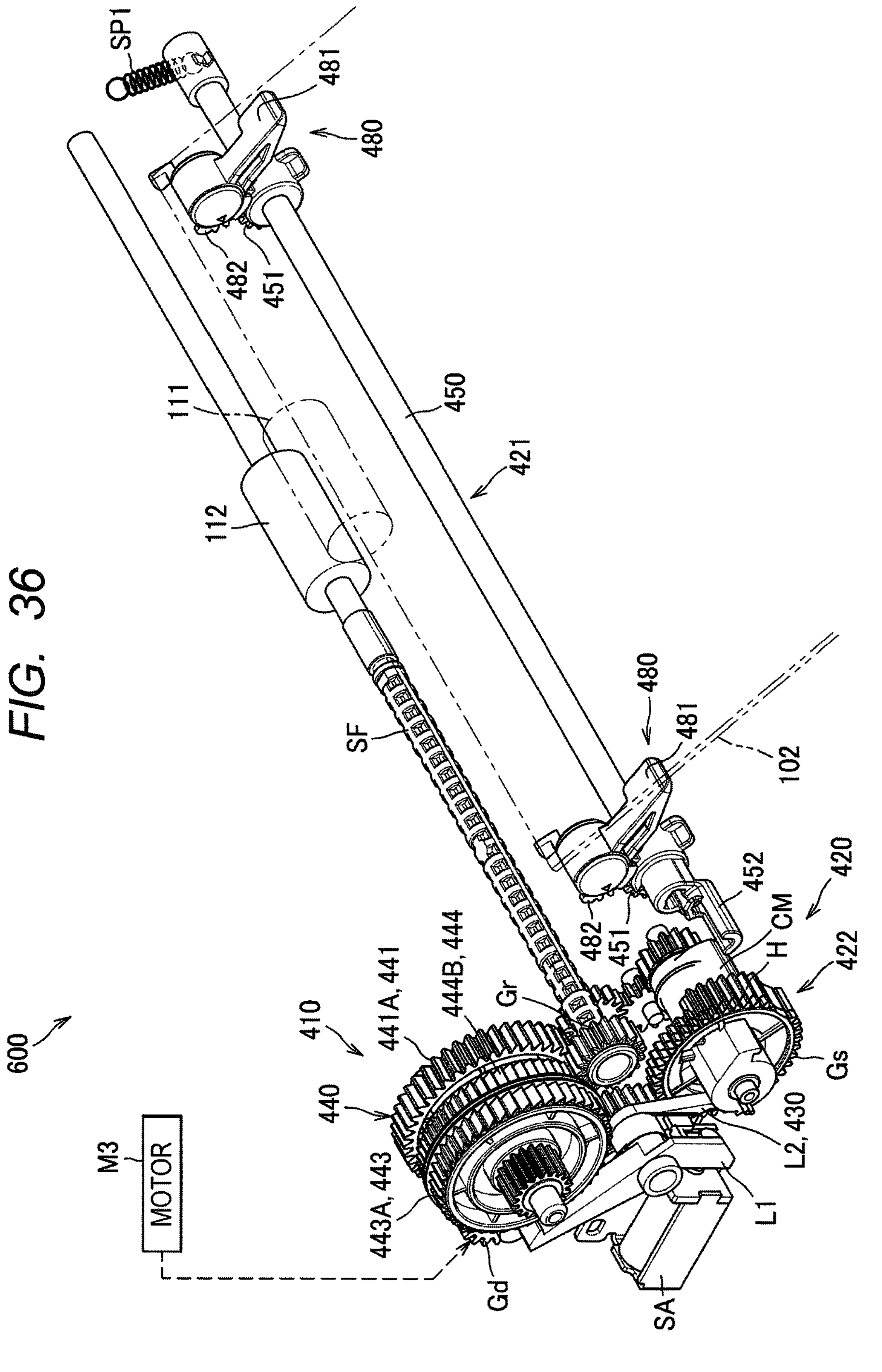
FIG. 36 is a perspective view showing a sheet conveyance device.

As shown in FIG. 36, in a sheet conveyance device 600 according to the seventh embodiment, the positions of the push-up members 480 are different from that in the first embodiment. In the seventh embodiment, the contact portions 481 of the push-up members 480 are located outside the range of the second pickup roller 111 in the width direction of the sheet S. The push-up members 480 are located on one end side and the other end side of the sheet S in the width direction.

The drive shaft 450 has gear portions 451 that engage with the gear portions 482 of the push-up members 480 on one end side and the other end side. The cam contact portion 452 is formed integrally with the gear portion 451 on the one end side. In the seventh embodiment, only the positions of the push-up members 480 and so on are different and the rest of the structure is the same as that of the fourth embodiment. Thus, the same effects as those of the fourth embodiment are obtained.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

In the fifth embodiment, the movable gear may be linearly movable.

In the fifth embodiment, the sector lever and the movable gear may be configured to be moved by separate drive sources. In this case, the controller may drive the first drive source to move the sector lever to the rotation allowing position, and drive the second drive source to move the movable gear to the connection position. Alternatively, the controller may drive the first drive source to move the sector lever to the rotation restricting position, and drive the second drive source to move the movable gear to the separation position.

The transmission switching lever is configured to switch between the transmission position and the non-transmission position. The transmission switching lever may be linearly movable, for example.

The first component of the planetary gear mechanism with which the transmission switching lever engages may be the sun gear or the outer gear.

In the fifth embodiment, the cam and the sector gear may not be integrated, and may be separately formed. In this case, for example, the cam and the sector gear may be directly connected by gear teeth or indirectly connected via a particular number of gears.

In the fifth embodiment, the interlocking gear and the sector gear may not be integrated, and may be separately formed. In this case, for example, the interlocking gear and the sector gear may be directly connected by gear teeth or indirectly connected via a particular number of gears.

The transmission switching mechanism may be, for example, a pendulum gear. In this case, the pendulum gear is rotatable between a transmission position where the drive force of the motor is transmitted to the supply roller and a non-transmission position where the drive force of the motor is not transmitted to the supply roller. The pendulum gear is switched between the transmission position and the non-transmission position each time the sector gear rotates by the second angle.

In the fifth embodiment, the second angle is not limited to 180 degrees, and may be 120 degrees or 90 degrees, for example. In a case where the second angle is 120 degrees, the sector gear may have three tooth portions and three toothless portions. In a case where the second angle is 90 degrees, the sector gear may have four tooth portions and four toothless portions.

The pressure plate operating mechanism is not limited to the structure of the above-described embodiments, and may have any structure.

In the fifth embodiment, the states of the pressure plate operating mechanism and the transmission switching mechanism are switched by the sector lever Ls, the solenoid actuator SA, the cam 511, and the transmission switching lever Lt. The present disclosure is not limited to this. Any structure may be adopted as long as the states of the pressure plate operating mechanism and the transmission switching mechanism are switched using the solenoid actuator. Specifically, the structure may be such that, when the actuation time of the solenoid actuator is the first time, the state of the pressure plate operating mechanism is switched to the operating state to move the pressure plate and the state of the transmission switching mechanism is switched to the transmission state or the non-transmission state, and when the actuation time of the solenoid actuator is the second time shorter than the first time, the state of the pressure plate operating mechanism is not switched to the operating state to maintain the position of the pressure plate and the state of the transmission switching mechanism is switched to the transmission state or the non-transmission state.

In the fifth embodiment, the interlocking gear is not necessarily required. In this case, for example, the movable gear may be movable between a connection position where the movable gear engages with the sector gear and a separation position where the movable gear separates from the sector gear.

In the fifth embodiment, the input gear is not limited to the outer gear, and may be a gear that engages directly or indirectly with the outer gear of the fifth embodiment, for example.

The springs are not limited to those in the above embodiments, and may be other springs such as a wire spring and a leaf spring.

In the above-described embodiment, the entirety of the contact portion of the push-up member is located within the range of the supply roller in the width direction of the sheet. Alternatively, at least part of the contact portion of the push-up member may be located within the range of the supply roller in the width direction of the sheet. For example, only part of the contact portion may be located within the range of the supply roller in the width direction of the sheet.

The supply roller may be located at a position different from the center in the width direction with respect to the sheet on the manual feed tray.

The pressure plate and the push-up member may be linearly movable.

The first component, the second component, and the third component are not limited to the members exemplified in the above embodiments, and may be changed as appropriate.

Each element described in the above embodiments and modifications may be implemented in any combination.

What is claimed is:

1. An image forming apparatus comprising:

a main housing;

a print engine accommodated in the main housing and configured to form an image on a sheet;

a manual feed tray located at a side surface of the main housing;

a supply roller configured to convey a sheet on the manual feed tray toward the print engine;

a pressure plate movable between a contact position at which the sheet on the manual feed tray contacts the supply roller and a separated position at which the sheet on the manual feed tray is separated from the supply roller;

a push-up cam configured to push up the pressure plate from the separated position to the contact position, the push-up cam including a contact portion configured to contact the pressure plate; and a controller configured to:

when performing printing on a plurality of sheets, after moving the pressure plate from the separated position to the contact position, convey the plurality of sheets by intermittently driving the supply roller while maintaining the pressure plate at the contact position.

2. The image forming apparatus according to claim 1, further comprising a spring configured to urge the supply roller toward the pressure plate, wherein the supply roller is located at a center in a width direction of the sheet on the manual feed tray; and wherein at least part of the contact portion of the push-up cam is located within a range of the supply roller in the width direction.

3. The image forming apparatus according to claim 1, further comprising:

a first motor; and a first electromagnetic clutch configured to allow or cut off transmission of drive force from the first motor to the supply roller, wherein the controller is configured to control the first electromagnetic clutch to intermittently drive the supply roller.

4. The image forming apparatus according to claim 1, further comprising:

and an outer gear;

an input gear connected to a first component which is one of three components of the sun gear, the planetary carrier, and the outer gear; and a torque limiter connected to a second component which is another one of the three components, wherein the push-up cam is rotatable and is connected to a third component which is a remaining one of the three components;

wherein the planetary gear mechanism is configured to:

in a process of moving the pressure plate from the separated position to the contact position, by stopping rotation of the second component by the torque limiter, cause the push-up cam to rotate by drive force input from the input gear; and after the pressure plate reaches the contact position, by stopping rotational movement of the push-up cam to stop rotation of the third component, cause the torque limiter to rotate by drive force input from the input gear.

5. The image forming apparatus according to claim 4, further comprising:

a second motor; and a second electromagnetic clutch configured to allow or cut off transmission of drive force from the second motor to the first component.

6. The image forming apparatus according to claim 4, further comprising:

a second motor; and a pendulum gear movable between:

a transmission position at which drive force from the second motor to the first component is transmitted; and a cutoff position at which the drive force from the second motor to the first component is cut off.

7. The image forming apparatus according to claim 1, further comprising:

an input gear to which drive force is input;

a sector gear having an outer circumferential surface on which a first toothless portion, a first tooth portion, a second toothless portion, and a second tooth portion are arranged in this order, the first tooth portion and the second tooth portion being engageable with the input gear, the first toothless portion and the second toothless portion being not engageable with the input gear;

a cam configured to move the push-up cam, the cam being configured to rotate together with the sector gear;

a spring configured to urge the sector gear in a rotation direction of the sector gear; and a sector lever rotatable between:

a rotation restricting position at which the sector lever engages with the sector gear to stop rotation of the sector gear due to urging force of the spring; and a rotation allowing position at which the sector lever separates from the sector gear to allow rotation of the sector gear due to urging force of the spring, wherein, when the sector lever moves to the rotation allowing position in a state where the sector lever is located at the rotation restricting position and the first toothless portion faces the input gear, the sector gear rotates by urging force of the spring, the first tooth portion engages with the input gear, drive force input to the input gear rotates the cam via the sector gear, and the push-up cam moves the pressure plate from the contact position to the separated position; and wherein, when the sector lever moves to the rotation allowing position in a state where the sector lever is located at the rotation restricting position and the second toothless portion faces the input gear, the sector gear rotates by urging force of the spring, the second tooth portion engages with the input gear, drive force input to the input gear rotates the cam via the sector gear, and the push-up cam moves the pressure plate from the separated position to the contact position.

8. The image forming apparatus according to claim 1, further comprising:

a motor;

a transmission switching gear train including a solenoid actuator, the transmission switching gear train being switchable between a transmission state in which drive force of the motor is transmitted to the supply roller and a non-transmission state in which drive force of the motor is not transmitted to the supply roller;

a pressure plate operating mechanism switchable between an operating state in which the pressure plate is operated by using drive force of the motor and a non-operating state in which the pressure plate is not operated by cutting off drive force of the motor, the pressure plate operating mechanism including:

an input gear to which drive force is input;

a sector gear having an outer circumferential surface on which a tooth portion and a toothless portion are arranged, the tooth portion being engageable with the input gear, the toothless portion being not engageable with the input gear; and a spring configured to urge the sector gear in a rotation direction of the sector gear; and a sector lever configured to switch a state of the pressure plate operating mechanism, the sector lever being rotatable between:

a rotation restricting position at which the sector lever engages with a part of the sector gear to stop rotation of the sector gear due to urging force of the spring; and a rotation allowing position at which the sector lever separates from the part of the sector gear to allow rotation of the sector gear due to urging force of the spring, wherein, in response to switching, by the sector lever, a state of the pressure plate operating mechanism from the non-operating state to the operating state, the pressure plate moves from the separated position to the contact position;

wherein, in response to switching the state of the pressure plate operating mechanism from the operating state to the non-operating state, the pressure plate is maintained at the contact position; and wherein the controller is configured to control the solenoid actuator to alternately switch a state of the transmission switching gear train between the transmission state and the non-transmission state in a state where the pressure plate is maintained at the contact position.

9. The image forming apparatus according to claim 8, wherein the transmission switching gear train further includes:

a planetary gear mechanism including a sun gear, a planetary gear, a planetary carrier, and an outer gear;

a transmission switching lever rotatable between:

a transmission position at which the transmission switching lever engages with a first component which is one of three components of the sun gear, the planetary carrier, and the outer gear to cause the transmission switching gear train to be in the transmission state; and a non-transmission position at which the transmission switching lever separates from the first component to cause the transmission switching gear train to be in the non-transmission state;

wherein the sector gear includes a holding portion configured to engage with the sector lever to prevent rotation of the sector lever when the pressure plate is located at the contact position;

wherein the solenoid actuator is configured to move the transmission switching lever between the transmission position and the non-transmission position;

wherein the transmission switching lever is rotatable about a same axis as the sector lever, and is rotatable between the transmission position and the non-transmission position in a state where the sector lever engages with the holding portion; and wherein the sector lever is configured to rotate from the rotation restricting position to the rotation allowing position by interlocking with the transmission switching lever.

10. The image forming apparatus according to claim 9, wherein the pressure plate operating mechanism further includes:

a cam rotatable by interlocking with the sector gear, the cam being rotatable between:

a contact corresponding position at which the cam causes the pressure plate to be located at the contact position; and a separation corresponding position at which the cam causes the pressure plate to be located at the separated position; and an output gear connected to the cam via a first one-way clutch;

wherein the input gear includes:

a first gear to which drive force is input, the first gear transmitting drive force to the output gear; and a second gear connected to the first gear via a second one-way clutch, the second gear being engageable with the tooth portion of the sector gear;

wherein the sector gear is rotatable between:

a first sector position at which the sector lever engages with the part of the sector gear; and a second sector position at which the sector lever engages with the holding portion;

wherein, when the first gear rotates in a particular direction, drive force is transmitted to the sector gear via the first gear, the second one-way clutch, and the second gear to cause the sector gear to rotate from the first sector position to the second sector position, and drive force is transmitted to the cam via the sector gear to cause the cam to rotate from the separation corresponding position to the contact corresponding position; and wherein, when the first gear rotates in an opposite direction to the particular direction, drive force is transmitted to the cam via the first gear, the output gear, and the first one-way clutch to cause the cam to rotate from the contact corresponding position to the separation corresponding position, and drive force is transmitted to the sector gear via the cam to cause the sector gear to rotate from the second sector position to the first sector position.

11. The image forming apparatus according to claim 1, further comprising:

a motor;

a transmission switching gear train switchable between a transmission state in which drive force of the motor is transmitted to the supply roller and a non-transmission state in which drive force of the motor is not transmitted to the supply roller;

a pressure plate operating mechanism switchable between an operating state in which the pressure plate is operated by using drive force of the motor and a non-operating state in which the pressure plate is not operated by cutting off drive force of the motor; and a switching mechanism configured to switch a state of the pressure plate operating mechanism;

wherein the pressure plate operating mechanism includes:

an input gear to which drive force is input;

a sector gear having an outer circumferential surface on which a first toothless portion, a first tooth portion, a second toothless portion, and a second tooth portion are arranged in this order, the first tooth portion and the second tooth portion being engageable with the input gear, the first toothless portion and the second toothless portion being not engageable with the input gear;

a spring configured to urge the sector gear in a rotation direction of the sector gear;

a movable gear movable between a connection position at which the movable gear receives drive force from the sector gear and a separation position at which the movable gear does not receive drive force from the sector gear; and a gear unit configured to operate the pressure plate by drive force transmitted from the movable gear, the gear unit including:

an upstream gear configured to engage with the movable gear located at the connection position; and a downstream gear configured to rotate together with the upstream gear when the upstream gear rotates by a first angle or more;

wherein the transmission switching gear train is configured to switch to the transmission state or the non-transmission state each time the sector gear rotates by a second angle;

wherein the switching mechanism includes:

a sector lever rotatable between:

a rotation restricting position at which the sector lever engages with the sector gear to stop rotation of the sector gear due to urging force of the spring; and a rotation allowing position at which the sector lever separates from the sector gear to allow rotation of the sector gear due to urging force of the spring; and a solenoid actuator for moving the sector lever between the rotation restricting position and the rotation allowing position;

wherein, when the sector lever is located at the rotation restricting position, the movable gear is located at the separation position;

wherein, when the sector lever is located at the rotation allowing position, the movable gear is located at the connection position;

wherein, in a case where an actuation time of the solenoid actuator corresponding to a time of maintaining the sector lever at the rotation allowing position is a first time, the downstream gear rotates to move the pressure plate, and the sector gear rotates by the second angle to switch a state of the transmission switching gear train to the transmission state or the non-transmission state; and wherein, in a case where the actuation time of the solenoid actuator is a second time shorter than the first time, the downstream gear does not rotate to maintain a position of the pressure plate, and the sector gear rotates by the second angle to switch the state of the transmission switching gear train to the transmission state or the non-transmission state.

12. The image forming apparatus according to claim 11, wherein the transmission switching gear train includes:

a planetary gear mechanism including a sun gear, a planetary gear, a planetary carrier, and an outer gear;

a transmission switching lever rotatable between:

a transmission position at which the transmission switching lever engages with a first component which is one of three components of the sun gear, the planetary carrier, and the outer gear to cause the transmission switching gear train to be in the transmission state; and a non-transmission position at which the transmission switching lever separates from the first component to cause the transmission switching gear train to be in the non-transmission state; and a cam rotatable by interlocking with the sector gear, the cam being configured to switch the transmission switching lever between the transmission position and the non-transmission position.

13. The image forming apparatus according to claim 12, wherein the pressure plate operating mechanism includes an interlocking gear configured to rotate together with the sector gear, the interlocking gear being engageable with the movable gear located at the connection position; and wherein the interlocking gear includes:

the cam; and an outer circumferential surface on which two tooth portions and two toothless portions are arranged, the two tooth portions being engageable with the movable gear located at the connection position, the two toothless portions being not engageable with the movable gear located at the connection position.

14. The image forming apparatus according to claim 12, wherein the input gear is one of the three components of the planetary gear mechanism.

15. The image forming apparatus according to claim 1, further comprising:

a motor;

a transmission switching gear train switchable between a transmission state in which drive force of the motor is transmitted to the supply roller and a non-transmission state in which drive force of the motor is not transmitted to the supply roller;

a pressure plate operating gear train switchable between an operating state in which the pressure plate is operated by using drive force of the motor and a non-operating state in which the pressure plate is not operated by cutting off drive force of the motor; and a solenoid actuator configured to switch a state of the pressure plate operating gear train and a state of the transmission switching gear train, wherein, in a case where an actuation time of the solenoid actuator is a first time, the state of the pressure plate operating gear train is switched to the operating state to move the pressure plate, and the state of the transmission switching gear train is switched to the transmission state or the non-transmission state; and wherein, in a case where the actuation time of the solenoid actuator is a second time shorter than the first time, the state of the pressure plate operating gear train is not switched to the operating state to maintain a position of the pressure plate, and the state of the transmission switching gear train is switched to the transmission state or the non-transmission state.

16. The image forming apparatus according to claim 1, further comprising a drawer to which a plurality of development cartridges are detachably attached, wherein the main housing has an opening;

wherein the drawer is movable through the opening; and wherein the supply roller is located below the opening.

17. A sheet conveyance device comprising:

a tray;

a supply roller configured to convey a sheet set on the tray;

a pressure plate movable between a contact position at which the sheet on the tray contacts the supply roller and a separated position at which the sheet on the tray is separated from the supply roller;

a motor;

a transmission switching gear train including a solenoid actuator, the transmission switching gear train being switchable between a transmission state in which drive force of the motor is transmitted to the supply roller and a non-transmission state in which drive force of the motor is not transmitted to the supply roller;

a pressure plate operating mechanism switchable between an operating state in which the pressure plate is operated by using drive force of the motor and a non-operating state in which the pressure plate is not operated by cutting off drive force of the motor, the pressure plate operating mechanism including:

an input gear to which drive force is input;

a sector gear having an outer circumferential surface on which a tooth portion and a toothless portion are arranged, the tooth portion being engageable with the input gear, the toothless portion being not engageable with the input gear; and a spring configured to urge the sector gear in a rotation direction of the sector gear; and a sector lever configured to switch a state of the pressure plate operating mechanism, the sector lever being rotatable between:

a rotation restricting position at which the sector lever engages with a part of the sector gear to stop rotation of the sector gear due to urging force of the spring; and a rotation allowing position at which the sector lever separates from the part of the sector gear to allow rotation of the sector gear due to urging force of the spring, wherein, in response to switching, by the sector lever, a state of the pressure plate operating mechanism from the non-operating state to the operating state, the pressure plate moves from the separated position to the contact position;

wherein, in response to switching the state of the pressure plate operating mechanism from the operating state to the non-operating state, the pressure plate is maintained at the contact position; and wherein the transmission switching gear train is alternately switchable between the transmission state and the non-transmission state in a state where the pressure plate is maintained at the contact position.

18. The sheet conveyance device according to claim 17, wherein the transmission switching gear train further includes:

and an outer gear;

a transmission switching lever rotatable between:

a transmission position at which the transmission switching lever engages with a first component which is one of three components of the sun gear, the planetary carrier, and the outer gear to cause the transmission switching gear train to be in the transmission state; and a non-transmission position at which the transmission switching lever separates from the first component to cause the transmission switching gear train to be in the non-transmission state;

wherein the sector gear includes a holding portion configured to engage with the sector lever to prevent rotation of the sector lever when the pressure plate is located at the contact position;

wherein the solenoid actuator is configured to move the transmission switching lever between the transmission position and the non-transmission position;

wherein the transmission switching lever is rotatable about a same axis as the sector lever, and is rotatable between the transmission position and the non-transmission position in a state where the sector lever engages with the holding portion; and wherein the sector lever is configured to rotate from the rotation restricting position to the rotation allowing position by interlocking with the transmission switching lever.

19. A sheet conveyance device comprising:

a tray;

a supply roller configured to convey a sheet set on the tray;

a pressure plate movable between a contact position at which the sheet on the tray contacts the supply roller and a separated position at which the sheet on the tray is separated from the supply roller;

a motor;

a transmission switching gear train switchable between a transmission state in which drive force of the motor is transmitted to the supply roller and a non-transmission state in which drive force of the motor is not transmitted to the supply roller;

a pressure plate operating gear train switchable between an operating state in which the pressure plate is operated by using drive force of the motor and a non-operating state in which the pressure plate is not operated by cutting off drive force of the motor; and a solenoid actuator configured to switch a state of the pressure plate operating gear train and a state of the transmission switching gear train, wherein, in a case where an actuation time of the solenoid actuator is a first time, the state of the pressure plate operating gear train is switched to the operating state to move the pressure plate, and the state of the transmission switching gear train is switched to the transmission state or the non-transmission state; and wherein, in a case where the actuation time of the solenoid actuator is a second time shorter than the first time, the state of the pressure plate operating gear train is not switched to the operating state to maintain a position of the pressure plate, and the state of the transmission switching gear train is switched to the transmission state or the non-transmission state.

20. The sheet conveyance device according to claim 19, further comprising a sector lever, wherein the pressure plate operating gear train includes:

an input gear to which drive force is input;

a sector gear having an outer circumferential surface on which a first toothless portion, a first tooth portion, a second toothless portion, and a second tooth portion are arranged in this order, the first tooth portion and the second tooth portion being engageable with the input gear, the first toothless portion and the second toothless portion being not engageable with the input gear;

a spring configured to urge the sector gear in a rotation direction of the sector gear;

a movable gear movable between a connection position at which the movable gear receives drive force from the sector gear and a separation position at which the movable gear does not receive drive force from the sector gear; and a gear unit configured to operate the pressure plate by drive force transmitted from the movable gear, the gear unit including:

an upstream gear configured to engage with the movable gear located at the connection position; and a downstream gear configured to rotate together with the upstream gear when the upstream gear rotates by a first angle or more;

wherein the sector lever is rotatable between:

a rotation restricting position at which the sector lever engages with the sector gear to stop rotation of the sector gear due to urging force of the spring; and a rotation allowing position at which the sector lever separates from the sector gear to allow rotation of the sector gear due to urging force of the spring;

wherein the solenoid actuator is configured to move the sector lever between the rotation restricting position and the rotation allowing position;

wherein the transmission switching gear train is configured to switch to the transmission state or the non-transmission state each time the sector gear rotates by a second angle;

wherein, when the sector lever is located at the rotation restricting position, the movable gear is located at the separation position;

wherein, when the sector lever is located at the rotation allowing position, the movable gear is located at the connection position;

wherein, in a case where an actuation time of the solenoid actuator corresponding to a time of maintaining the sector lever at the rotation allowing position is the first time, the downstream gear rotates to move the pressure plate, and the sector gear rotates by the second angle to switch a state of the transmission switching gear train to the transmission state or the non-transmission state; and wherein, in a case where the actuation time of the solenoid actuator is the second time shorter than the first time, the downstream gear does not rotate to maintain a position of the pressure plate, and the sector gear rotates by the second angle to switch the state of the transmission switching gear train to the transmission state or the non-transmission state.

* * * * *